(12) United States Patent
Rivera

(10) Patent No.: US 11,534,020 B2
(45) Date of Patent: Dec. 27, 2022

(54) COFFEE HOLDER AND COFFEE MAKER COMBINATION FOR TAMPING COFFEE

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 1475 days.

(21) Appl. No.: 13/644,501

(22) Filed: Oct. 4, 2012

(65) Prior Publication Data
US 2013/0061764 A1    Mar. 14, 2013

Related U.S. Application Data

(63) Continuation-in-part of application No. 12/762,262, filed on Apr. 16, 2010, which is a continuation-in-part of application No. 12/620,584, filed on Nov. 17, 2009, now Pat. No. 8,291,812, and a continuation-in-part of application No. 12/610,181, filed on Oct. 30, 2009, now Pat. No. 8,621,981.

(51) Int. Cl.
| | |
|---|---|
| *A47J 31/44* | (2006.01) |
| *A47J 31/047* | (2006.01) |
| *A47J 31/06* | (2006.01) |

(52) U.S. Cl.
CPC ........... *A47J 31/446* (2013.01); *A47J 31/047* (2013.01); *A47J 31/0647* (2013.01); *A47J 31/44* (2013.01)

(58) Field of Classification Search
CPC .. A47J 31/0647; A47J 31/446; A47J 31/4403; A47J 31/4482
USPC ............... 99/287, 279, 300, 316, 289 P, 291, 99/289 D, 296, 297, 302 P, 307, 302 FB, 99/317, 318, 323, 319, 351, 281, 302 R; 100/302, 316, 315, 98 R, 137
See application file for complete search history.

(56) References Cited

U.S. PATENT DOCUMENTS

| | | | |
|---|---|---|---|
| 1,871,590 A | * 8/1932 | D Annunzio | A47J 19/02 100/73 |
| 2,433,815 A | 12/1947 | Laforge | |
| 3,022,411 A | 2/1962 | Soper et al. | |
| 3,115,822 A | 12/1963 | Totten | |
| 3,120,170 A | 2/1964 | Garte | |
| 3,136,241 A | 6/1964 | Price | |
| 3,199,682 A | 8/1965 | Scholtz | |
| 3,224,360 A | 12/1965 | Wickenberg et al. | |
| 3,269,298 A | * 8/1966 | Grundmann | A47J 31/3657 99/287 |
| 3,316,388 A | 4/1967 | Wickenbert et al. | |
| 3,384,004 A | 5/1968 | Perlman et al. | |
| 3,405,630 A | 10/1968 | Weber, III | |

(Continued)

FOREIGN PATENT DOCUMENTS

| | | | | |
|---|---|---|---|---|
| EP | 1886605 A1 | * 2/2008 | ............ | A47J 31/36 |
| WO | WO 2005/092160 A1 | 10/2005 | | |
| WO | WO-2011153272 A2 | * 12/2011 | ............ | A47J 31/303 |

*Primary Examiner* — Phuong T Nguyen
(74) *Attorney, Agent, or Firm* — IP Strategies

(57) ABSTRACT

A coffee maker and coffee holder cooperate to tamp coffee in the coffee holder. The coffee holder may include a top tamping spring, a bottom tamping spring, or a top or bottom passage allowing entry of a tamper into the coffee holder. The coffee maker includes an actuator above or below the coffee holder, or a fixed tamper attached to a ceiling or platform of the coffee maker. The coffee holder may be inserted between the ceiling and platform, or into a moving drawer of the coffee maker. The actuator may be a solenoid actuator or a hydraulic actuator actuated by water pressure of heated water used for brewing.

9 Claims, 44 Drawing Sheets

(56) References Cited

U.S. PATENT DOCUMENTS

| | | | |
|---|---|---|---|
| 3,446,624 A * | 5/1969 | Luedtke | B65D 85/808 |
| | | | 426/77 |
| 3,583,308 A | 6/1971 | Williams | |
| 3,607,297 A | 9/1971 | Fasano | |
| 3,757,670 A | 9/1973 | Laama et al. | |
| 3,844,206 A | 10/1974 | Weber | |
| 3,958,502 A | 5/1976 | Vitous | |
| 4,164,644 A | 8/1979 | Remsnyder et al. | |
| 4,253,385 A | 3/1981 | Illy | |
| 4,286,515 A | 9/1981 | Baumann et al. | |
| 4,603,621 A | 8/1986 | Roberts | |
| 4,703,687 A | 11/1987 | Wei | |
| 4,800,089 A | 1/1989 | Scott | |
| 4,998,463 A | 3/1991 | Precht et al. | |
| 5,000,082 A | 3/1991 | Lassota | |
| 5,012,629 A | 5/1991 | Rehman | |
| 5,046,409 A | 9/1991 | Henn | |
| 5,108,768 A * | 4/1992 | So | B65D 85/8043 |
| | | | 206/519 |
| 5,109,763 A * | 5/1992 | Morris | B30B 9/321 |
| | | | 100/125 |
| 5,123,335 A | 6/1992 | Aselu | |
| 5,171,457 A | 12/1992 | Acuff et al. | |
| 5,233,914 A | 8/1993 | English | |
| 5,325,765 A | 7/1994 | Sylvan et al. | |
| 5,335,589 A | 8/1994 | Yerves et al. | |
| 5,526,733 A * | 6/1996 | Klawuhn | A47J 31/0663 |
| | | | 99/287 |
| 5,582,730 A | 12/1996 | Hugentobler | |
| 5,649,412 A | 7/1997 | Binacchi | |
| 5,636,563 A | 9/1997 | Oppermann et al. | |
| 5,676,041 A | 10/1997 | Glucksman et al. | |
| 5,829,340 A | 11/1998 | Yang | |
| 5,840,189 A | 11/1998 | Sylvan et al. | |
| 5,870,943 A | 2/1999 | Levi et al. | |
| 5,887,508 A | 3/1999 | Estaun | |
| 5,895,672 A | 4/1999 | Cooper | |
| 6,118,933 A | 9/2000 | Roberson | |
| D431,423 S | 10/2000 | Ohm et al. | |
| 6,136,352 A | 10/2000 | Silverstein et al. | |
| 6,161,470 A * | 12/2000 | Justus | A47J 31/0636 |
| | | | 219/474 |
| 6,164,191 A | 12/2000 | Liu et al. | |
| 6,182,554 B1 * | 2/2001 | Beaulieu | A47J 31/3628 |
| | | | 99/289 R |
| 6,189,438 B1 | 2/2001 | Biefeldt et al. | |
| D454,433 S | 3/2002 | Peter | |
| D454,434 S | 3/2002 | McDaniel et al. | |
| 6,440,256 B1 | 8/2002 | Gordon et al. | |
| 6,510,783 B1 * | 1/2003 | Basile | A47J 31/3633 |
| | | | 99/281 |
| D474,110 S | 5/2003 | Sweeney | |
| D474,111 S | 5/2003 | Lazaris | |
| 6,589,577 B2 | 7/2003 | Lazaris et al. | |
| 6,606,938 B2 * | 8/2003 | Taylor | A47J 31/0642 |
| | | | 426/433 |
| 6,607,762 B2 | 8/2003 | Lazaris et al. | |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,708,600 B2 | 3/2004 | Winkler et al. | |
| 6,727,484 B2 | 4/2004 | Policappelli | |
| 6,740,345 B2 | 5/2004 | Cai | |
| 6,763,759 B2 * | 7/2004 | Denisart | A47J 31/36 |
| | | | 99/295 |
| 6,777,007 B2 | 8/2004 | Cai | |
| 6,832,542 B2 | 12/2004 | Hu et al. | |
| 6,843,165 B2 | 1/2005 | Stoner et al. | |
| D502,362 S | 5/2005 | Lazaris et al. | |
| 6,904,840 B1 | 6/2005 | Pfeifer et al. | |
| 6,948,420 B2 | 9/2005 | Kirschner et al. | |
| 7,047,870 B2 | 5/2006 | Gantt et al. | |
| 7,081,263 B2 | 7/2006 | Albrecht | |
| 7,131,369 B2 | 11/2006 | Gantt et al. | |
| 7,284,679 B2 * | 10/2007 | Zill | B65B 1/16 |
| | | | 222/1 |
| 7,320,274 B2 | 1/2008 | Castellani | |
| 7,377,089 B2 | 5/2008 | Rapparini | |
| 7,946,217 B2 | 5/2011 | Favre et al. | |
| 8,047,127 B2 | 11/2011 | Lin | |
| 8,051,766 B1 * | 11/2011 | Yu | A47J 31/20 |
| | | | 220/625 |
| 2002/0035929 A1 | 3/2002 | Kanba et al. | |
| 2002/0148356 A1 * | 10/2002 | Lazaris | A47J 31/0668 |
| | | | 99/295 |
| 2003/0200872 A1 | 10/2003 | Lin | |
| 2004/0005384 A1 | 1/2004 | Cai | |
| 2004/0055472 A1 * | 3/2004 | Stoner | A47J 31/3685 |
| | | | 99/295 |
| 2004/0118290 A1 | 6/2004 | Cai | |
| 2005/0236323 A1 | 10/2005 | Oliver et al. | |
| 2005/0257695 A1 | 11/2005 | Dobranski et al. | |
| 2006/0159815 A1 | 7/2006 | Crook et al. | |
| 2006/0169150 A1 * | 8/2006 | Voss | A47J 31/0689 |
| | | | 99/295 |
| 2006/0174769 A1 * | 8/2006 | Favre | A47J 31/0668 |
| | | | 99/275 |
| 2006/0196364 A1 | 9/2006 | Kirschner | |
| 2006/0254428 A1 | 11/2006 | Glucksman et al. | |
| 2007/0193452 A1 * | 8/2007 | Campetella | A47J 31/3609 |
| | | | 99/279 |
| 2007/0259074 A1 | 11/2007 | Searchilli et al. | |
| 2009/0202691 A1 | 8/2009 | Gauger | |
| 2009/0229470 A1 * | 9/2009 | Dorfmueller | A47J 31/0689 |
| | | | 99/295 |
| 2009/0229471 A1 | 9/2009 | Lun et al. | |
| 2010/0083843 A1 | 4/2010 | Denisart et al. | |
| 2011/0209623 A1 | 9/2011 | Leung et al. | |
| 2011/0274802 A1 | 11/2011 | Rivera | |
| 2012/0207895 A1 | 8/2012 | Rivera | |
| 2012/0207896 A1 | 8/2012 | Rivera | |
| 2012/0276264 A1 | 11/2012 | Rivera | |
| 2012/0285330 A1 | 11/2012 | Demiglio et al. | |
| 2012/0285334 A1 | 11/2012 | Demiglio et al. | |
| 2014/0245895 A1 | 9/2014 | Demiglio et al. | |

* cited by examiner

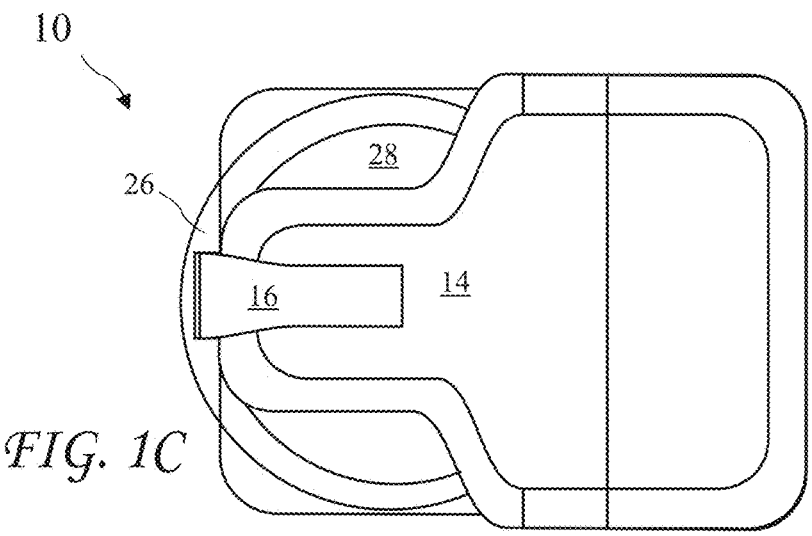
FIG. 1C
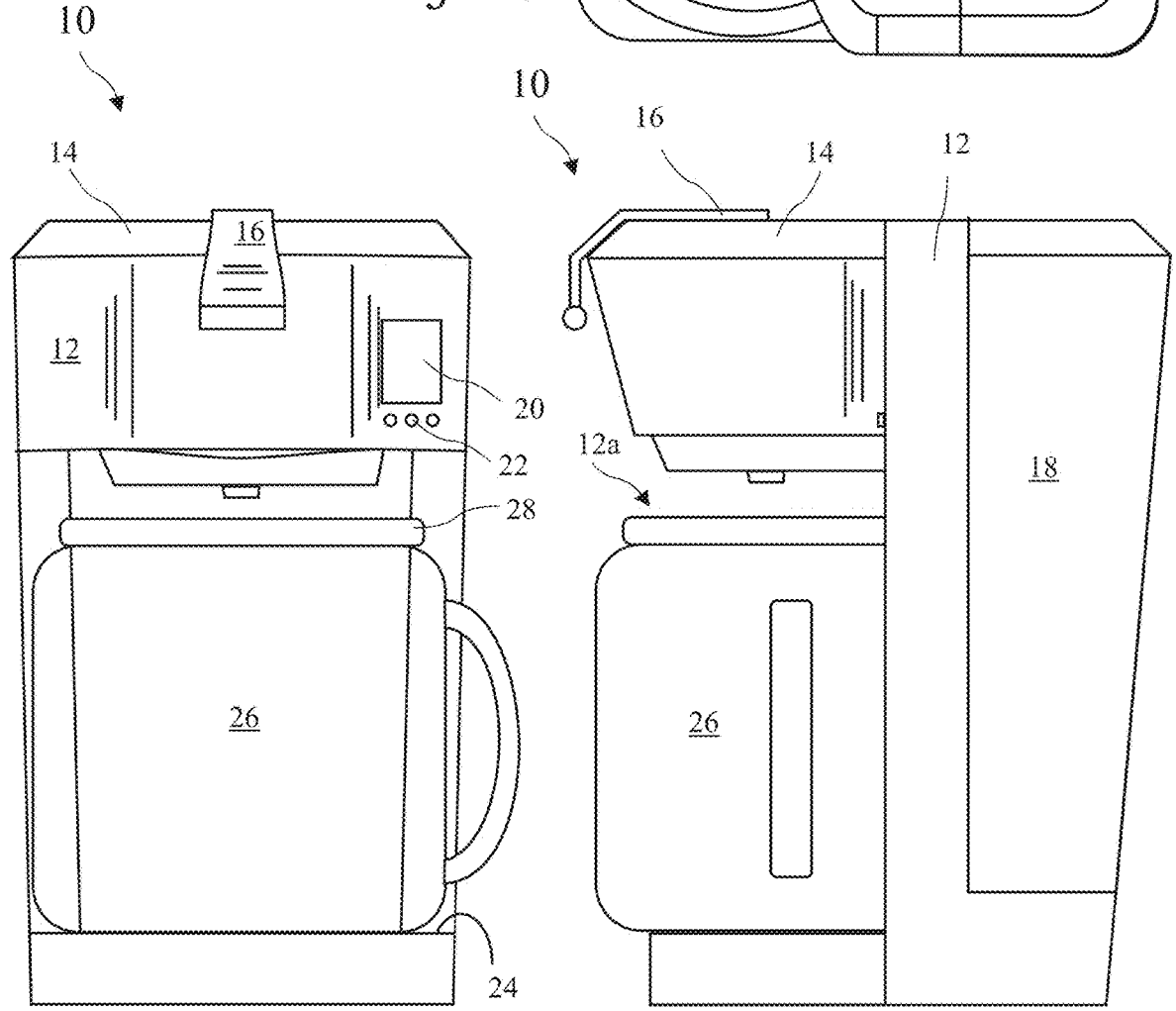
FIG. 1A
FIG. 1B

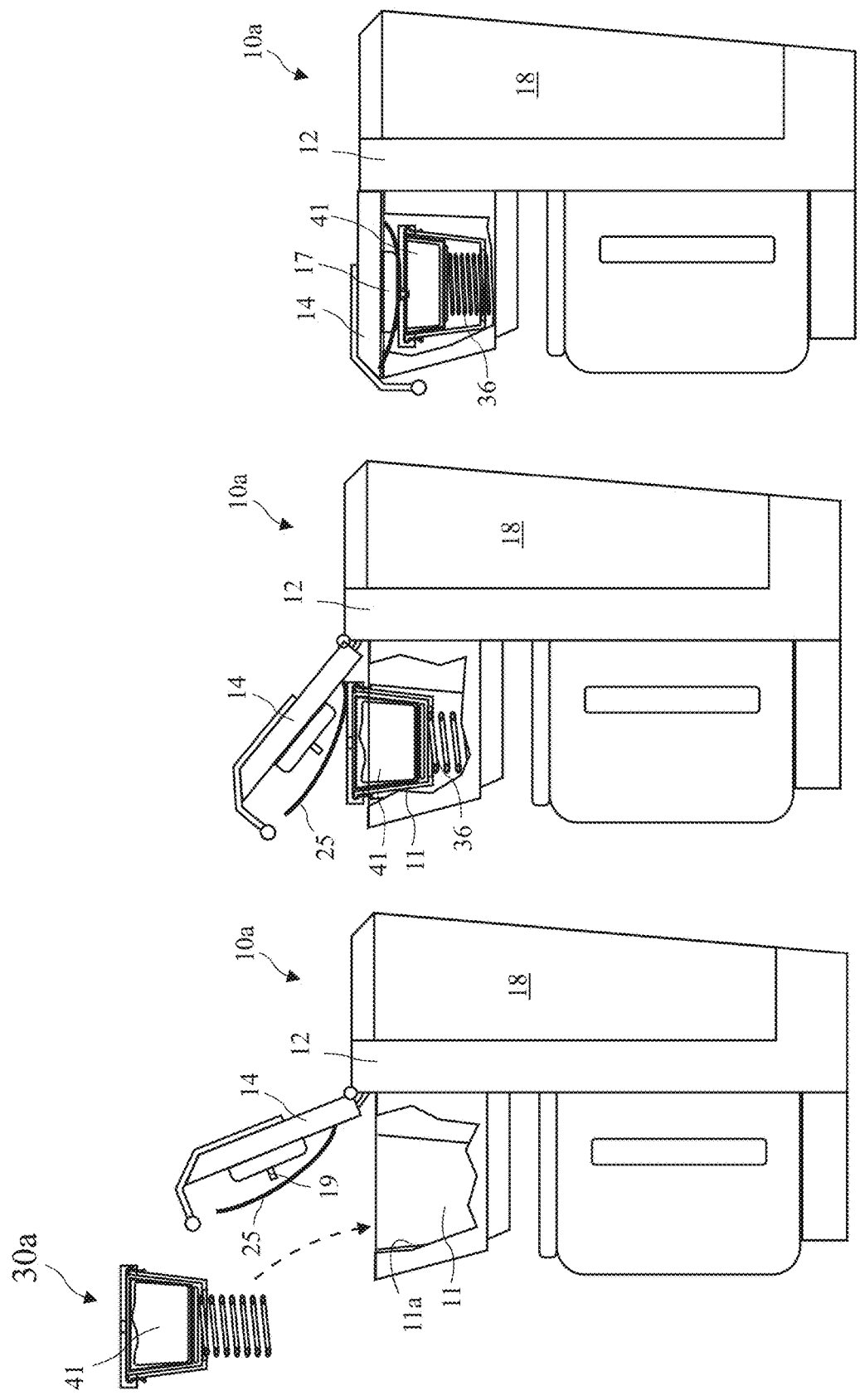

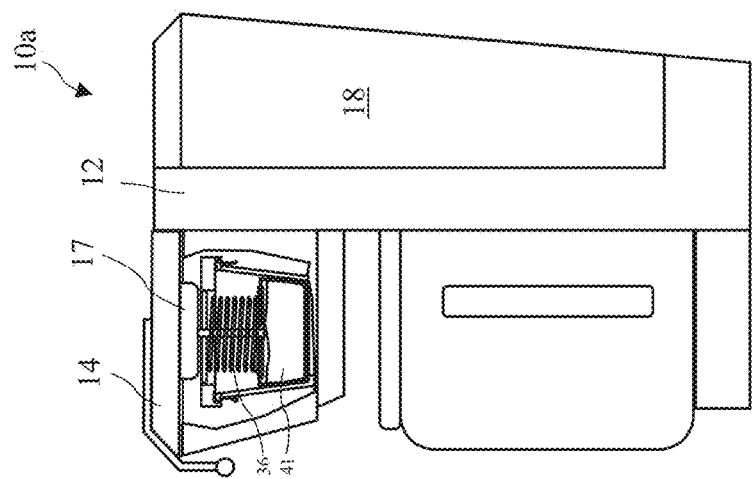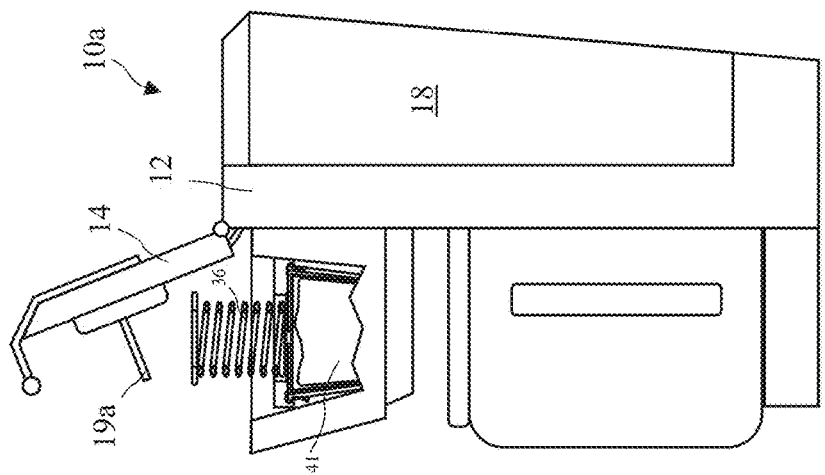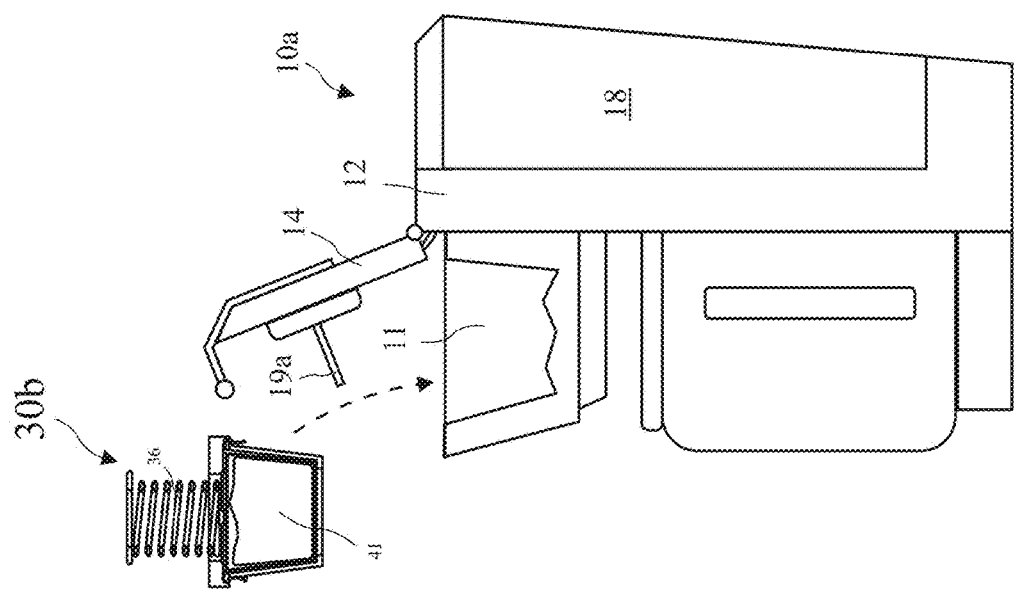

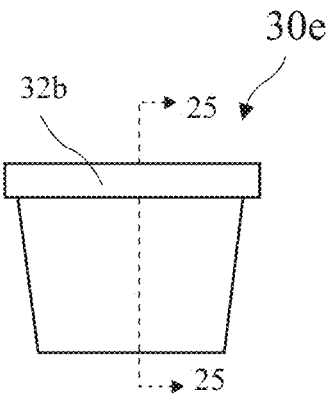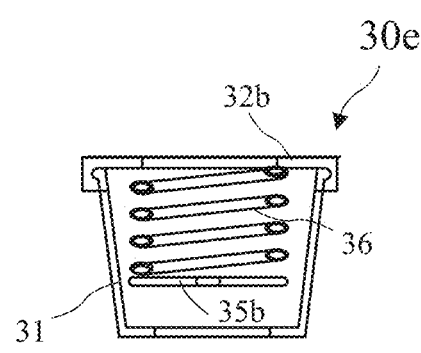
FIG. 24  FIG. 25
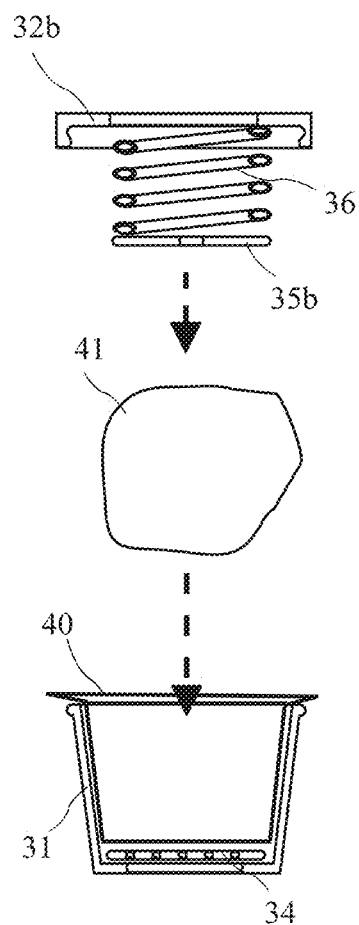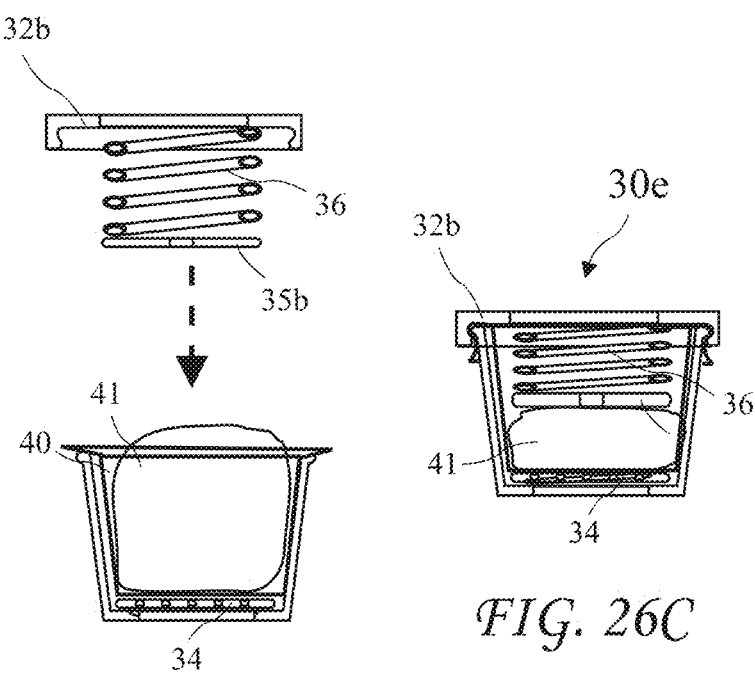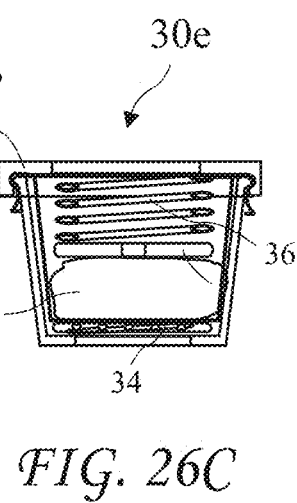
FIG. 26A  FIG. 26B  FIG. 26C

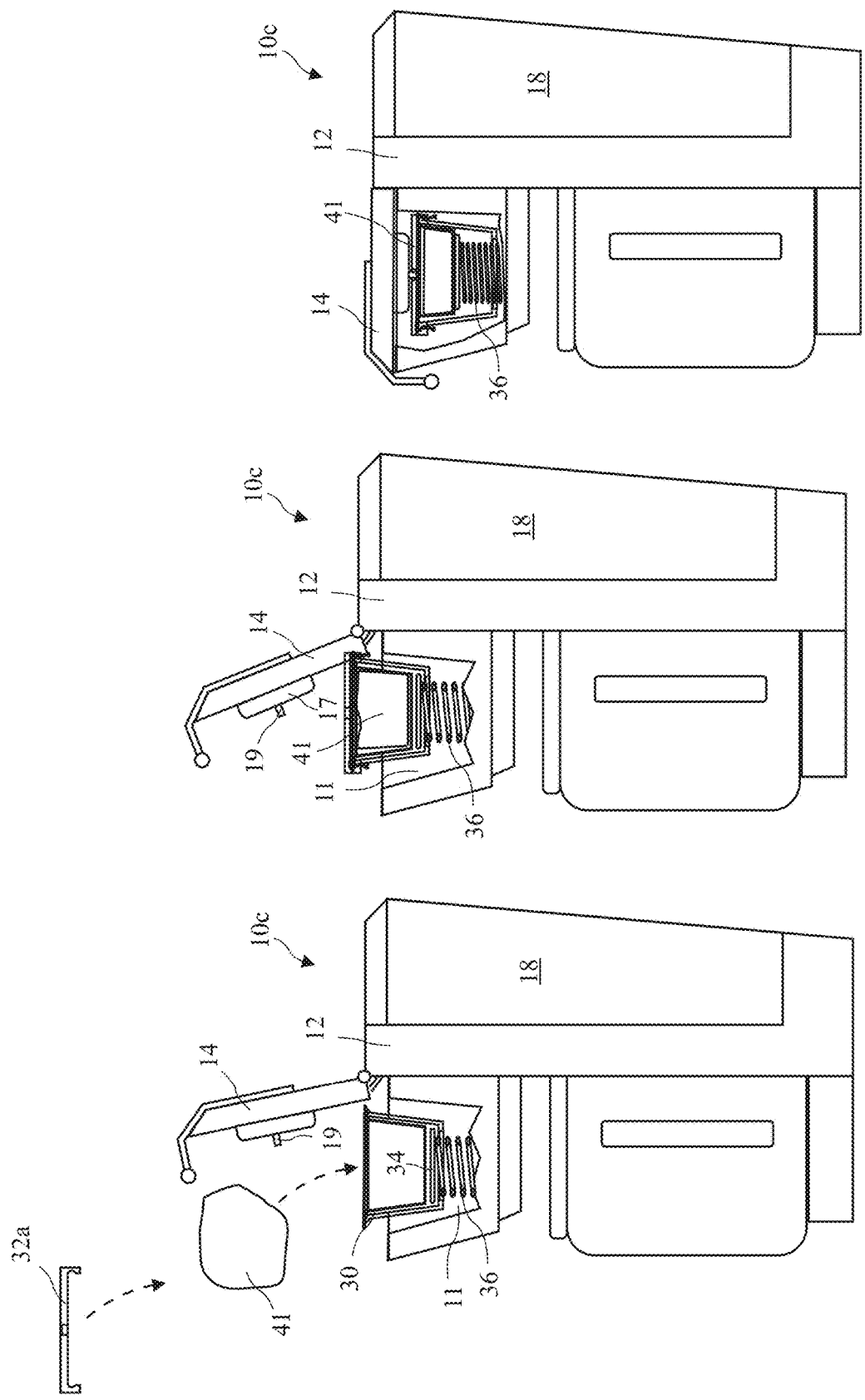

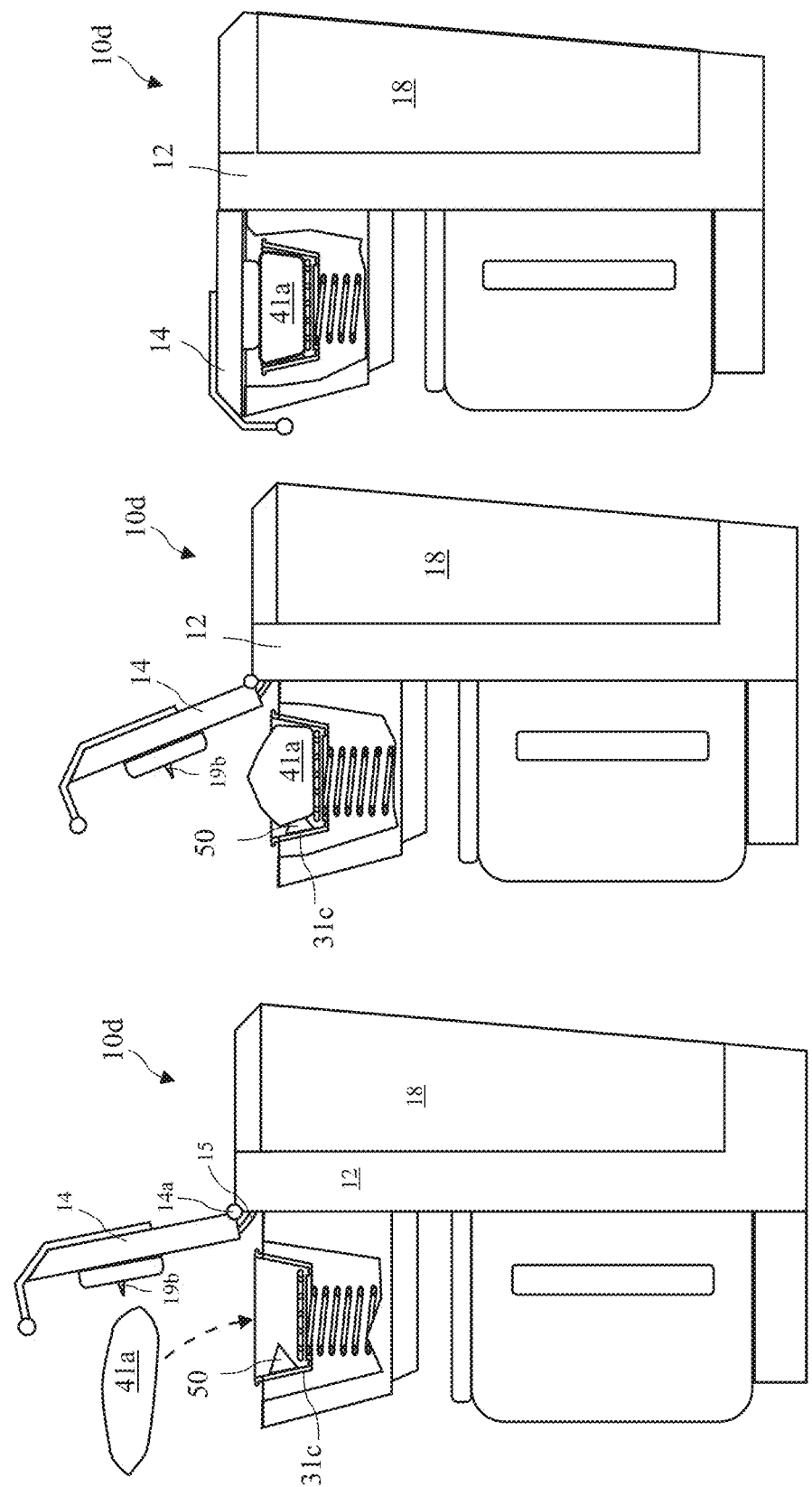

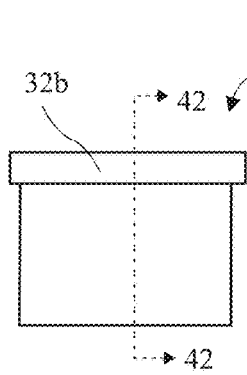 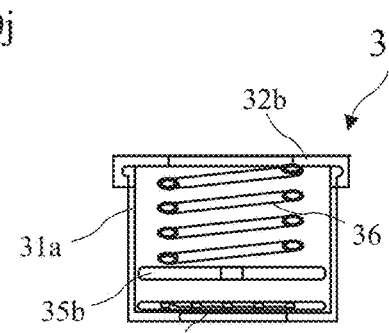 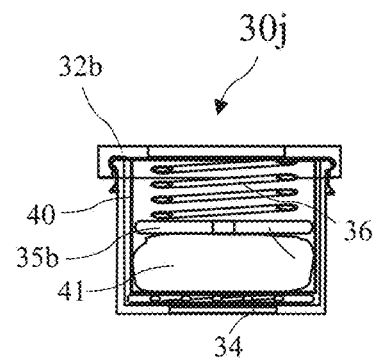
FIG. 41  FIG. 42  FIG. 43
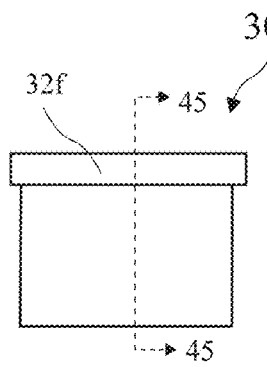 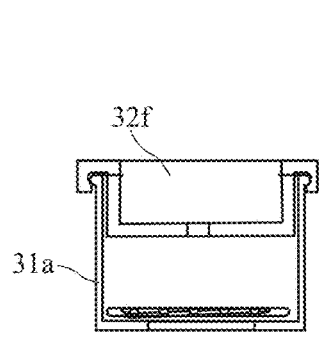 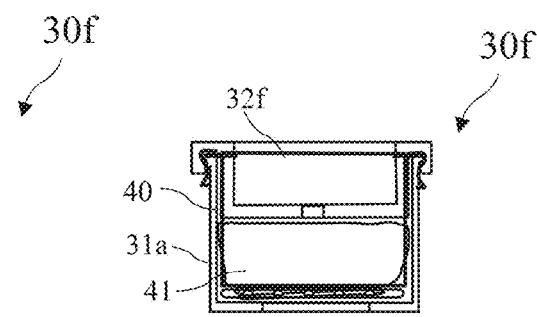
FIG. 44  FIG. 45  FIG. 46
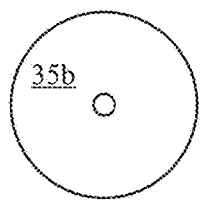 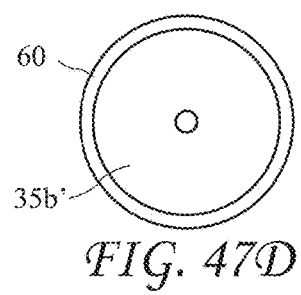 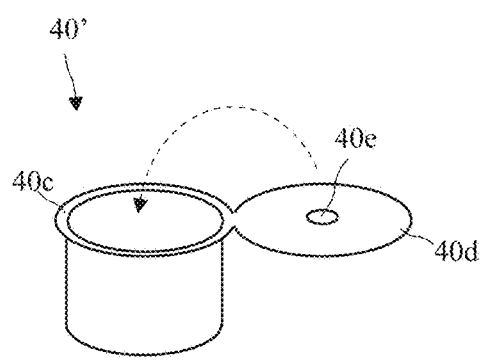
FIG. 47B  FIG. 47D  FIG. 48
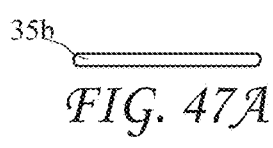 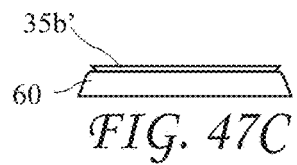
FIG. 47A  FIG. 47C

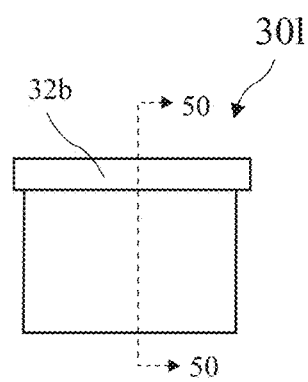
FIG. 49
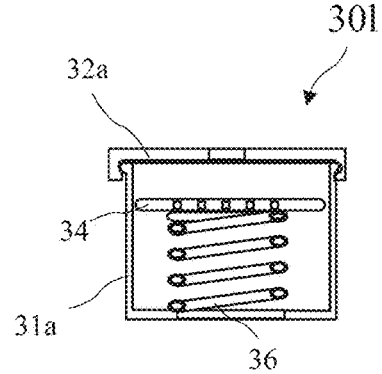
FIG. 50
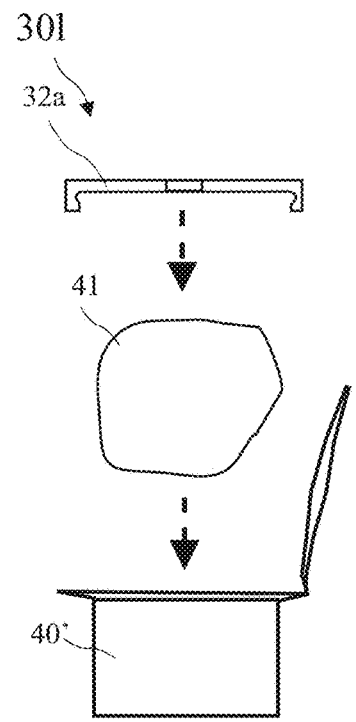
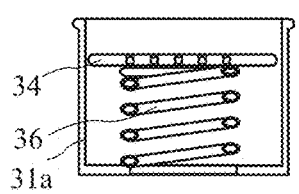
FIG. 51A
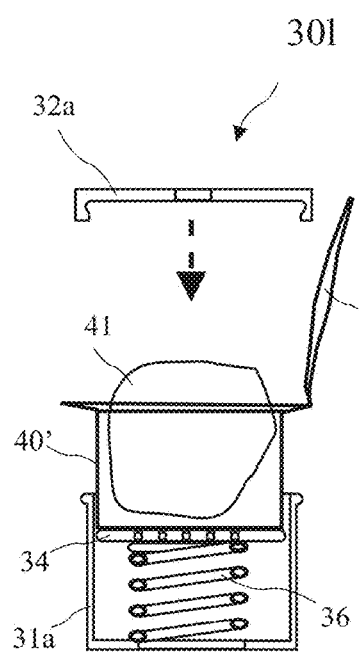
FIG. 51B
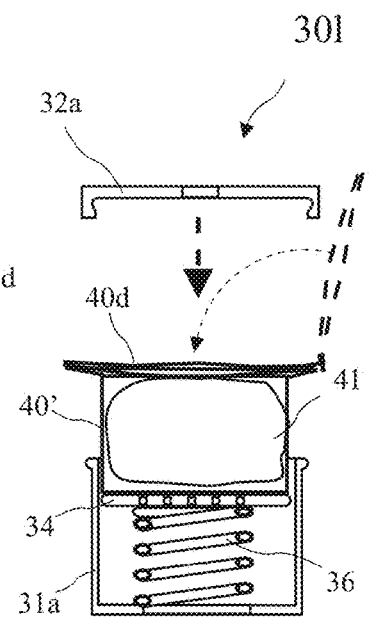
FIG. 51C
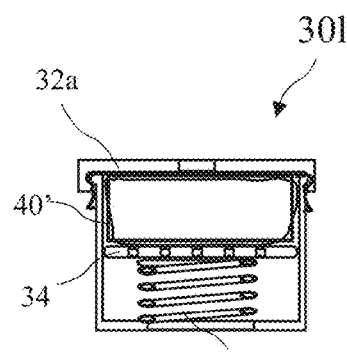
FIG. 51D

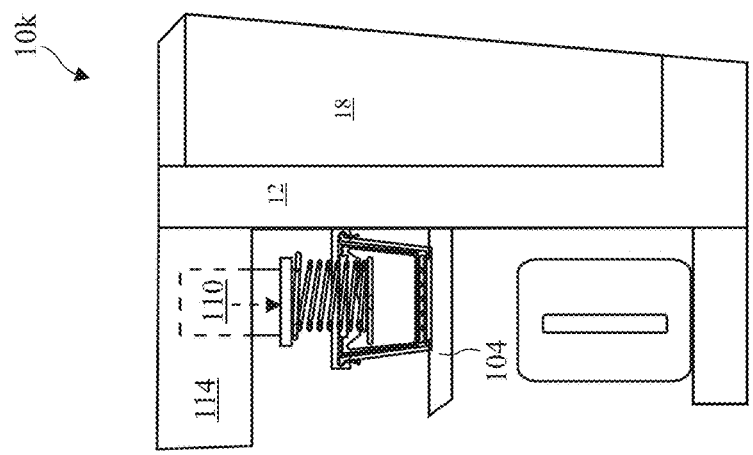
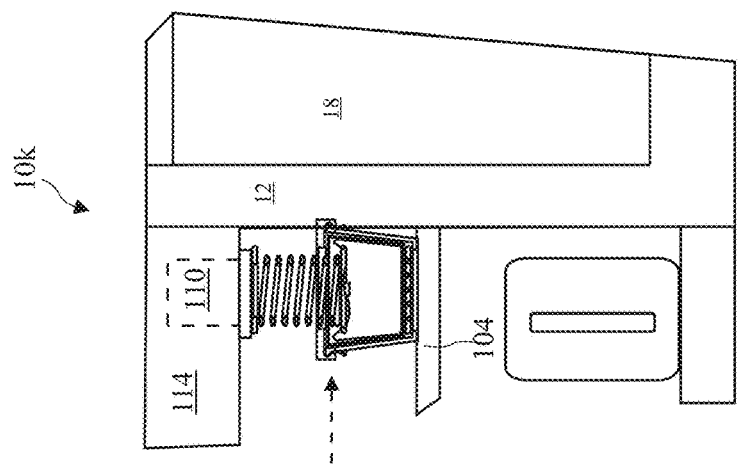
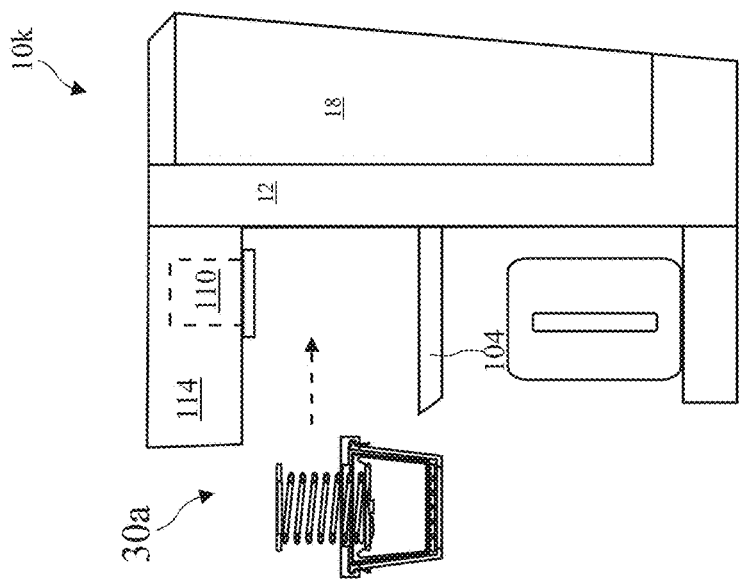

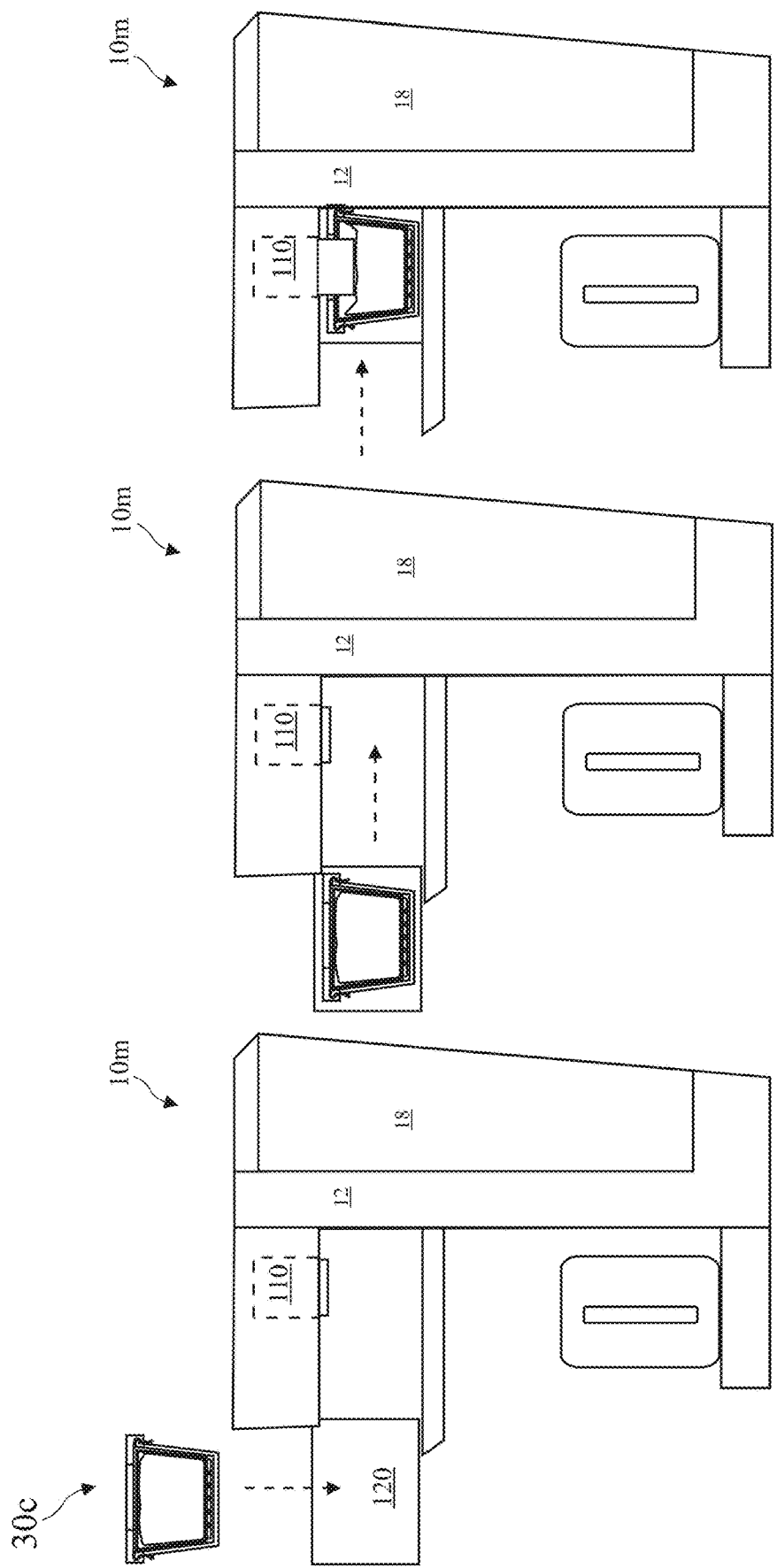

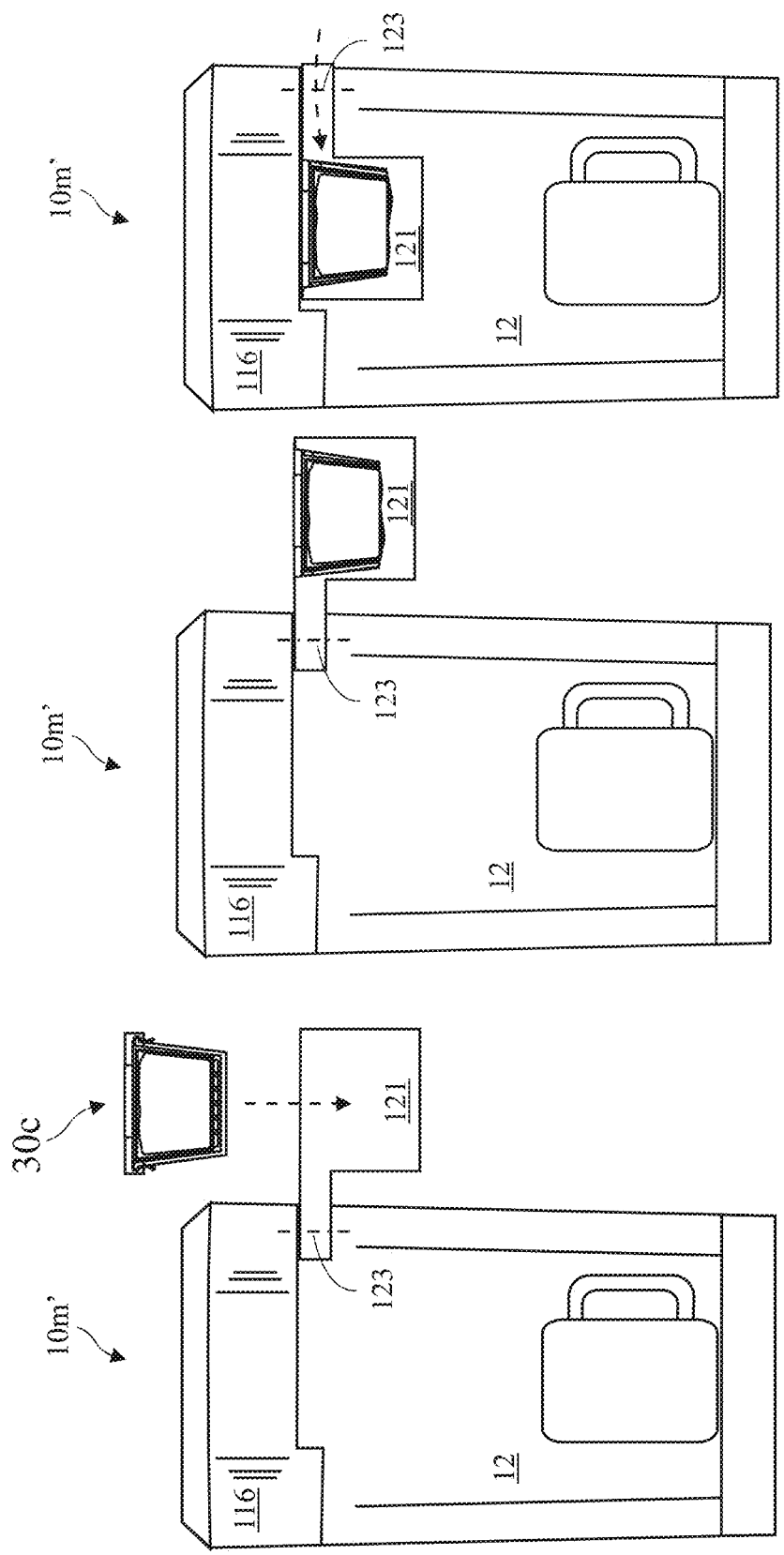

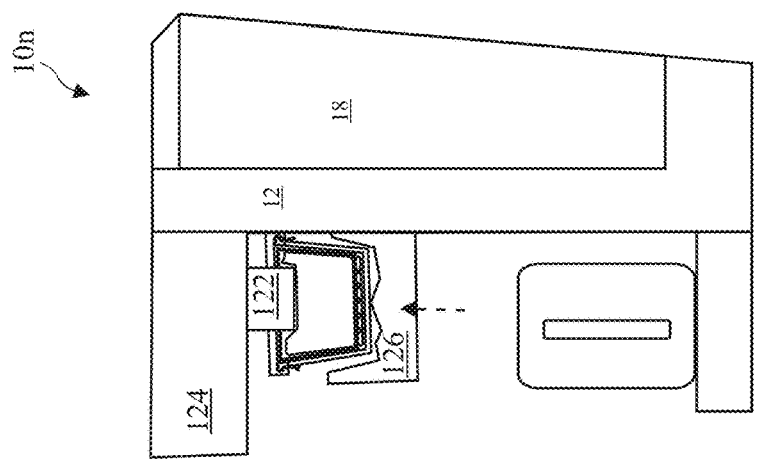
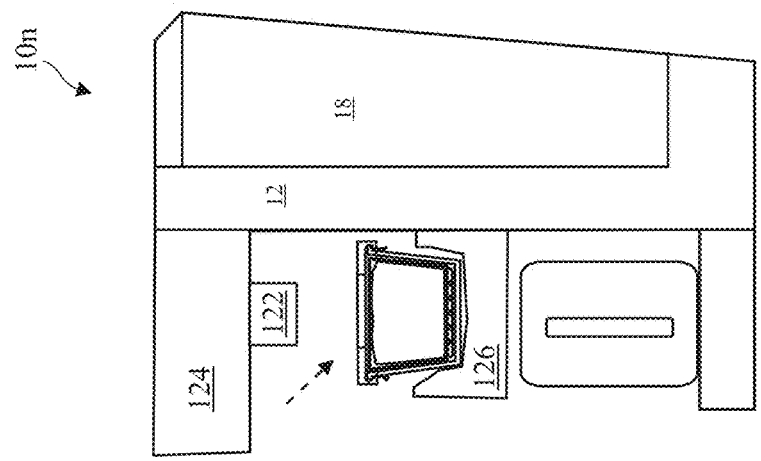
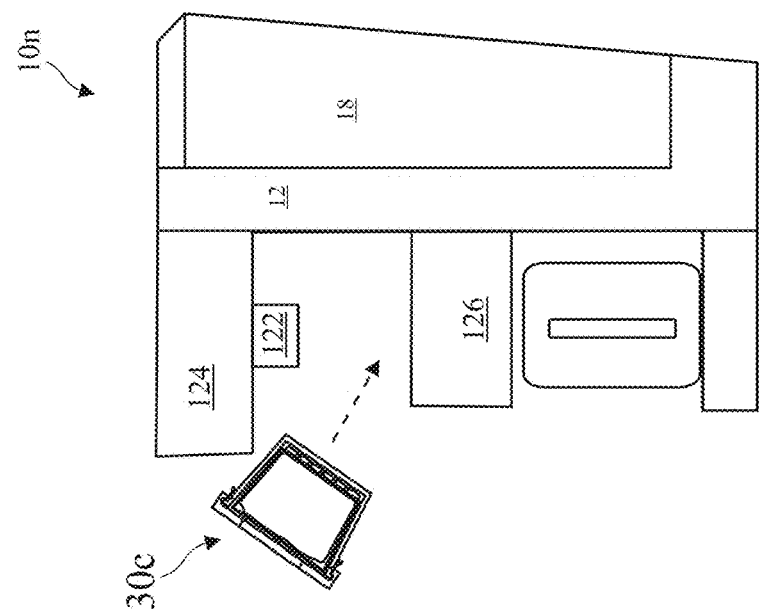

COFFEE HOLDER AND COFFEE MAKER COMBINATION FOR TAMPING COFFEE

The present application is a Continuation In Part of U.S. patent application Ser. No. 12/610,181 filed Oct. 30, 2009, and U.S. patent application Ser. No. 12/620,584 filed Nov. 17, 2009, and of U.S. patent application Ser. No. 12/762,262 filed Apr. 16, 2010, which applications are incorporated in their entirety herein by reference.

BACKGROUND OF THE INVENTION

The present invention relates to coffee makers and in particular to a coffee maker utilizing a stream of hot water through tamped ground coffee.

Coffee is generally prepared in a coffee maker by measuring an amount of ground coffee into a coffee filter, closing a lid over the ground coffee, and providing a stream of hot water through the loosely packed ground coffee. Unfortunately, water passes freely through the loosely packed ground coffee and does not obtain the full flavor which might otherwise be obtained.

U.S. patent application Ser. No. 12/610,181 filed Oct. 30, 2009 for "Self Tamping Coffee Holder" filed by the present applicant further discloses a coffee making apparatus and methods which provide a tamped packing of loose ground coffee thereby obtaining richer flavor. The coffee maker includes a reservoir, a pump, a heater, and a check valve. Coffee grounds are first loosely deposited in a coffee holder and then tamped onto a compacted state. The coffee holder may be filled loosely with the coffee and then placed into the coffee making apparatus and compacted, or the coffee may be compacted in the coffee holder and then the coffee holder placed into the coffee making apparatus. The compacting may be by a spring or by a resilient solid material and may be part of the coffee holder or part of the coffee making apparatus.

Further, U.S. patent application Ser. No. 12/620,584 filed Nov. 17, 2009 for "Self Tamping Coffee Holder" filed by the present applicant further discloses a self-tamping coffee holder which tamps loose ground coffee obtaining richer flavor. The coffee holder includes a holder base and a holder cap. Coffee is loosely deposited in the coffee holder and the holder cap is attached to the holder base. An internal filter chamber holds the coffee and allows tamping of the coffee into a compacted state. The filter chamber may be formed by a fixed filter or by a removable filter constructed of filter paper, nylon mesh, metal mesh, or any material capable of holding the coffee while allowing a flow of heated water through the coffee. The tamping may be by a spring or by a resilient solid material attached to the coffee holder and may push the coffee down inside the filter or push the filter and the coffee up against the holder lid. While the '181 and '584 applications disclose tamping coffee, they do not disclose a variety of embodiments of cooperating coffee holders and coffee makers for tamping.

BRIEF SUMMARY OF THE INVENTION

The present invention addresses the above and other needs by providing a coffee maker and coffee holder which cooperate to tamp coffee in the coffee holder. The coffee holder may include a top tamping spring, a bottom tamping spring, or a top or bottom passage allowing entry of a tamper into the coffee holder. The coffee maker includes an actuator above or below the coffee holder, or a fixed tamper attached to a ceiling or platform of the coffee maker. The coffee holder may be inserted between the ceiling and platform, or into a moving drawer of the coffee maker. The actuator may be a solenoid actuator, or a hydraulic actuator actuated by water pressure of heated water used for brewing.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a front view of a coffee maker according to the present invention.

FIG. 1B is a side view of the coffee maker according to the present invention.

FIG. 1C is a top view of the coffee maker according to the present invention.

FIG. 8A shows the first coffee holder ready for insertion into the coffee maker.

FIG. 8B shows the first coffee holder inserted into the coffee maker before tamping the coffee.

FIG. 8C shows the first coffee holder inserted into the coffee maker after tamping the coffee.

FIG. 14A shows the second coffee holder ready for insertion into the coffee maker.

FIG. 14B shows the second coffee holder inserted into the coffee maker before tamping the coffee.

FIG. 14C shows the second coffee holder inserted into the coffee maker after tamping the coffee.

FIG. 24 is a side view of a fifth coffee holder according to the present invention.

FIG. 25 is a cross-sectional side view of the fifth coffee holder according to the present invention taken along line 25-25 of FIG. 24.

FIG. 26A is a cross-sectional side view of the fifth coffee holder according to the present invention taken along line 25-25 of FIG. 24 showing the portion of coffee above the coffee holder body, and the holder lid with the top tamper and tamping spring, ready to attach to the coffee holder body, according to the present invention.

FIG. 26B is a cross-sectional side view of the fifth coffee holder according to the present invention taken along line 25-25 of FIG. 24 showing the coffee holder with the portion of coffee in the coffee holder, and the holder lid with the top tamper and tamping spring ready to attach to the coffee holder body, according to the present invention.

FIG. 26C is a cross-sectional side view of the fifth coffee holder according to the present invention taken along line 25-25 of FIG. 24 showing the portion of coffee in the coffee holder, and the holder lid with the top tamper and tamping spring attached to the holder body, according to the present invention.

FIG. 37A shows a third coffee maker having a coffee holder for receiving a portion of coffee and tamping spring according to the present invention for tamping the coffee when the coffee maker lid is closed.

FIG. 37B shows the third coffee maker with the coffee holder holding the portion of coffee and the tamping spring under the coffee holder according to the present invention for tamping the coffee when the coffee maker lid is closed.

FIG. 37C shows the third coffee maker with the coffee holder holding the portion of tamped coffee with the coffee maker lid closed for tamping the coffee according to the present invention.

FIG. 39A shows a fourth coffee maker having a coffee holder for receiving a packet containing untamped coffee, a knife for cutting the packet open, and tamping spring attached to the coffee maker lid according to the present invention for tamping the coffee when the coffee maker lid is closed.

FIG. 39B shows the fourth coffee maker with the coffee holder holding the packet of untamped coffee according to the present invention for tamping the coffee when the coffee maker lid is closed.

FIG. 39C shows the fourth coffee maker with the coffee holder holding the packet of tamped coffee with the coffee maker lid closed to push the tamping spring into the coffee holder for tamping the coffee according to the present invention.

FIG. 41 is a side view of a tenth coffee holder with straight walls according to the present invention.

FIG. 42 is a cross-sectional view of the tenth coffee holder taken along line 42-42 of FIG. 41 showing an empty coffee holder.

FIG. 43 is a cross-sectional view of the tenth coffee holder taken along line 42-42 of FIG. 41 showing a full and tamped coffee holder.

FIG. 44 is a side view of an eleventh coffee holder with straight walls according to the present invention.

FIG. 45 is a cross-sectional view of the eleventh coffee holder taken along line 45-45 of FIG. 44 showing an empty coffee holder.

FIG. 46 is a cross-sectional view of the eleventh coffee holder taken along line 45-45 of FIG. 41 showing a full and tamped coffee holder.

FIG. 47A is a side view of a top tamper.

FIG. 47B is a top view of the top tamper.

FIG. 47C is a side view of a top tamper with a seal according to the present invention.

FIG. 47D is a top view of the top tamper with a seal.

FIG. 48 is a perspective view of a filter paper cup with a folding cup lid.

FIG. 49 is a side view of an twelfth coffee holder with straight walls according to the present invention.

FIG. 50 is a cross-sectional view of the twelfth coffee holder taken along line 50-50 of FIG. 49 showing an empty coffee holder.

FIG. 51A is a cross-sectional view of the twelfth coffee holder taken along line 50-50 of FIG. 49 showing a lid, coffee, a filter paper cup, above the base, and the coffee holder base.

FIG. 51B is a cross-sectional view of the twelfth coffee holder taken along line 50-50 of FIG. 49 showing the lid, above the coffee and the filter paper cup resting in the coffee holder base.

FIG. 51C is a cross-sectional view of the twelfth coffee holder taken along line 50-50 of FIG. 49 showing the lid, above the coffee and the filter paper cup resting in the coffee holder base with a filter paper cover folded over the coffee in the filter paper cup.

FIG. 51D is a cross-sectional view of the twelfth coffee holder taken along line 50-50 of FIG. 49 showing the lid attached to the base with the coffee and the filter paper cup residing in the coffee holder base with the coffee tamped.

FIGS. 63A-63C show a ramped lower shelf embodiment of the coffee holder with a bottom tamping spring and coffee maker according to the present invention.

FIGS. 64A-64C show a ramped lower shelf embodiment of the coffee holder with a top tamping spring and coffee maker according to the present invention.

FIGS. 65A-65C show a springed lower shelf embodiment of the coffee holder with a bottom tamping spring and coffee maker according to the present invention.

FIGS. 66A-66C show a springed lower shelf embodiment of the coffee holder with a top tamping spring and coffee maker according to the present invention.

FIGS. 67A-67C show a ramped ceiling embodiment of the coffee holder with a bottom tamping spring and coffee maker according to the present invention.

FIGS. 68A-68C show a ramped ceiling embodiment of the coffee holder with a top tamping spring and coffee maker according to the present invention.

FIGS. 69A-69C show a springed ceiling embodiment of the coffee holder with a bottom tamping spring and coffee maker according to the present invention.

FIGS. 70A-70C show a springed ceiling embodiment of the coffee holder with a top tamping spring and coffee maker according to the present invention.

FIGS. 71A-71C show a bottom solenoid embodiment of the coffee holder with a bottom tamping spring and coffee maker according to the present invention.

FIGS. 72A-72C show a bottom solenoid embodiment of the coffee holder with a top tamping spring and coffee maker according to the present invention.

FIGS. 73A-73C show a top solenoid embodiment of the coffee holder with a bottom tamping spring and coffee maker according to the present invention.

FIGS. 74A-74C show a top solenoid embodiment of the coffee holder with a top tamping spring and coffee maker according to the present invention.

Figure 75C:
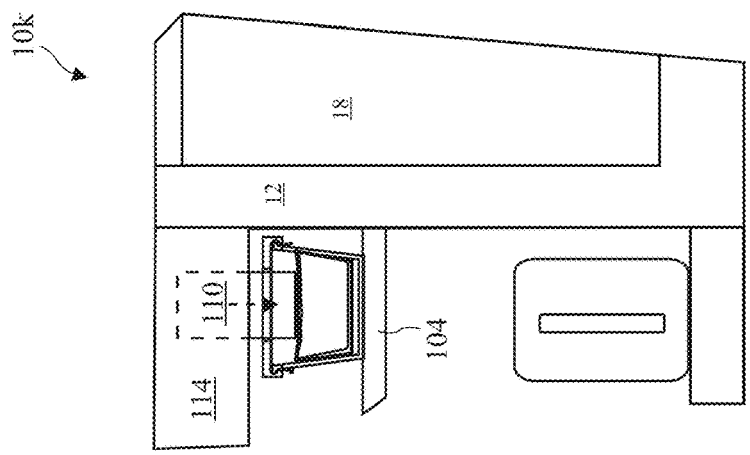
Figure 75B:
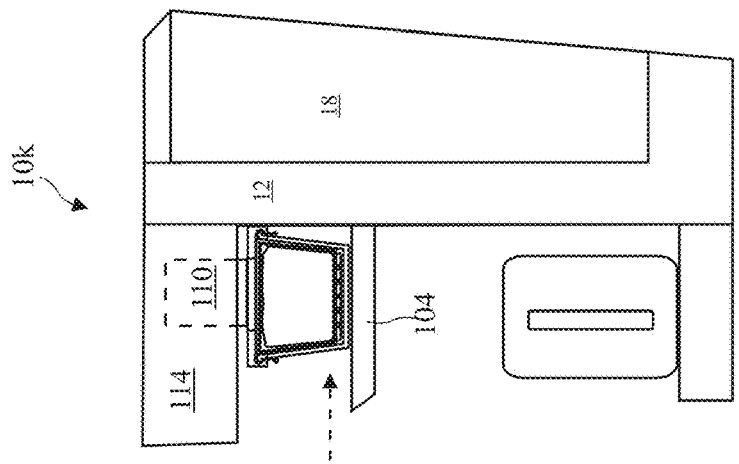
Figure 75A:
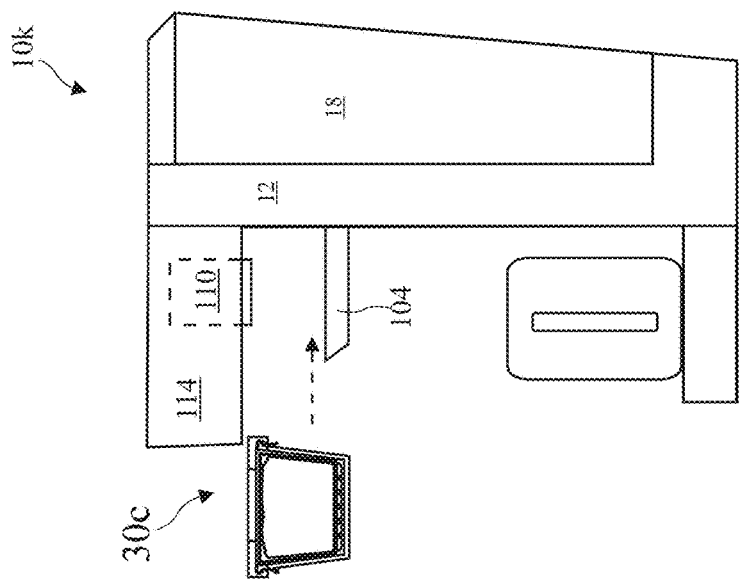

FIGS. 75A-75C show a top solenoid embodiment of the coffee holder and coffee maker wherein the top solenoid presses a tamper into the top of the coffee holder according to the present invention.

Figure 76C:
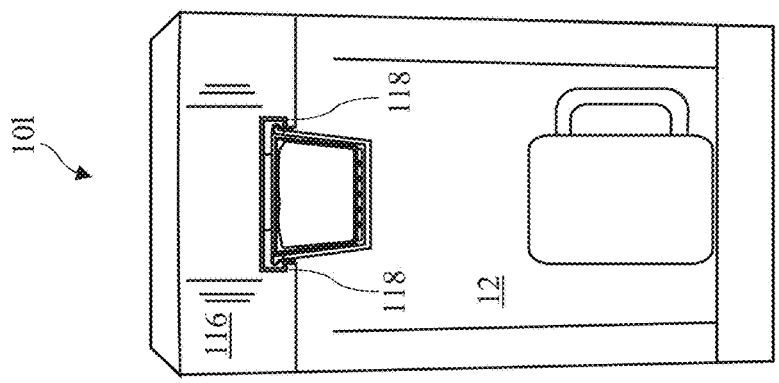
Figure 76B:
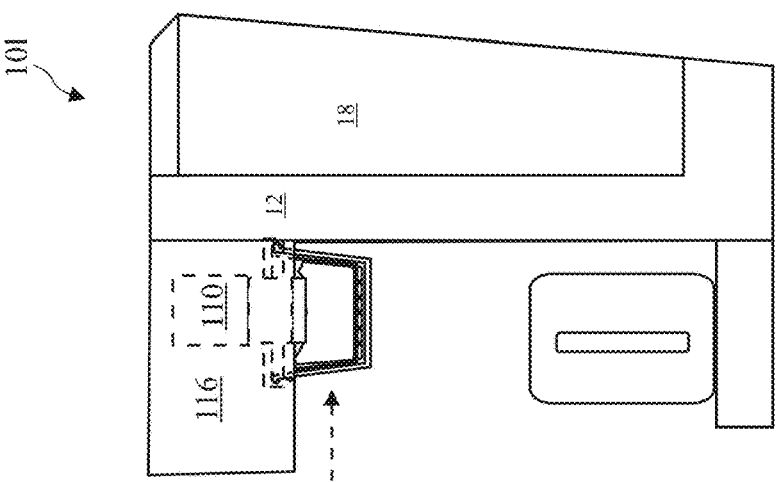
Figure 76A:
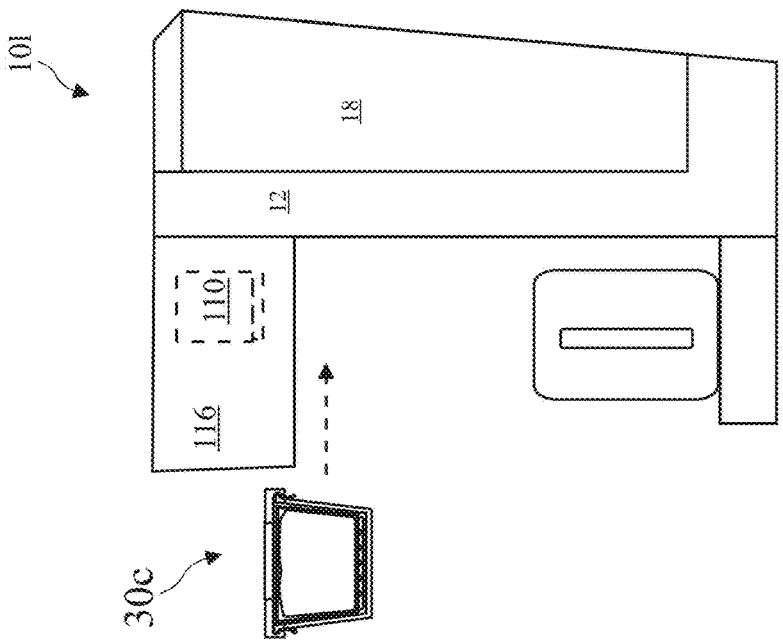

FIGS. 76A-76C show a top solenoid embodiment of the coffee holder and coffee maker wherein a top rim of the holder engages rails in the coffee maker and a top solenoid presses a tamper into the top of the coffee holder according to the present invention.

FIGS. 77A-77C show a top solenoid embodiment of the coffee holder and coffee maker wherein the holder is placed into a drawer of the coffee maker, the drawer slides into a closed position, and a top solenoid presses a tamper into the top of the coffee holder according to the present invention.

FIGS. 78A-78C show a top solenoid embodiment of the coffee holder and coffee maker wherein the holder is placed into a drawer of the coffee maker, the drawer is pivoted into a closed position, and a top solenoid presses a tamper into the top of the coffee holder according to the present invention.

FIGS. 79A-79C show a top solenoid embodiment of the coffee holder and coffee maker wherein the holder is placed on a platform of the coffee maker, the platform is raised, and a top solenoid presses a tamper into the top of the coffee holder according to the present invention.

Figure 80C:
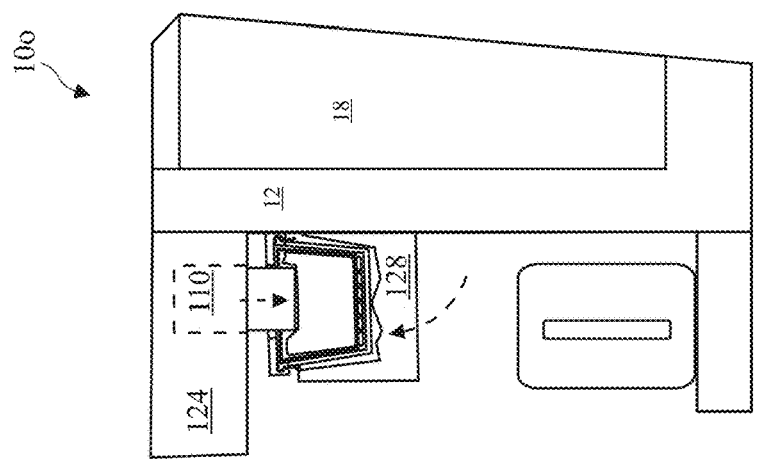
Figure 80B:
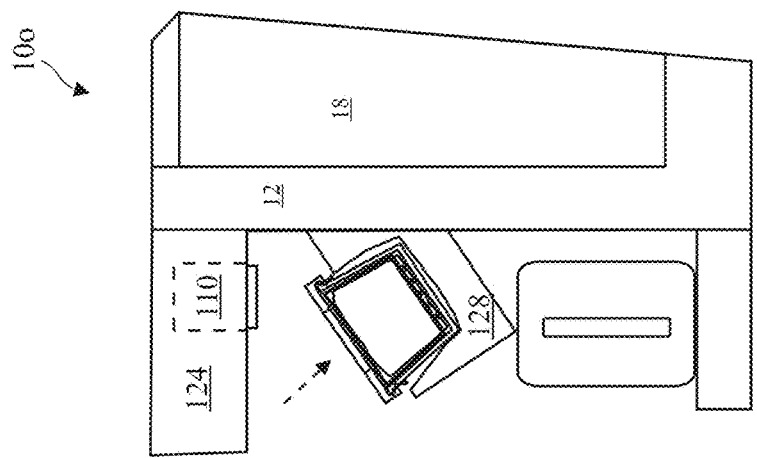
Figure 80A:
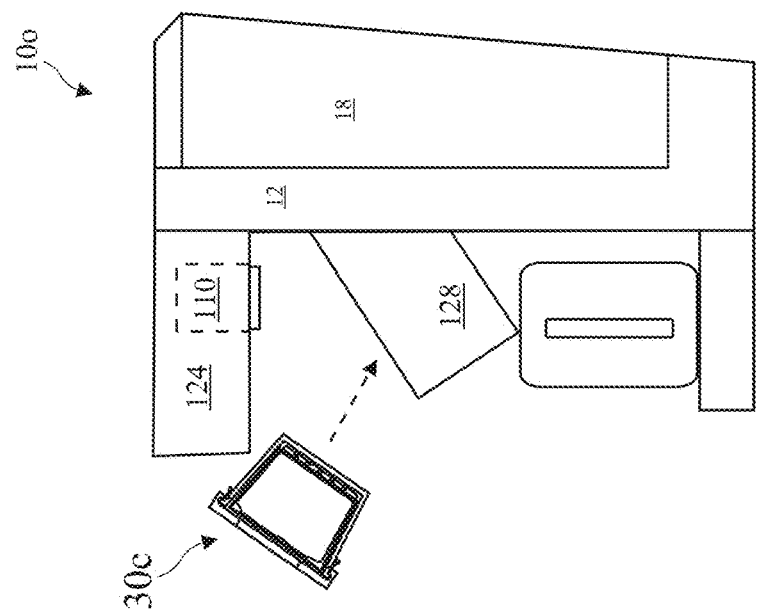

FIGS. 80A-80C show a top solenoid embodiment of the coffee holder and coffee maker wherein the holder is placed on a platform of the coffee maker, the platform is pivoted upward, and a top solenoid presses a tamper into the top of the coffee holder according to the present invention.

Figure 81C:
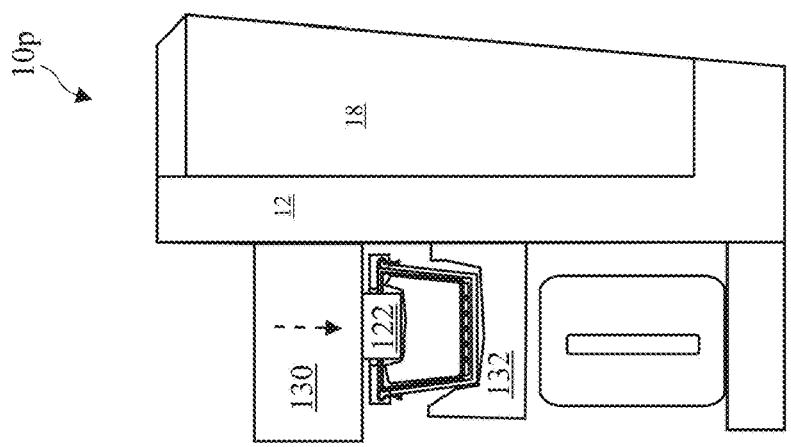
Figure 81B:
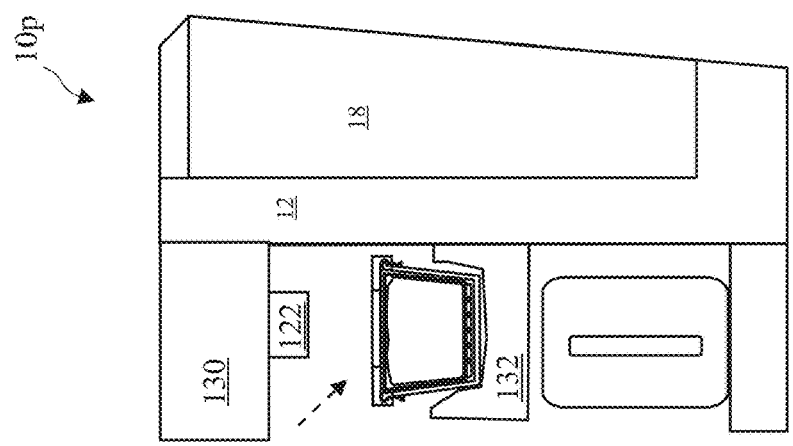
Figure 81A:
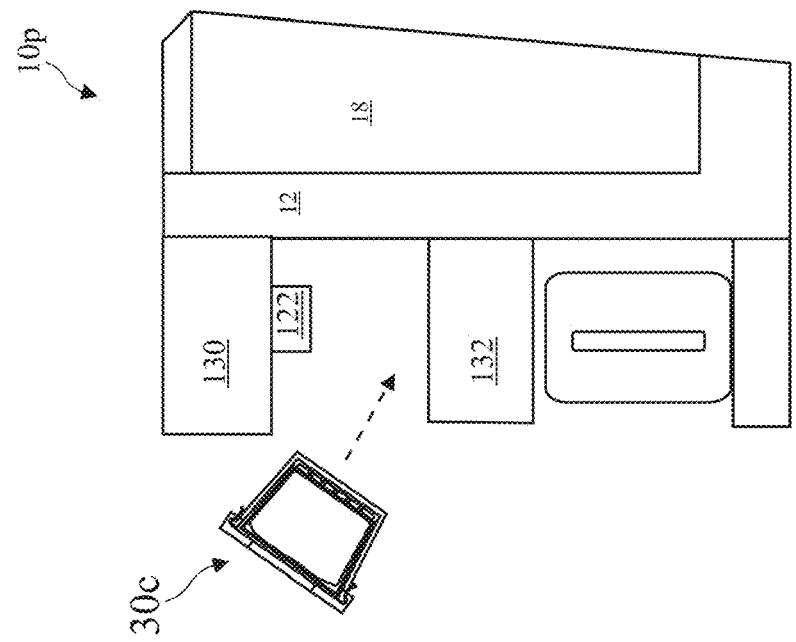

FIGS. 81A-81C show a top solenoid embodiment of the coffee holder and coffee maker wherein the holder is placed on a platform of the coffee maker, a ceiling is lowered, and a tamper attached to the ceiling is pressed into the top of the coffee holder according to the present invention.

Figure 82:
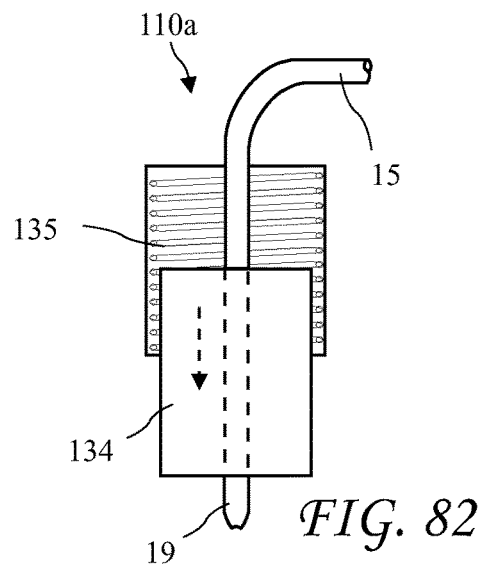

FIG. 82 shows a solenoid according to the present invention.

Figure 83:
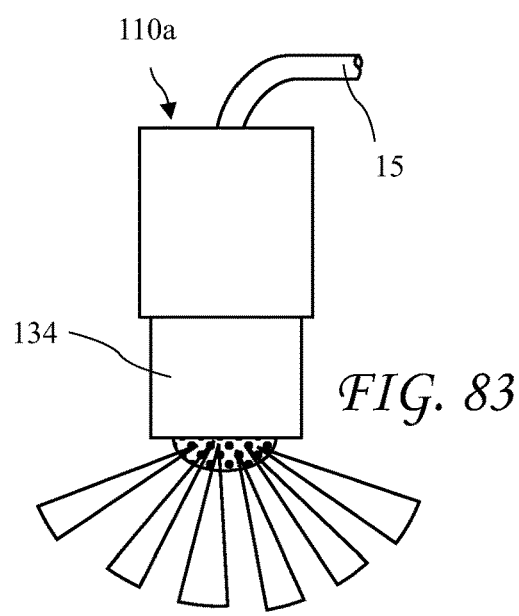

FIG. 83 shows a solenoid with a spray stream head according to the present invention.

Figure 84A:
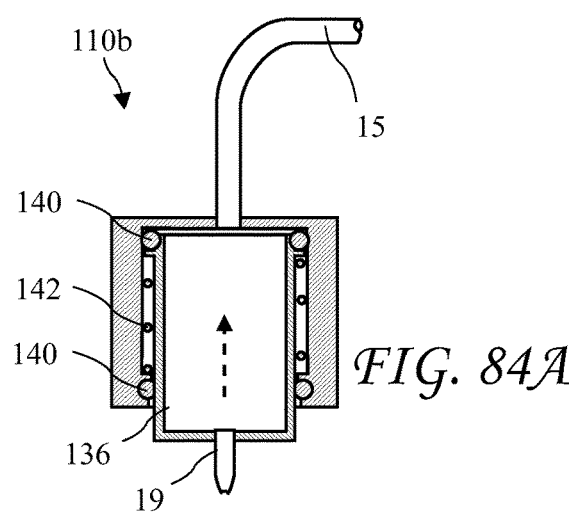

FIG. 84A shows a water pressure actuated tamper according to the present invention in an initial position.

Figure 84B:
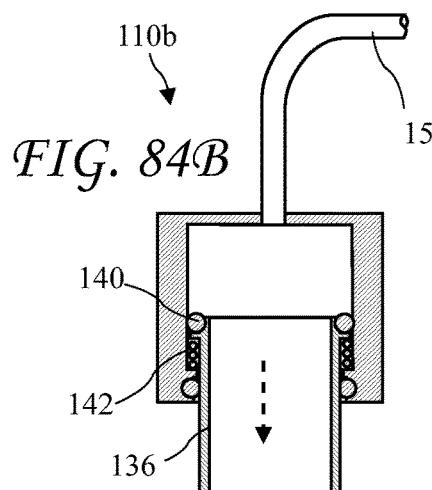

FIG. 84B shows the water pressure actuated tamper according to the present invention in a downward extended tamping position.

Figure 85A:
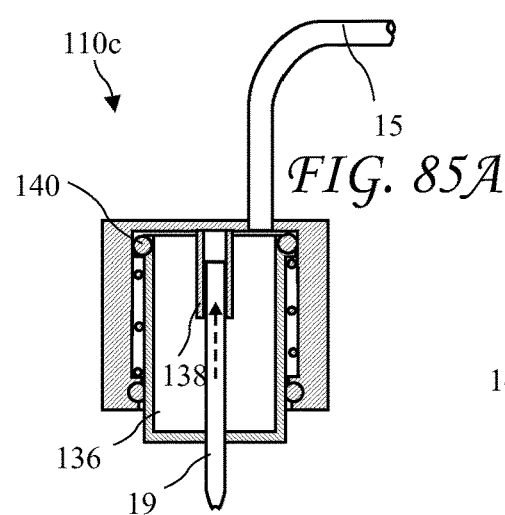

FIG. 85A shows a second water pressure actuated tamper having an anti-leak feature according to the present invention in an initial position.

Figure 85B:
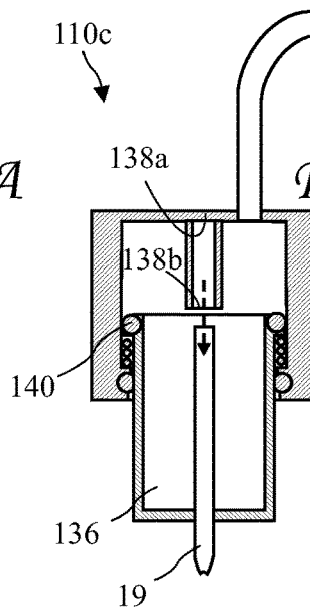

FIG. 85B shows the second water pressure actuated tamper having an anti-leak feature according to the present invention in a downward extended tamping position.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A front view of a coffee 10 maker according to the present invention is shown in FIG. 1A a side view of the coffee maker 10 is shown in FIG. 1B, and a top view of the coffee maker 10 is shown in FIG. 1C. The coffee maker 10 includes a body 12, an opening lid 14, a lid handle 16, a water container 18, a display 20, controls 22, a platform 24 and a mouth 12a. A coffee pitcher 26 rests on the platform 24 inside the mouth 12a and has a pitcher lid 28. The coffee maker 10 provides a flow of hot water through coffee grounds to produce a coffee drink. The flow of water may be heated by one of any known means, for example, an electrical heating coil or a conductive coating on tubing carrying the water.

Figure 2A:
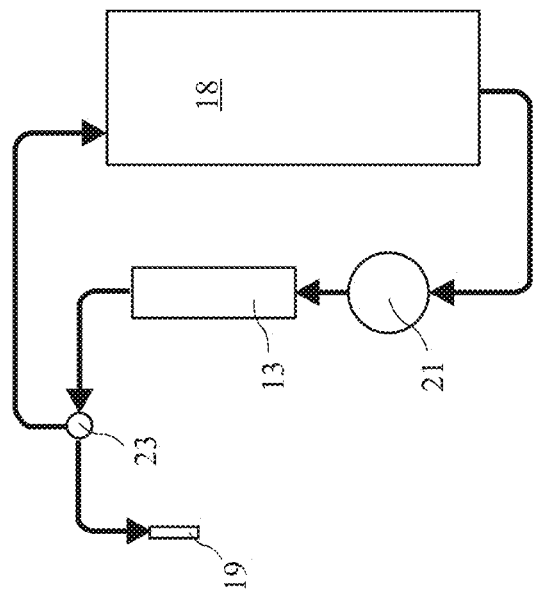
FIG. 2A is a functional diagram of the coffee maker.
Figure 2:
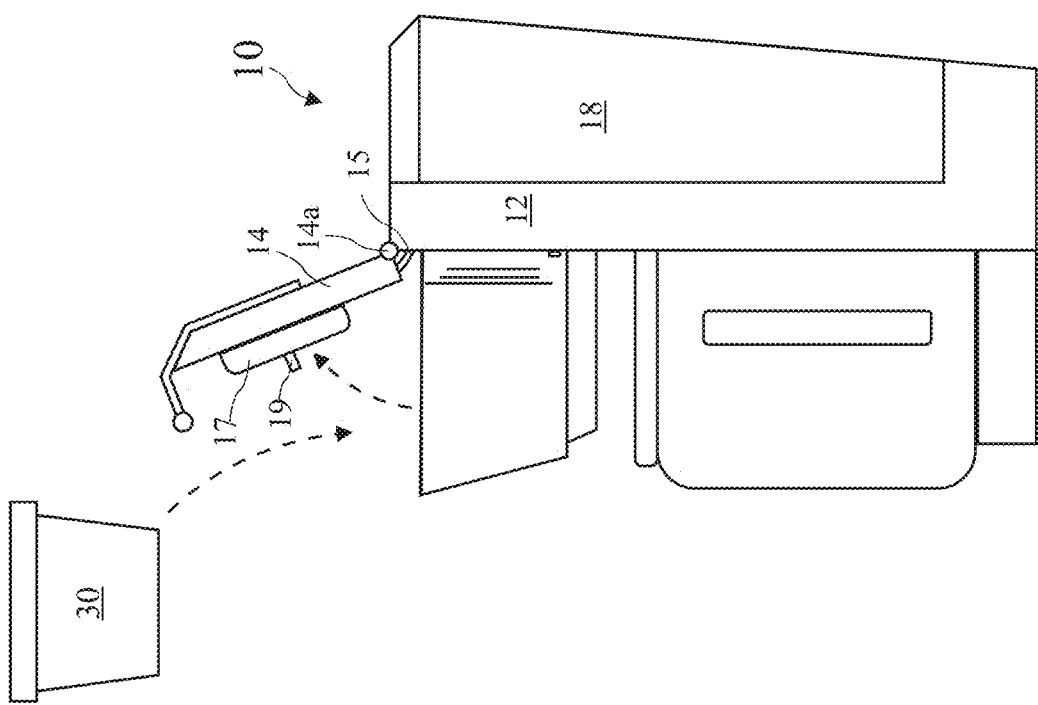
FIG. 2 is a side view of the coffee maker with an open lid allowing placement of a coffee holder according to the present invention inside the coffee maker.

A side view of the coffee maker 10 with an open lid 14 allowing placement of a coffee holder 30 according to the present invention inside the coffee maker 10 is shown in FIG. 2. The lid 14 includes a lid hinge 14a and a water tube 15 carries heated water into the lid 14. A pad 17 resides on a bottom surface of the lid 14 and presses against the coffee holder 30 when the lid 14 is closed, and in cooperation with other means discloses hereafter, tamps coffee contained in the coffee holder 30. A nozzle 19 extending down from the closed lid 14 directs the flow of hot water into the coffee holder 30.

A functional diagram of the coffee maker 10 is shown in FIG. 2A. The preferred coffee maker 10 includes the water tank 18, water pump 21, a heater 13, check valve 23 and the nozzle 18. The pump 21 preferably provides at least one PSI water pressure. The water heater 13 may include a heating coil or a resistive coating or any other means for heating water. The check valve 23 limits the water pressure at the nozzle 19 by returning some of the water flow to the water tank 18. While a the water pump 21 is a preferred method for providing a flow of water to the nozzle 19, other methods include pressuring the water in the water tank 18, and a coffee maker using any means to provide a forced flow of water is intending to within the scope of the present invention.

Figure 3:
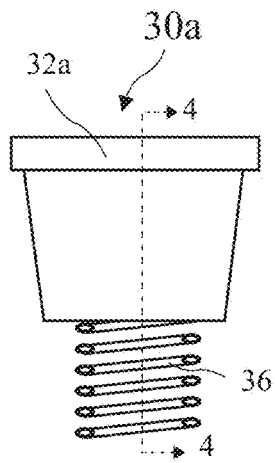
FIG. 3 is a side view of a first coffee holder according to the present invention.
Figure 4:
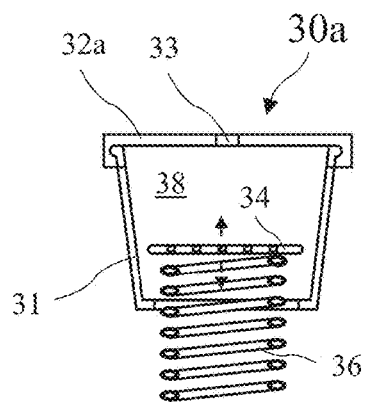
FIG. 4 is a cross-sectional side view of the first coffee holder according to the present invention taken along line 4-4 of FIG. 3.

A side view of a first coffee holder 30a according to the present invention is shown in FIG. 3 and a cross-sectional side view of the first coffee holder 30a including a holder body 31, a first holder lid 32a, a bottom tamper 34, and a tamping spring 36 according to the present invention taken along line 4-4 of FIG. 3 is shown in FIG. 4. A volume (or coffee holder interior) 38 is provided inside the coffee holder 30a to receive loose coffee 41. A passage 33 in the lid 32a is provided for the nozzle 19 (see FIG. 2).

Figure 5A:
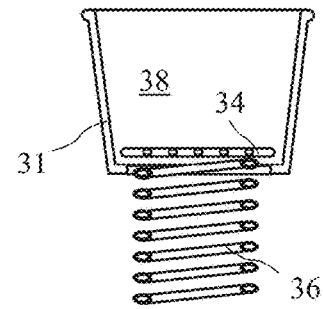
FIG. 5A is a cross-sectional side view of the first coffee holder according to the present invention taken along line 4-4 of FIG. 3 showing an empty coffee holder with the tamping spring and the bottom tamper according to the present invention.
Figure 5B:
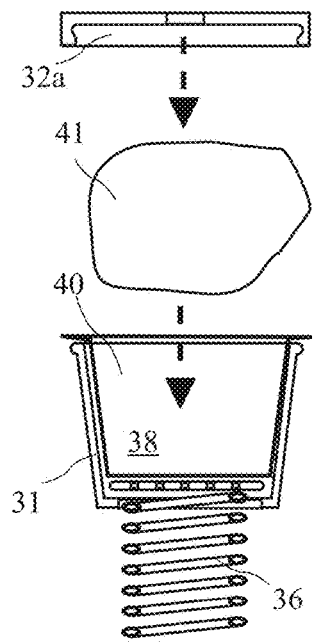
FIG. 5B is a cross-sectional side view of the first coffee holder according to the present invention taken along line 4-4 of FIG. 3 showing the coffee holder with the tamping spring and bottom tamper, a portion of coffee, and the holder lid ready to attach to a holder body according to the present invention.
Figure 5C:
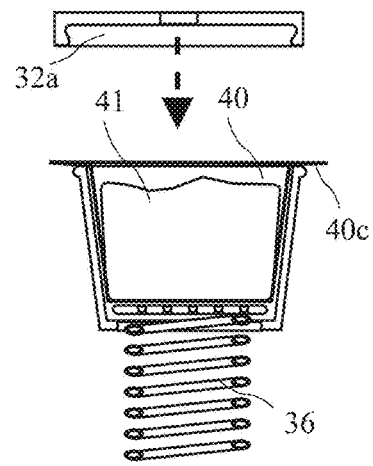
FIG. 5C is a cross-sectional side view of the first coffee holder according to the present invention taken along line 4-4 of FIG. 3 showing the coffee holder with the tamping spring and bottom tamper, the portion of coffee in the coffee holder, and the holder lid ready to attach to the holder body according to the present invention.
Figure 5D:
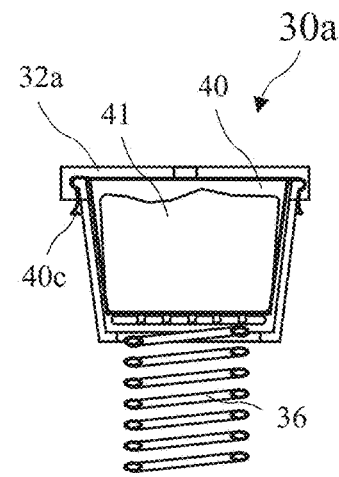
FIG. 5D is a cross-sectional side view of the first coffee holder according to the present invention taken along line 4-4 of FIG. 3 showing the coffee holder with the tamping spring and bottom tamper, the portion of coffee in the coffee holder, and the holder lid attached to the coffee holder body, according to the present invention.

A cross-sectional side view of the first coffee holder 30a taken along line 4-4 of FIG. 3 showing an empty coffee holder 30a with the tamping spring 36 and the bottom tamper 34 ready for filling are shown in FIG. 5A. A cross-sectional side view of the first coffee holder 30a taken along line 4-4 of FIG. 3 showing the coffee holder 30a with the tamping spring 36 and bottom tamper 34, a portion of loose coffee 41, and the holder lid 32a ready to attach is shown in FIG. 5B. A cross-sectional side view of the first coffee holder 30a taken along line 4-4 of FIG. 3 showing the coffee holder 30a with the tamping spring 36 and bottom tamper 34, a portion of coffee in the volume 38, and the holder lid 32a ready to attach is shown in FIG. 5C. A cross-sectional side view of the first coffee holder 30a taken along line 4-4 of FIG. 3 showing the coffee holder 30a with the tamping spring 36 and bottom tamper 34, a portion of loose coffee 41 in the volume 38, and the holder lid 32a attached to the coffee holder 30a, is shown in FIG. 5D.

Figure 6:
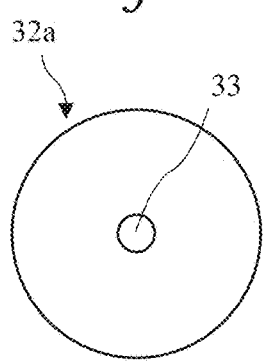
FIG. 6 is a top view of the first holder lid.

A top view of the first holder lid 32a showing the passage 33 provided for the nozzle 19 (see FIG. 2) is shown in FIG. 6.

Figure 7A:
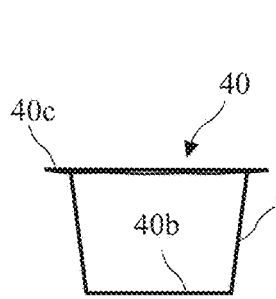
FIG. 7A is a side view of a filter paper cup according to the present invention.
Figure 7B:
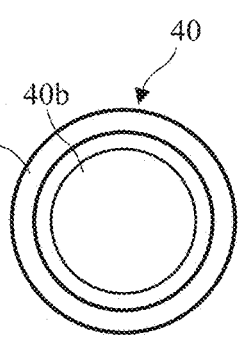
FIG. 7B is a top view of the filter paper cup according to the present invention.

A side view of a filter paper cup 40 according to the present invention is shown in FIG. 7A and a top view of the filter paper cup 40 is shown in FIG. 7B. The filter paper cup 40 includes a bottom 40b, sides 40a, and a rim 40c. The rim 40c rests on a top edge of the holder body 31 and is held between the holder cap and body when the cap is placed on the body, thereby preventing or restricting the escape of coffee 41 from the cup 40 when hot water flows into the coffee holder 30a.

Figure 7C:
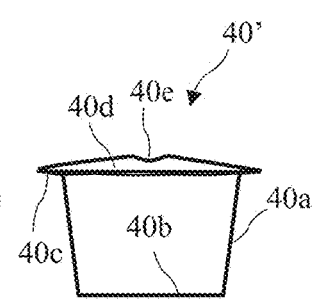
FIG. 7C is a second embodiment of the filter paper cup with a lid.

A second embodiment of the filter paper cup 40' with a folding paper lid 40d is shown in FIG. 7C. The lid 40d of the filter paper cup 40' may be folded over the cup 40' after loose coffee is poured into the cup. The lid 40d preferably includes a perforation 40e centered on the lid 40d allowing the nozzle 19 to enter and/or inject the hot flow of water into the tamped coffee 41.

The filter cups may be made from several materials including filter paper, nylon mesh, steel mesh, or any material suitable for filtration.

The first coffee holder 30a is shown ready for insertion into a first coffee maker 10a in FIG. 8A, the first coffee holder 30a is shown inserted into the coffee maker 10 before tamping the coffee 41 in FIG. 8B, and the first coffee holder 30a is shown in the coffee maker 10 after tamping the coffee 41 in FIG. 8C. The coffee maker includes a cavity 11 for accepting the coffee holder and has walls 11a for aligning the coffee holder in the coffee maker. When the lid 14 is closed, the pad 17 on the bottom of the lid 14 and/or arms 25 attached to the bottom of the lid 25, push the coffee holder 30a down over the tamping spring 36 and the coffee 41 is tamped between the lid 32a and the bottom tamper 34. The arms 25 push the coffee holder 30a down ahead of the nozzle 19 thereby seating the coffee holder 30a in the cavity 11 for alignment of the nozzle 10 with the passage 33 in the lid 32a.

Figure 9:
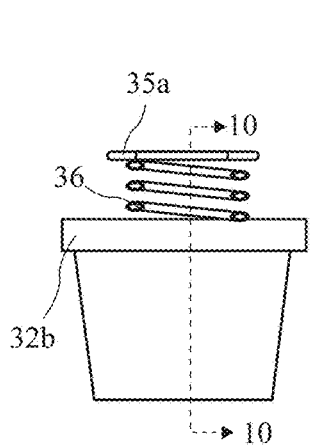
FIG. 9 is a side view of a second coffee holder according to the present invention.
Figure 10:
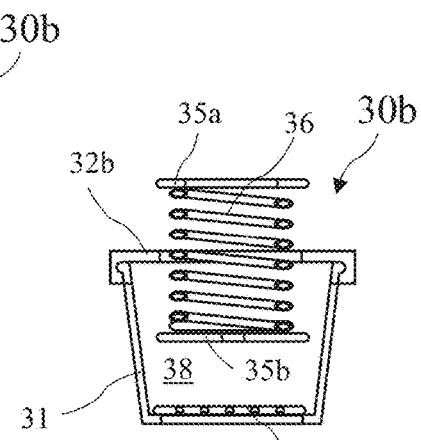
FIG. 10 is a cross-sectional side view of the second coffee holder according to the present invention taken along line 10-10 of FIG. 9.

A side view of a second coffee holder 30b according to the present invention is shown in FIG. 9 and a cross-sectional side view of the second coffee holder 30b taken along line 10-10 of FIG. 9 is shown in FIG. 10. The coffee holder 30b includes the holder body 31, a second holder lid 32b, a tamping spring 36, a spring washer 35a, and a top tamper 35b.

Figure 11A:
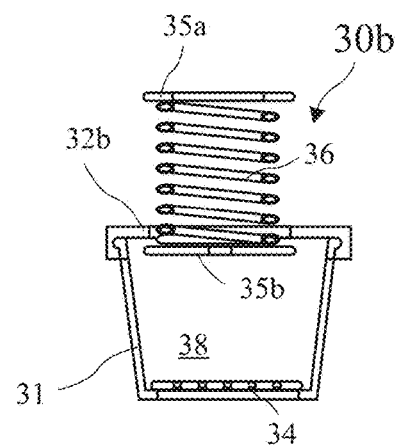
FIG. 11A is a cross-sectional side view of the second coffee holder according to the present invention taken along line 10-10 of FIG. 9 showing an empty coffee holder with the tamping spring and the top tamper according to the present invention.
Figure 11B:
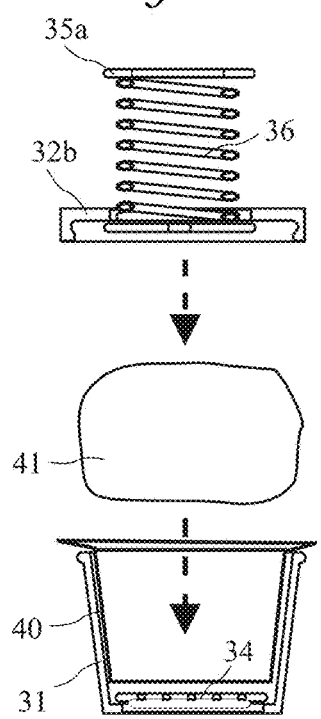
FIG. 11B is a cross-sectional side view of the second coffee holder according to the present invention taken along line 10-10 of FIG. 9 showing the coffee holder with the holder lid, tamping spring and top tamper, and a portion of coffee, ready to attach according to the present invention.
Figure 11C:
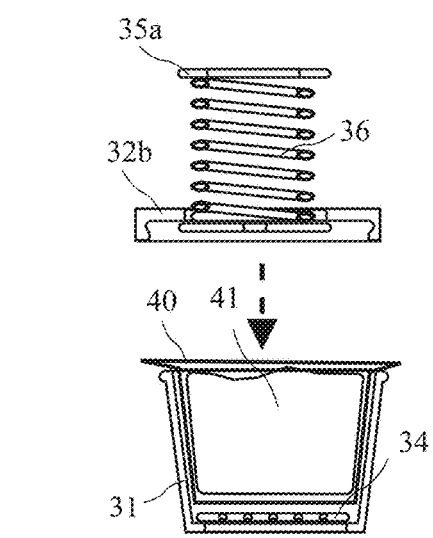
FIG. 11C is a cross-sectional side view of the second coffee holder according to the present invention taken along line 10-10 of FIG. 9 showing the portion of untamped coffee in the coffee holder, and the holder lid, tamping spring and top tamper, ready to attach to the holder base, according to the present invention.
Figure 11D:
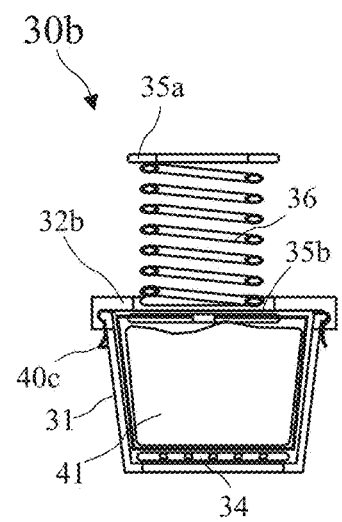
FIG. 11D is a cross-sectional side view of the second coffee holder according to the present invention taken along line 10-10 of FIG. 9 showing the portion of coffee in the coffee holder and the tamping spring, top tamper, and the holder lid attached to the coffee holder, according to the present invention.

A cross-sectional side view of the second coffee holder 30b taken along line 10-10 of FIG. 9 showing an empty coffee holder 30b is shown in FIG. 11A. A cross-sectional side view of the second coffee holder 30b taken along line 10-10 of FIG. 9 showing the holder lid 32b and a loose portion of coffee 41 above the empty coffee holder 30b is shown in FIG. 11B. A cross-sectional side view of the second coffee holder 30b taken along line 10-10 of FIG. 9 showing the holder lid 32b above the coffee holder 30b with the portion of loose coffee 41 in the coffee holder 32b is shown in FIG. 11C. A cross-sectional side view of the second coffee holder 32b taken along line 10-10 of FIG. 9 showing the coffee holder with the holder lid 32b attached to the coffee holder 30b and a portion of loose coffee 41 in the coffee holder 30b is shown in FIG. 11D. The tamping spring 36 extends upward out of the coffee holder 30b for tamping the loose coffee as disclosed hereafter.

Figure 12:
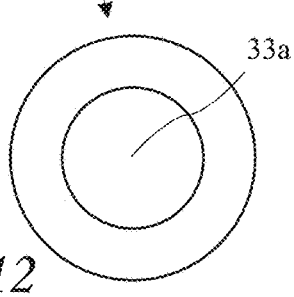
FIG. 12 is a top view of the second holder lid.

A top view of the second holder lid 32b is shown in FIG. 12. The holder lid 32b includes a larger passage 33a allowing passage of the tamping spring 36 through the holder lid 32b.

Figure 13:
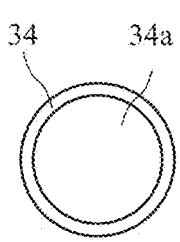
FIG. 13 is a top view of the bottom tamper.

A top view of the bottom tamper 34 is shown in FIG. 13. The bottom tamper 34 includes perforations 34a to allow coffee drink to pass through the bottom tamper 34.

The second coffee holder 30b is shown ready for insertion into the coffee maker 10 in FIG. 14A, the second coffee holder 30b is shown inserted into the coffee maker 10 before tamping the coffee 41 in FIG. 14B, and the second coffee holder 30b is shown in the coffee maker 10 after tamping the coffee 41 in FIG. 14C. The coffee maker 10 may include a long nozzle 19a to reach the top tamper 35b for "injection" of the heated water into the tamped coffee, but may also include the nozzle 19 and the heated water may pass through the coffee 41 under the pull of gravity.

Figure 15:
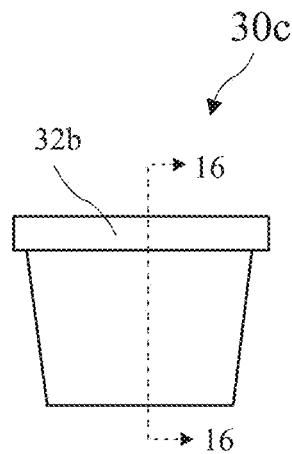
FIG. 15 is a side view of a third coffee holder according to the present invention.
Figure 16:
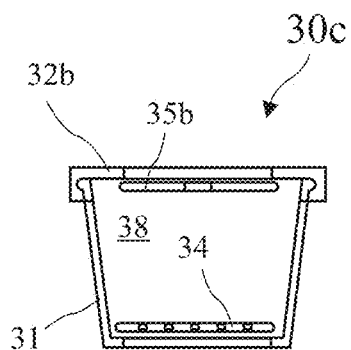
FIG. 16 is a cross-sectional side view of the third coffee holder according to the present invention taken along line 16-16 of FIG. 15.

A side view of a third coffee holder 30c according to the present invention is shown in FIG. 16 and a cross-sectional side view of the third coffee holder 30c taken along line 16-16 of FIG. 15 is shown in FIG. 16. The coffee holder 30c includes the holder body 31, the second holder lid 32b, the bottom tamper 34, and the top tamper 35b.

Figure 17A:
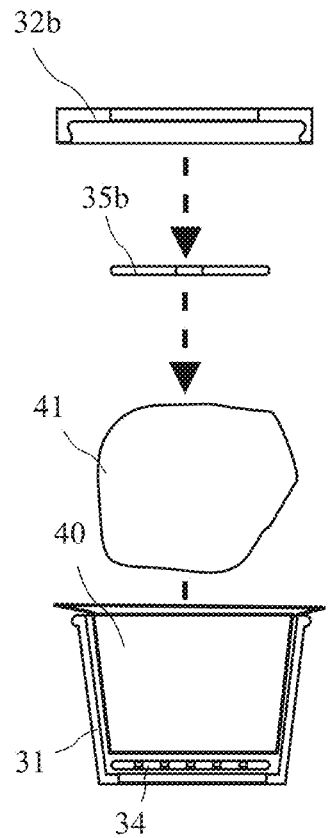
FIG. 17A is a cross-sectional side view of the third coffee holder according to the present invention taken along line 16-16 of FIG. 15 showing the portion of coffee above the coffee holder and the top tamper and the holder lid ready to attach to the coffee holder, according to the present invention.
Figure 17B:
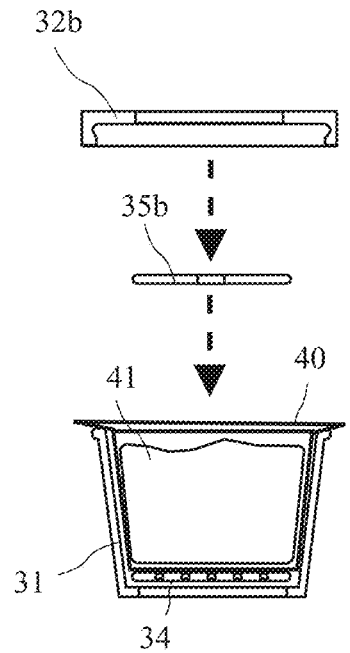
FIG. 17B is a cross-sectional side view of the third coffee holder according to the present invention taken along line 16-16 of FIG. 15 showing the portion of coffee in the coffee holder, and the top tamper and the holder lid ready to attach to the coffee holder, according to the present invention.
Figure 17C:
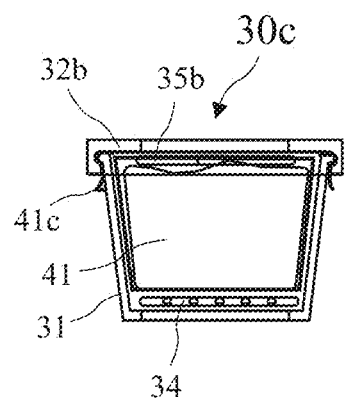
FIG. 17C is a cross-sectional side view of the third coffee holder according to the present invention taken along line 16-16 of FIG. 15 showing the portion of coffee in the coffee holder, and the bottom tamper, the top tamper, and the holder lid attached to the coffee holder, according to the present invention.

A cross-sectional side view of the third coffee holder 30c taken along line 16-16 of FIG. 15 showing the coffee holder 30c with the holder lid 32b, the top tamper 35b, and a portion of coffee, ready to attach to the holder 31, is shown in FIG. 17A. A cross-sectional side view of the third coffee holder 30c taken along line 16-16 of FIG. 15 showing the coffee holder 30c with the holder lid 32b and the top tamper ready to attach, and a portion of coffee 41 in the coffee holder, is shown in FIG. 17B. A cross-sectional side view of the third coffee holder 30c taken along line 16-16 of FIG. 15 showing the coffee holder with the holder lid and the top tamper attached and a loose portion of coffee 41 in the coffee holder is shown in FIG. 17C. The coffee holder 30c is configured to use with a coffee maker 10b (see FIGS. 18A-18C) including apparatus for entering the coffee holder for tamping the loose coffee 41.

Figure 18C:
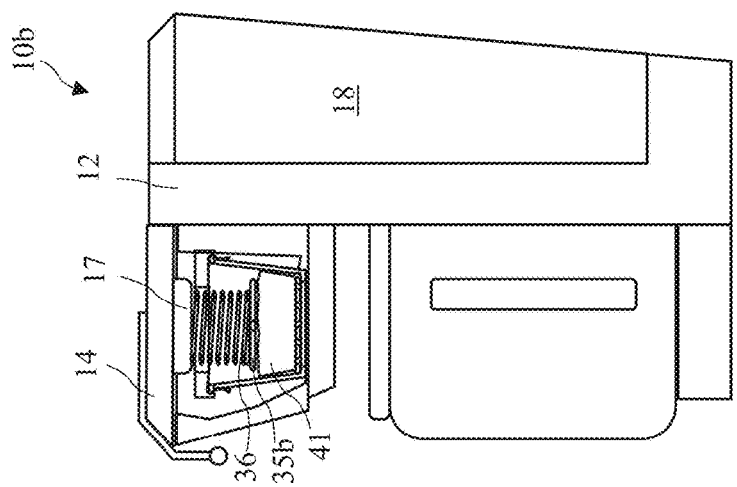
FIG. 18C shows the third coffee holder inserted into the coffee maker after tamping the coffee.
Figure 18B:
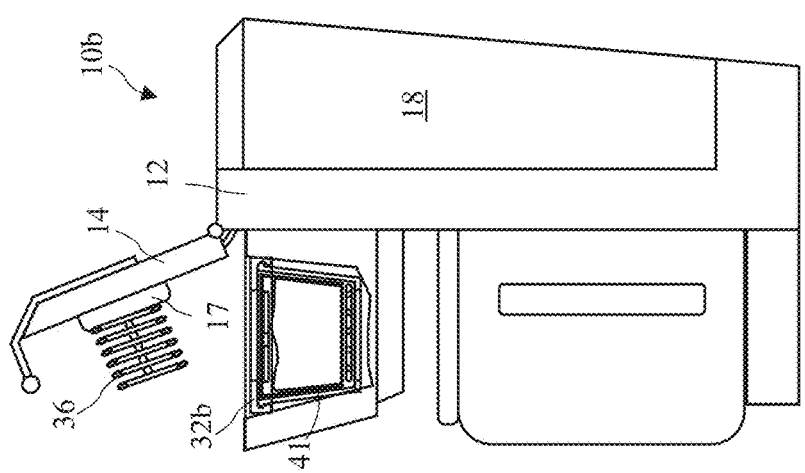
FIG. 18B shows the third coffee holder inserted into the coffee maker before tamping the coffee.
Figure 18A:
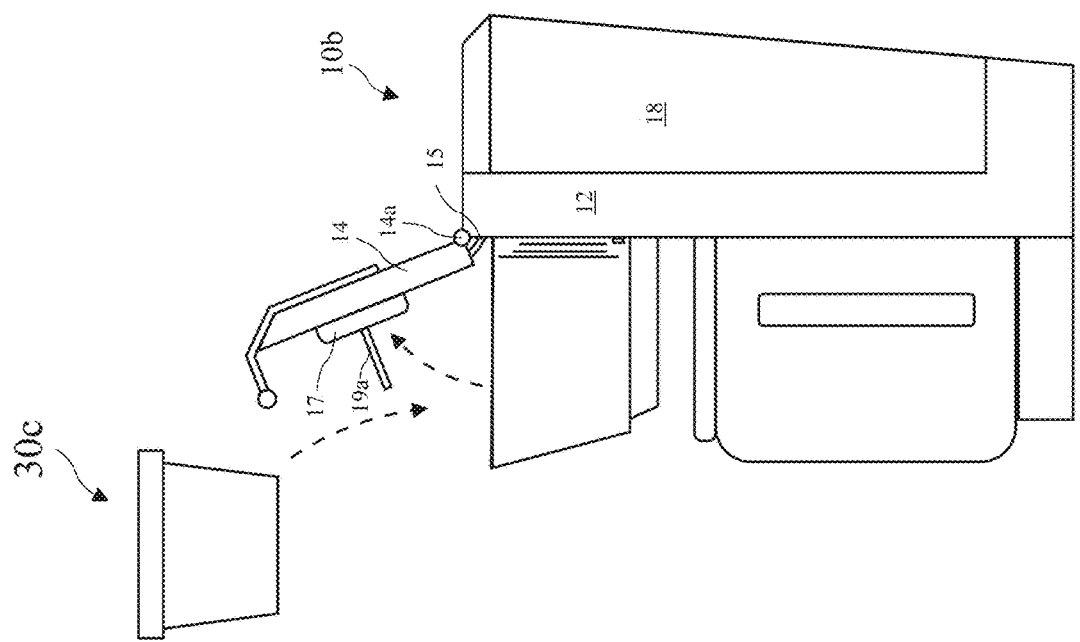
FIG. 18A shows the third coffee holder ready for insertion into a second coffee maker according to the present invention.

The third coffee holder 30c ready for insertion into a second coffee maker 10b in FIG. 18A, the third coffee holder 30c is shown residing in the coffee maker 10b before tamping the coffee 41 in FIG. 18B, and the third coffee holder 30c is shown residing in the coffee maker 10b after tamping the coffee 41 in FIG. 18C. The coffee maker 10b includes the tamping spring 36 attached to the pad 17 on the bottom of the lid 14. When the lid 14 is closed the tamping spring 36 enters the coffee holder 30c through the lid passage 33a (see FIG. 12) and pushes the top tamper 35b against the coffee 41 to tamp the coffee 41.

Figures 19, 20:
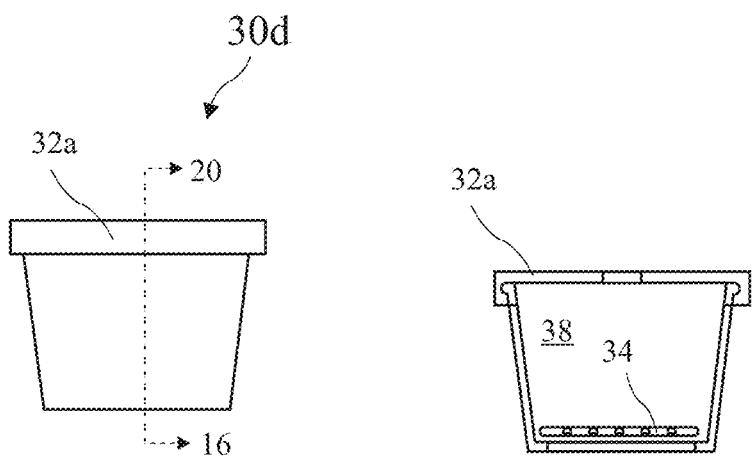
FIG. 19 is a side view of a fourth coffee holder according to the present invention.
FIG. 20 is a cross-sectional side view of the fourth coffee holder according to the present invention taken along line 20-20 of FIG. 19.

A side view of a fourth coffee holder 30d according to the present invention is shown in FIG. 19 and a cross-sectional side view of the fourth coffee holder 30d taken along line 20-20 of FIG. 19 is shown in FIG. 20. The coffee holder 30d includes the holder body 31, the first holder lid 32a, and the bottom tamper 34.

Figures 21A, 21B, 21C:
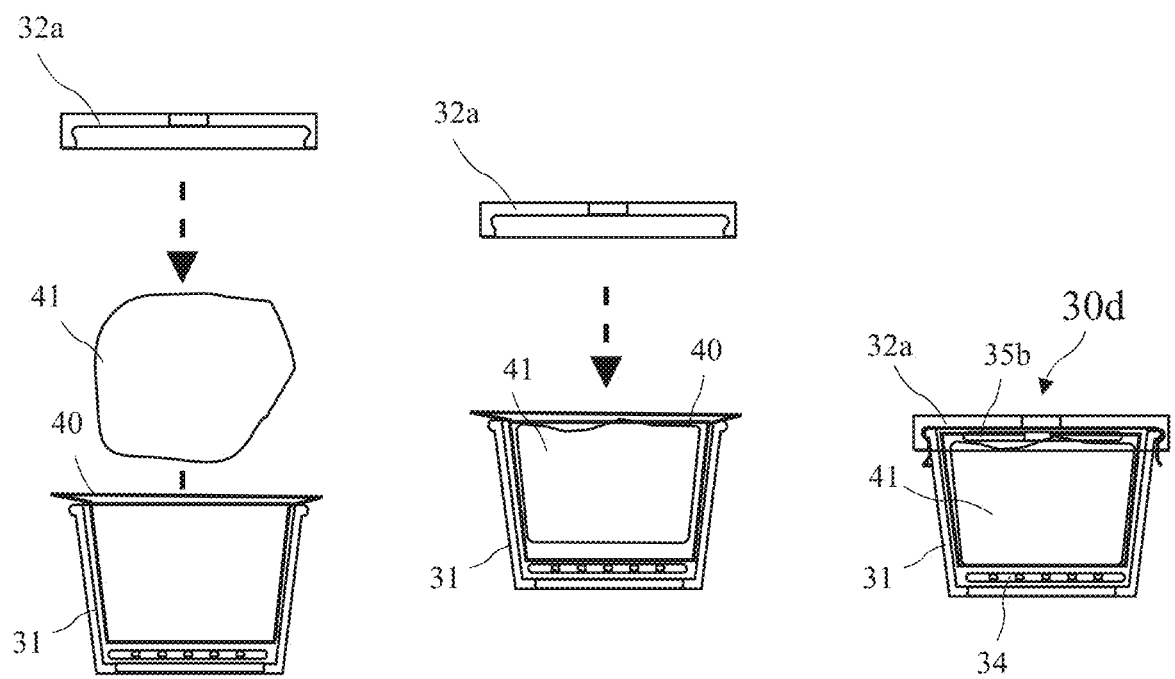
FIG. 21A is a cross-sectional side view of the fourth coffee holder according to the present invention taken along line 20-20 of FIG. 19 showing the coffee holder with the bottom tamper, a portion of coffee, and the holder lid ready to attach, according to the present invention.
FIG. 21B is a cross-sectional side view of the fourth coffee holder according to the present invention taken along line 20-20 of FIG. 19 showing the coffee holder with the bottom tamper, a portion of coffee in the coffee holder, and the holder lid ready to attach, according to the present invention.
FIG. 21C is a cross-sectional side view of the fourth coffee holder according to the present invention taken along line 20-20 of FIG. 19 showing the coffee holder with the bottom tamper, a portion of coffee in the coffee holder, and the holder lid attached, according to the present invention.

A cross-sectional side view of the fourth coffee holder 30d taken along line 20-20 of FIG. 19 showing the coffee holder with the bottom tamper 34, and a portion of coffee 41 and the holder lid ready to attach is shown in FIG. 21A. A cross-sectional side view of the fourth coffee holder 30d taken along line 20-20 of FIG. 19 showing the coffee holder 30d with the bottom tamper 34, the portion of coffee 41 in the coffee holder 30d, and the holder lid 32a ready to attach is shown in FIG. 21B. A cross-sectional side view of the fourth coffee holder 30d taken along line 20-20 of FIG. 19 showing the coffee holder 30d with the bottom tamper 34, a portion of coffee in the coffee holder 41, and the holder lid 32a is shown in FIG. 21C.

The fourth coffee holder 30d ready for insertion into another embodiment of the second coffee maker 10b in FIG.

Figure 22C:
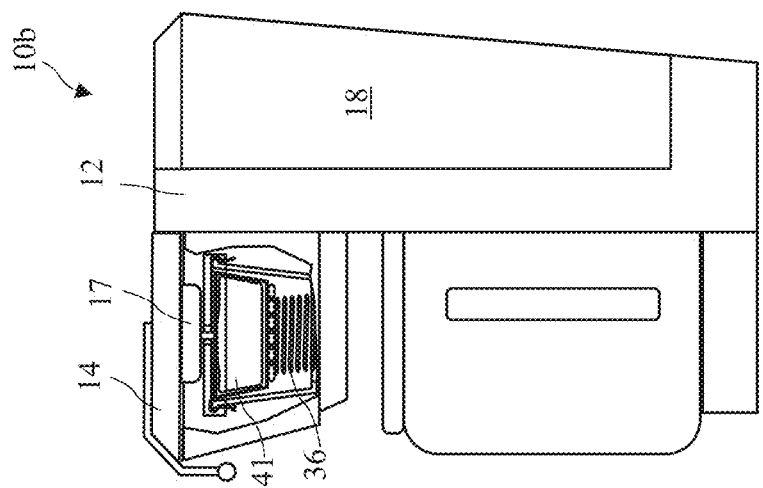
FIG. 22C shows the fourth coffee holder inserted into the coffee maker after tamping the coffee.
Figure 22B:
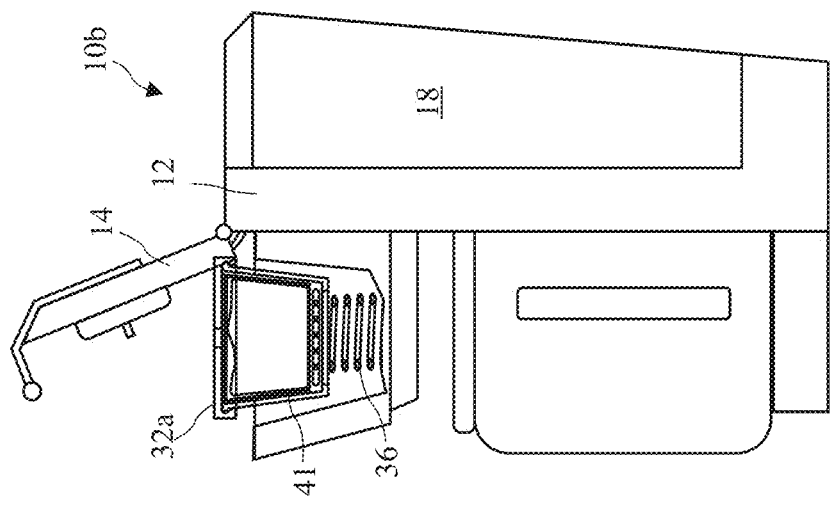
FIG. 22B shows the fourth coffee holder inserted into the coffee maker before tamping the coffee.
Figure 22A:
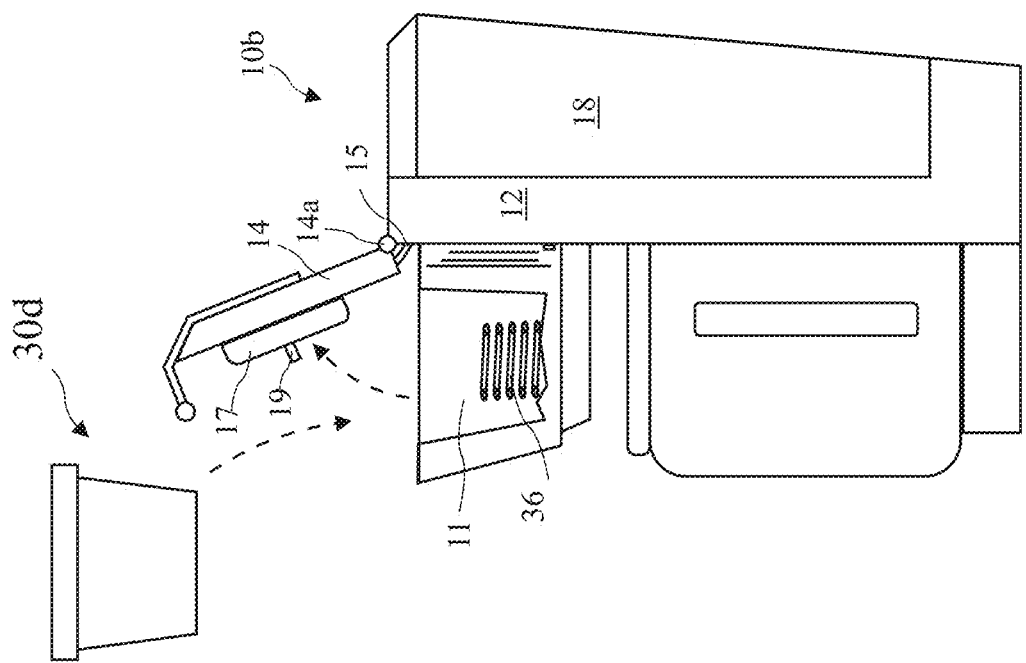
FIG. 22A shows the fourth coffee holder ready for insertion into the coffee maker.

22A, the fourth coffee holder 30d is shown residing in the coffee maker 10b before tamping the coffee 41 in FIG. 22B, and the fourth coffee holder 30d is shown residing in the coffee maker 10b after tamping the coffee 41 in FIG. 22C. The coffee maker 10b may include the tamping spring 36 residing in the bottom of the coffee holder cavity 11. When the lid 14 is closed, the pad 17 pushed the coffee holder 30d down over the tamping spring 36 and the tamping spring 36 enters the coffee holder 30c through the bottom of the holder body 31 and pushes the bottom tamper 34 against the coffee 41 to tamp the coffee 41.

Figure 23C:
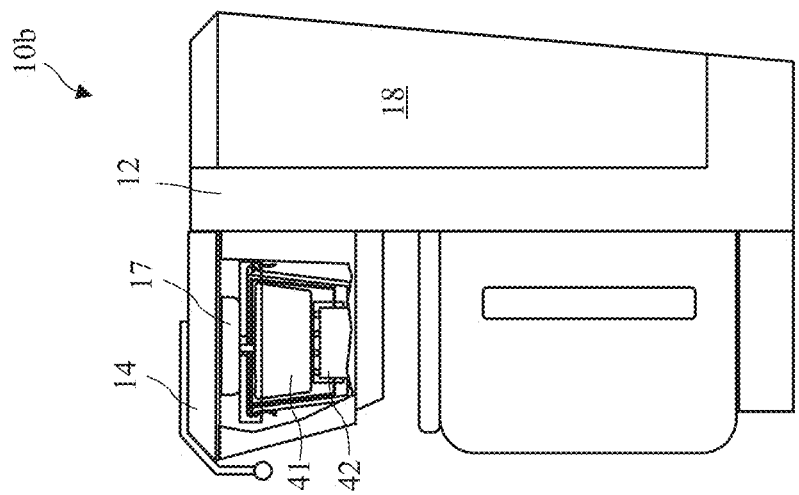
FIG. 23C shows the fourth coffee holder inserted into the coffee maker having the tamping block after tamping the coffee.
Figure 23B:
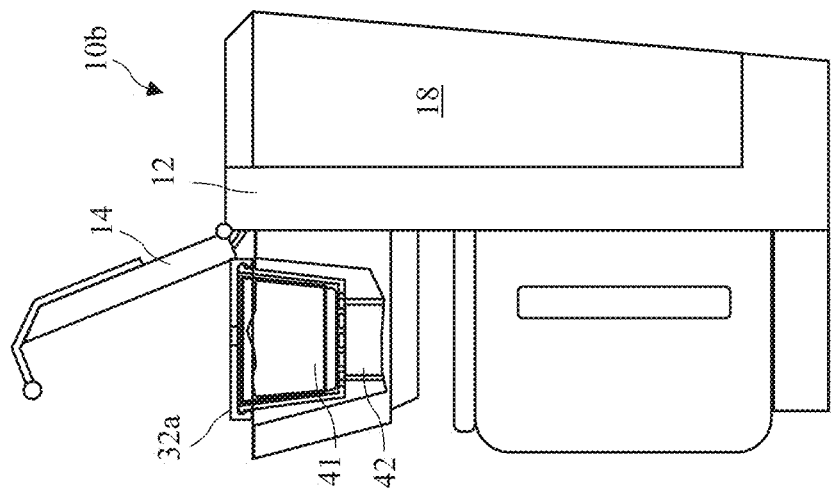
FIG. 23B shows the fourth coffee holder inserted into the coffee maker having the tamping block before tamping the coffee.
Figure 23A:
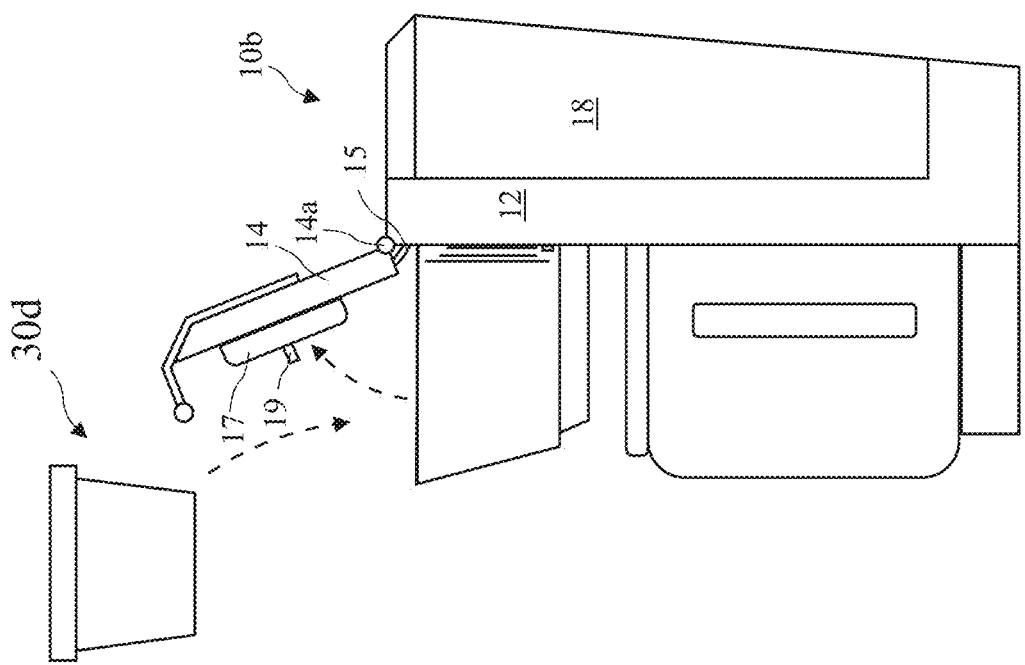
FIG. 23A shows the fourth coffee holder ready for insertion into the coffee maker having a tamping block according to the present invention.

The fourth coffee holder 30d ready for insertion into another embodiment of the second coffee maker 10b in FIG. 23A, the fourth coffee holder 30d is shown residing in the coffee maker 10b before tamping the coffee 41 in FIG. 23B, and the fourth coffee holder 30d is shown residing in the coffee maker 10b after tamping the coffee 41 in FIG. 23C. The coffee maker 10b may include a resilient solid block 42 residing in the bottom of the coffee holder cavity 11. When the lid 14 is closed, the pad 17 pushed the coffee holder 30d down over the resilient solid block 42 and the resilient solid block 42 enters the coffee holder 30c through the bottom of the holder body 31 and pushes the bottom tamper 34 against the coffee 41 to tamp the coffee 41.

A side view of a fifth coffee holder 30e according to the present invention is shown in FIG. 24 and a cross-sectional side view of the fifth coffee holder 30e taken along line 25-25 of FIG. 24 is shown in FIG. 25. The fifth coffee holder 30e includes the holder body 31, the holder lid 32b, the tamping spring 36 and the top tamper 35b attached to the holder lid 32a.

A cross-sectional side view of the fifth coffee holder 30e taken along line 25-25 of FIG. 24 showing the coffee holder 30e with a portion of coffee 41, and the holder lid 32b with the top tamper 35b and tamping spring 36 attached, above the holder body 31, is shown in FIG. 26A. A cross-sectional side view of the fifth coffee holder 30e taken along line 25-25 of FIG. 24 showing the coffee holder with the portion of coffee 41 in the coffee holder, and the holder lid 32b with the top tamper 35b and tamping spring 36 attached, above the holder body 31, is shown in FIG. 26B. A cross-sectional side view of the fifth coffee holder 30e taken along line 25-25 of FIG. 24 showing the coffee holder 30e with the portion of coffee 41 in the coffee holder 30e, and the holder lid 32b with the top tamper 35b and tamping spring 36 attached to the holder base 31 is shown in FIG. 26D. The tamping spring 36 and top tamper 35b tamp the coffee 41 to provide a tamped coffee when the holder lid 32b is attached to the holder base 31.

Figures 27, 28:
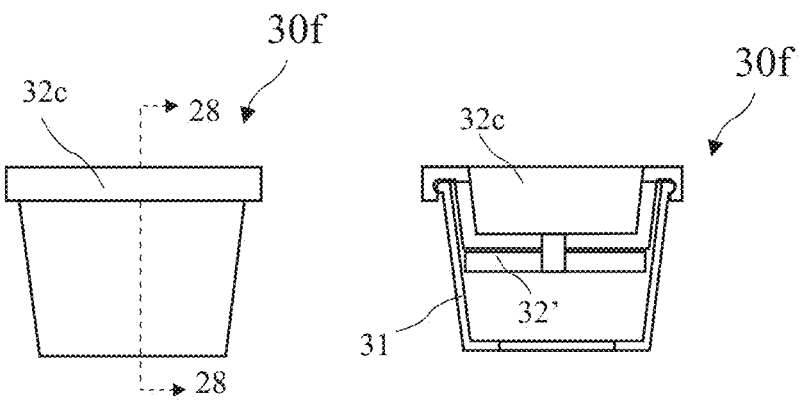
FIG. 27 is a side view of a sixth coffee holder according to the present invention.
FIG. 28 is a cross-sectional side view of the sixth coffee holder according to the present invention taken along line 28-28 of FIG. 27.

A side view of a sixth coffee holder 30f according to the present invention is shown in FIG. 27 and a cross-sectional side view of the sixth coffee holder 30f taken along line 28-28 of FIG. 27 is shown in FIG. 28. The sixth coffee holder 30f includes the holder body 31 and a third holder lid 32c. The third holder lid 32c includes a recessed portion 32' which reaches into the interior of the sixth coffee holder 30f. The recessed portion 32' is preferably a solid resilient material.

Figures 29A, 29B, 29C:
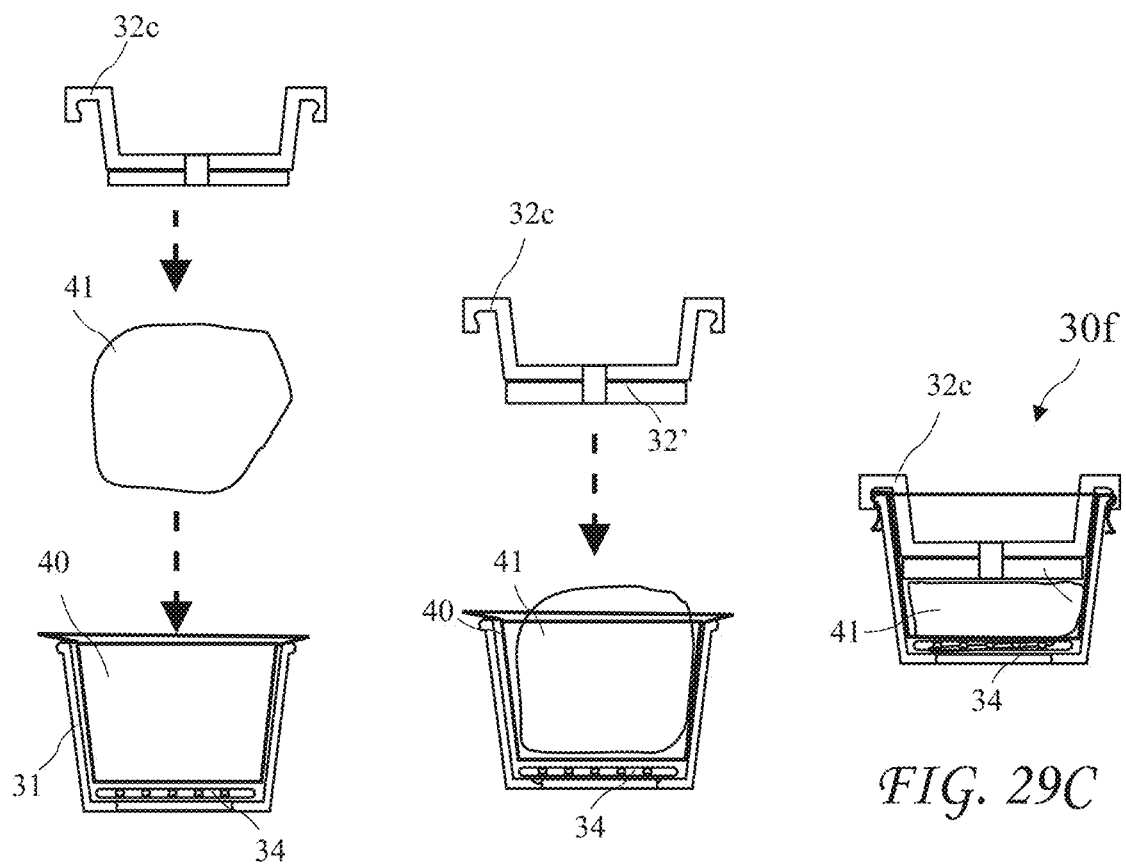
FIG. 29A is a cross-sectional side view of the sixth coffee holder according to the present invention taken along line 28-28 of FIG. 27 showing the portion of coffee above the coffee holder, and the holder lid ready to attach to the holder body, according to the present invention.
FIG. 29B is a cross-sectional side view of the sixth coffee holder according to the present invention taken along line 28-28 of FIG. 27 showing the portion of coffee in the coffee holder, and the holder lid ready to attach to the holder body, according to the present invention.
FIG. 29C is a cross-sectional side view of the sixth coffee holder according to the present invention taken along line 28-28 of FIG. 27 showing the portion of coffee in the coffee holder, and the holder lid attached and tamping the coffee, according to the present invention.

A cross-sectional side view of the sixth coffee holder 30f taken along line 28-28 of FIG. 27 showing the sixth coffee holder 30f with a portion of coffee 41, and the holder lid 32c, above the holder body 31, is shown in FIG. 29A. A cross-sectional side view of the sixth coffee holder 30f taken along line 28-28 of FIG. 27 showing the coffee holder with the portion of coffee 41 in the coffee holder, and the holder lid 32c above the holder body 31, is shown in FIG. 29B. A cross-sectional side view of the sixth coffee holder 30f along line 28-28 of FIG. 27 showing the sixth coffee holder 30f with the portion of coffee 41 in the coffee holder 30e, and the holder lid 32e attached to the holder base 31 is shown in FIG. 26D. A cushion 32' tamps the coffee 41 to provide a tamped coffee when the holder lid 32e is attached to the holder base 31. The cushion 32' is preferably made from a resilient material to cushion the tamping of the loose coffee.

Figure 30:
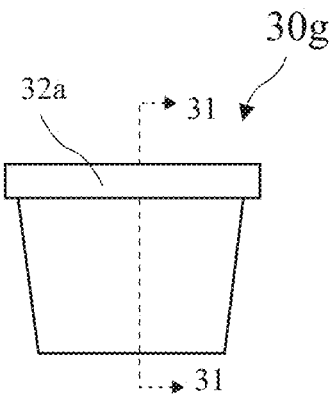
FIG. 30 is a side view of a seventh coffee holder according to the present invention.
Figure 31:
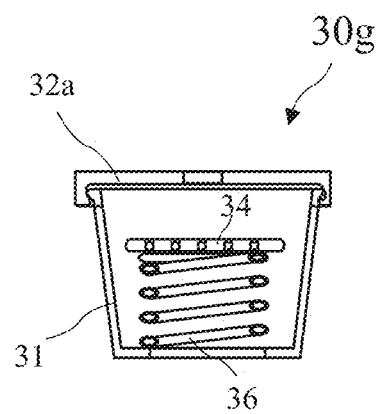
FIG. 31 is a cross-sectional side view of the seventh coffee holder according to the present invention taken along line 31-31 of FIG. 30.
Figure 32A:
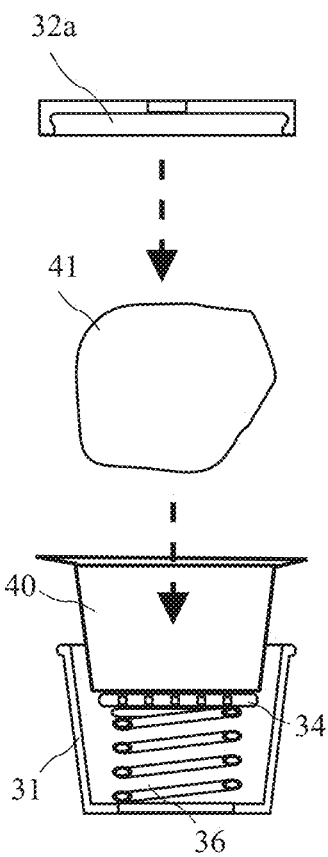
FIG. 32A is a cross-sectional side view of the seventh coffee holder according to the present invention taken along line 31-31 of FIG. 30 showing the portion of coffee above the coffee holder, and the holder lid ready to attach to the holder body, according to the present invention.
Figure 32B:
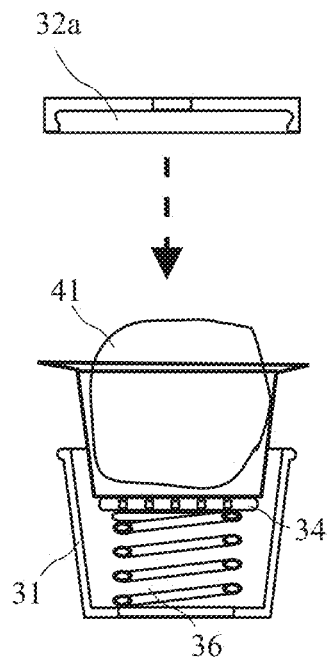
FIG. 32B is a cross-sectional side view of the seventh coffee holder according to the present invention taken along line 31-31 of FIG. 30 showing the portion of coffee in the coffee holder, and the holder lid ready to attach to the holder body. according to the present invention.
Figure 32C:
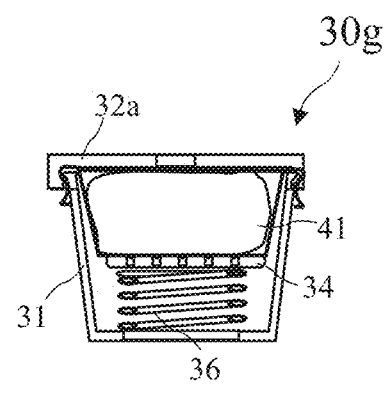
FIG. 32C is a cross-sectional side view of the seventh coffee holder according to the present invention taken along line 31-31 of FIG. 30 showing the portion of coffee in the coffee holder, and the holder lid attached to the holder body and the coffee tamped between the bottom tamper and spring and the holder lid, according to the present invention.

A side view of a seventh coffee holder 30g according to the present invention is shown in FIG. 30 and a cross-sectional side view of the seventh coffee holder 30g taken along line 31-31 of FIG. 30 is shown in FIG. 31. The seventh coffee holder 30g includes the holder body 31, the holder lid 32b, the tamping spring 36, and the bottom tamper 34 inside the holder base 31.

A cross-sectional side view of the seventh coffee holder 30g taken along line 31-31 of FIG. 30 showing the seventh coffee holder 30g with a portion of coffee 41 and the holder lid 32a above the holder body 31, and with the bottom tamper 34 and tamping spring 36 inside the holder base 31, is shown in FIG. 26A. A cross-sectional side view of the seventh coffee holder 30g taken along line 31-31 of FIG. 30 showing the coffee holder with the portion of coffee 41 in the filter paper 40 in the holder base 31 resting on the bottom tamper 34 supported by the tamping spring 36, and the holder lid 32a above the holder body 31, is shown in FIG. 26B. A cross-sectional side view of the seventh coffee holder 30g taken along line 31-31 of FIG. 30 showing the seventh coffee holder 30g with the portion of coffee 41 in the coffee holder 30e, and the holder lid 32a attached to the holder base 31, is shown in FIG. 26D. The tamping spring 36 and bottom tamper 34 tamp the coffee 41 upward against the tamper lid 32a to provide a tamped coffee when the holder lid 32a is attached to the holder base 31.

Figures 33, 34A, 34B:
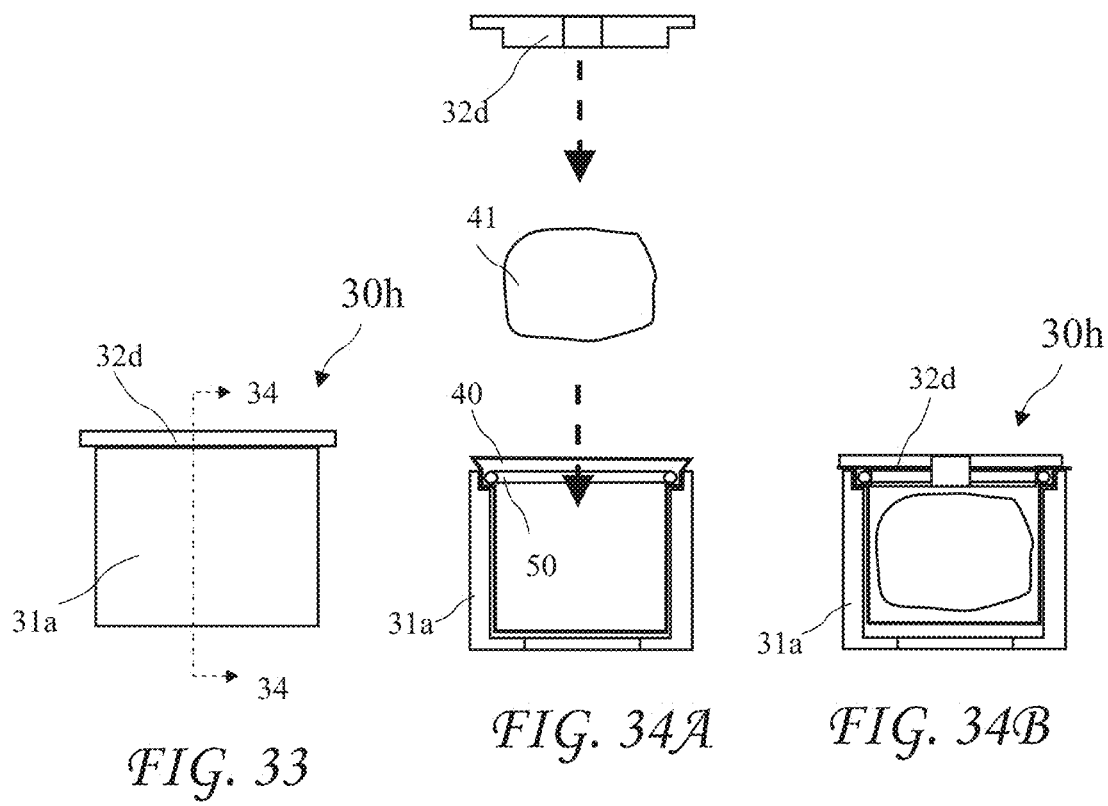
FIG. 33 is a side view of an eighth coffee holder according to the present invention.
FIG. 34A is a cross-sectional side view of the eighth coffee holder taken along line 34-34 of FIG. 33 showing a portion of coffee for placing inside the coffee holder and the holder lid with an insertable portion and an O-ring inside the coffee holder for sealing according to the present invention.
FIG. 34B is a cross-sectional side view of the eighth coffee holder taken along line 34-34 of FIG. 33 showing the portion of coffee inside the coffee holder and the holder lid with the insertable portion inserted into the coffee holder and cooperating with the O-Ring inside the coffee holder for sealing.

A side view of an eighth coffee holder 30h according to the present invention is shown in FIG. 33, a cross-sectional side view of the eighth coffee holder 30h taken along line 34-34 of FIG. 33 showing a portion of coffee 41 for placing inside the coffee holder and a fourth holder lid 32d with an insertable portion and an O-Ring 50 inside the coffee holder for sealing is shown in FIG. 34A, and a cross-sectional side view of the eighth coffee holder taken along line 34-34 of FIG. 33 showing the portion of coffee 41 inside the coffee holder 30h and the holder lid 32d with the insertable portion inserted into the coffee holder base 31a is shown in FIG. 34B. The filter paper 40 extends up above the O-ring 50 and the O-Ring 50 cooperates with the holder lid 32d to sandwich the top edge of the filter paper 40 for sealing the filter paper 40 to reduce or prevent the coffee 41 from escaping when the flow of hot water is provided to the coffee holder 30h. The holder base 31a is preferably cylindrical but may also be conical in shape.

Figures 35, 36A, 36B:
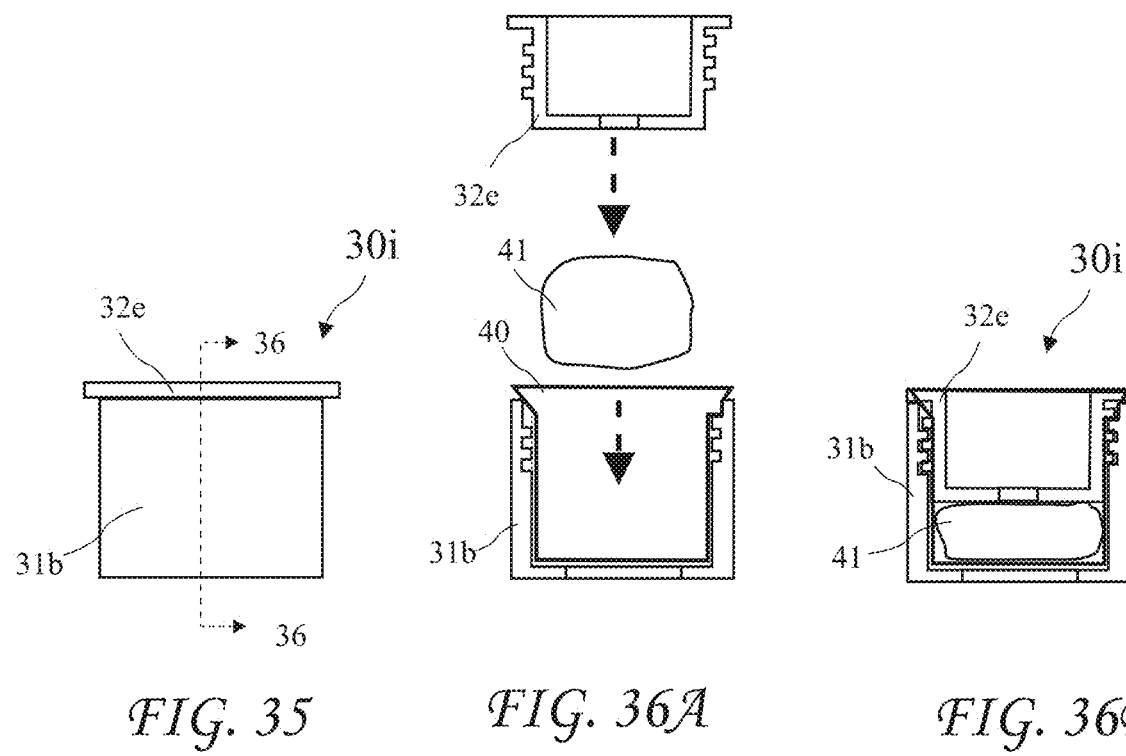
FIG. 35 is a side view of a ninth coffee holder according to the present invention.
FIG. 36A is a cross-sectional side view of the ninth coffee holder taken along line 36-36 of FIG. 35 showing a portion of coffee for placing inside the coffee holder and a holder lid with a threaded portion for screwing inside the holder body for sealing according to the present invention.
FIG. 36B is a cross-sectional side view of the ninth coffee holder taken along line 36-36 of FIG. 35 showing the portion of coffee inside the coffee holder and a holder lid with the threaded portion screwed into the holder body and tamping the coffee according to the present invention.

A side view of a ninth coffee holder 30i according to the present invention is shown in FIG. 35, a cross-sectional side view of the ninth coffee holder 30i taken along line 36-36 of FIG. 35 showing a portion of coffee 41 for placing inside the coffee holder and a fifth holder lid 32e with a threaded portion for screwing inside the holder base 31b for sealing is shown in FIG. 36A, and a cross-sectional side view of the ninth coffee holder 30i taken along line 36-36 of FIG. 35 showing the portion of coffee 41 inside the coffee holder and the holder lid 32e with the threaded portion screwed into the coffee holder and tamping the coffee 41 is shown in FIG. 36B. The threads both provide tamping and sealing the coffee to reduce or prevent the coffee 41 from escaping when the flow of hot water is provided to the coffee holder 30h.

The holder base 31*b* is preferably cylindrical to facilitate having internal threads, and at least the threaded portion is preferably cylindrical.

A third coffee maker 10*c* having a coffee holder 30 according to the present invention for receiving a portion of coffee and a tamping spring 36 for tamping the coffee is shown in FIG. 37A, the third coffee maker 10*c* with the coffee holder 30 holding the portion of coffee 41 is shown in FIG. 37B, and the third coffee maker 10*c* with the coffee holder 30 holding the portion of coffee 41 with the coffee maker lid 14 closed for tamping the coffee 41 is shown in FIG. 37C. When the lid 14 is closed, the pad 17 pushes the coffee holder 30 down and the tamping spring 36 enters the bottom of the coffee holder 30 to tamp the coffee 41. While attaching the lid 32*a* to the holder 30 is preferred in order to prevent coffee grounds from escaping the holder 30, the coffee maker 10*c* may also be used without the lid 32*a* and the pad 17 may serve to seal the coffee 41 in the holder 30. In this instance, the coffee maker lid 14 serves as a coffee holder lid.

Figure 38C:
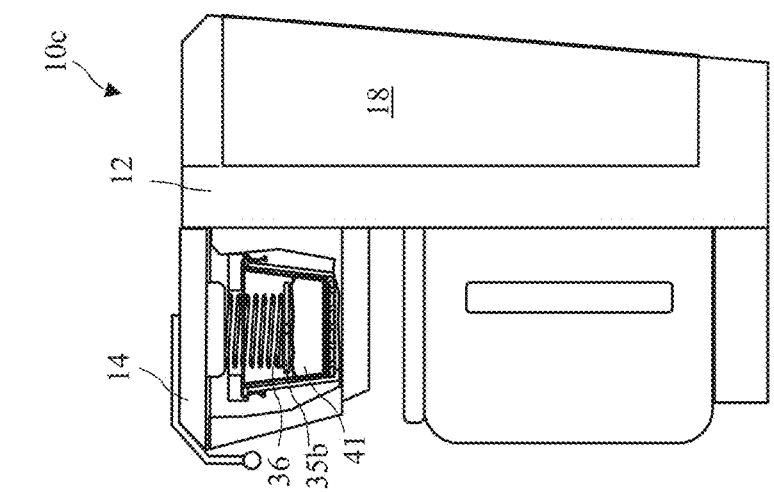
FIG. 38C shows the third coffee maker with the coffee holder holding the portion of tamped coffee with the coffee maker lid closed to push the tamping spring into the coffee holder for tamping the coffee according to the present invention.
Figure 38B:
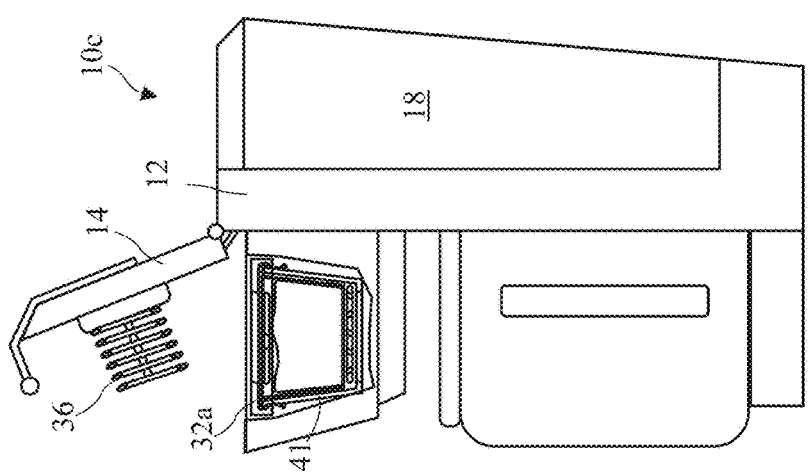
FIG. 38B shows the third coffee maker with the coffee holder holding the portion of untamped coffee according to the present invention for tamping the coffee when the coffee maker lid is closed.
Figure 38A:
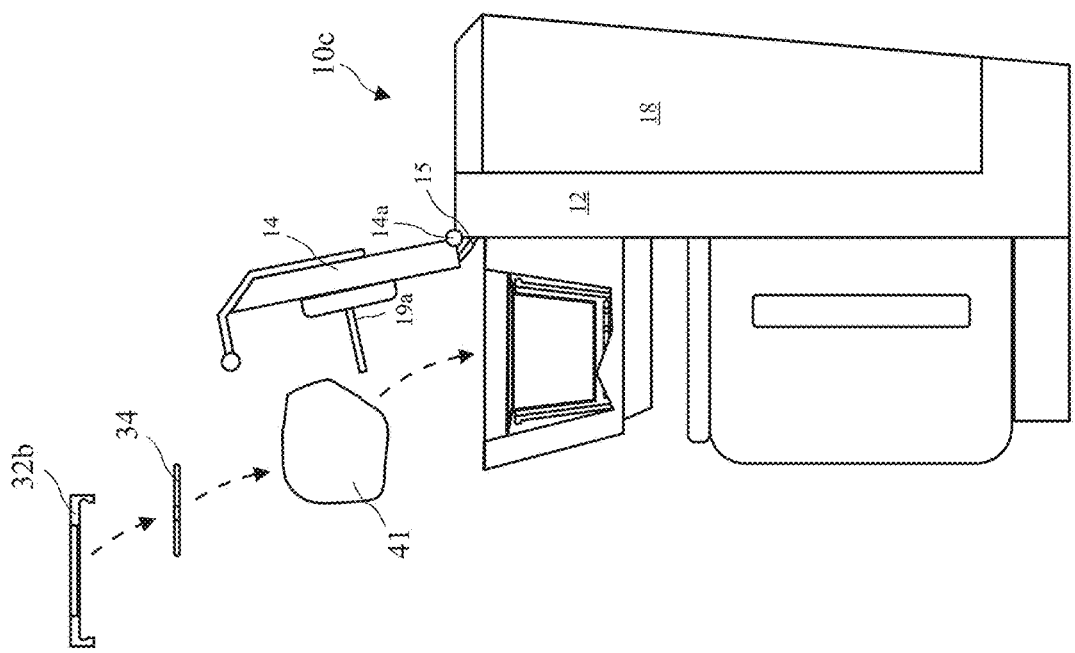
FIG. 38A shows a third coffee maker having a coffee holder for receiving a portion of coffee and tamping spring attached to the coffee maker lid according to the present invention for tamping the coffee when the coffee maker lid is closed.

A third coffee maker 10*c* having a coffee holder for receiving a portion of coffee and tamping spring 36 attached to the coffee maker lid 14 according to the present invention for tamping the coffee 41 when the coffee maker lid 14 is closed is shown in FIG. 38A, the third coffee maker with the coffee holder 30 holding the portion of coffee 41 is shown in FIG. 38B, and the third coffee maker 10*c* with the coffee holder 30 holding the portion of coffee 41 with the coffee maker lid 14 closed to push the tamping spring 36 into the coffee holder 30 for tamping the coffee 41 is shown in FIG. 38C.

A fourth coffee maker 10*d* having a third holder base 31*c* for receiving a packet 41*a* containing untamped coffee, a knife 50 for cutting the packet 41*a* open, and tamping spring 36 under the holder base 31*c* according to the present invention for tamping the coffee when the coffee maker lid is closed is shown in FIG. 39A, the fourth coffee maker 10*d* with the holder base 31*c* holding the packet 41*a* of untamped coffee is shown in FIG. 39B, and fourth coffee maker with the holder base 31*c* holding the packet of tamped coffee 41*c* with the coffee maker lid 14 closed to push the holder base down over the tamping spring 36 for tamping the coffee is shown in FIG. 39C. The coffee maker 10*d* includes a somewhat pointed nozzle 19*a* to puncture the packet 41*a* to provide the flow of hot water to the tamped coffee in the packet 41*a*. Known coffee packets include internal filters to allow a flow of hot water through the packet to make the coffee drink while preventing coffee grounds from escaping. The cut in the packet 41*a* made by the knife 50 allows the coffee drink to escape from the packet while filter material in the packet 41*a* prevent coffee grounds from escaping. The tamping spring 36 may also be attached to the lid 14 as in FIGS. 38A-38C.

The packet 41*a* may be an air tight pod containing coffee in filter paper and positioning the knife on the side of the holder base 31*c* results in less likelihood of the knife 50 cutting the filter paper. The packet 41*a* is preferably air tight to maintain coffee freshness and may be plastic, metal foil, or other air tight material which is sufficiently flexible to allow the coffee contained in the packet 41*a* to be tamped. Alternatively, the knife 50 may be eliminated when the packet 41*a* is configured to burst under pressure to expose the coffee, for example, when the coffee maker tamps the coffee, the packet 41*a* also bursts. In one embodiment, filter paper 41 is inserted into the holder base 31*c* without the knife 50, and the packet 41*a* bursts during compacting to release the coffee into the filter paper.

Known coffee makers use a sealed cup or capsule having a somewhat ridged cup with a foil cover. Such cups might be compressible and used in the coffee maker 10*d,* however, a similar cup or capsule having a less ridged cup which may be compressed in the coffee maker 10*d* are more suitable for use in the coffee maker 10*d* to allow tamping of the coffee contained in the cup or capsule.

Figure 40C:
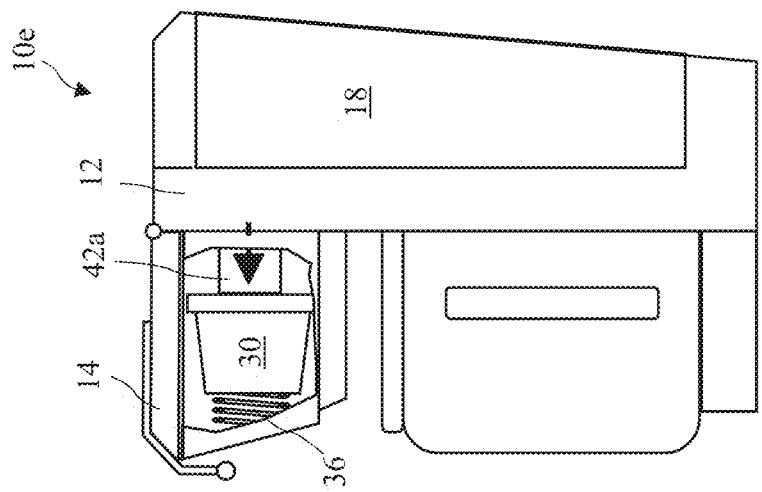
FIG. 40C shows the fifth coffee maker with the coffee holder residing horizontally in the coffee holder cavity with the coffee maker lid closed and the coffee holder pushed against the tamping spring for tamping the coffee, according to the present invention.
Figure 40B:
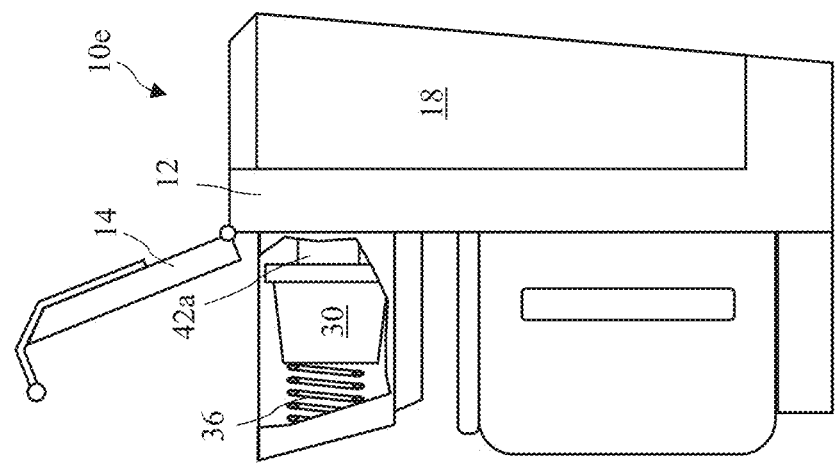
FIG. 40B shows the fifth coffee maker with the coffee holder residing horizontally in the coffee holder cavity according to the present invention for tamping the coffee when the coffee maker lid is closed.
Figure 40A:
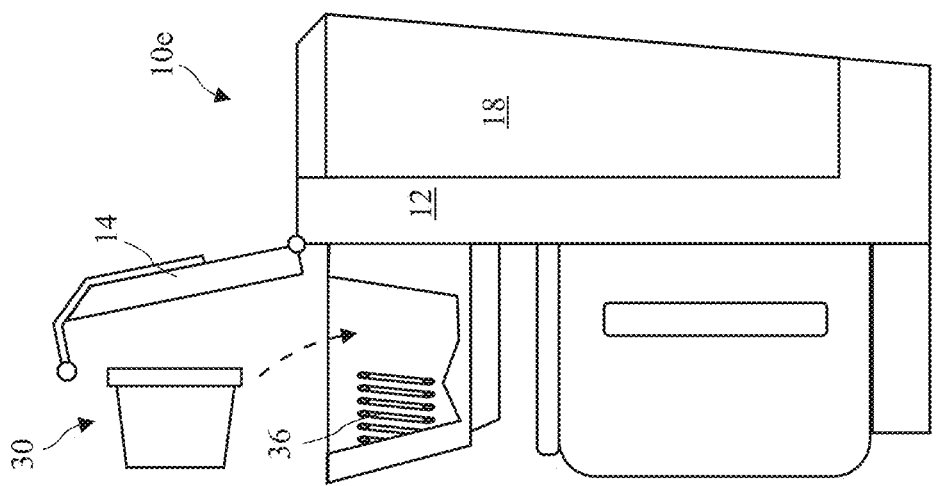
FIG. 40A shows a fifth coffee maker accepting a horizontal coffee holder and tamping spring residing horizontally in a coffee holder cavity according to the present invention for tamping the coffee when the coffee maker lid is closed.

A fifth coffee maker 10*e* for horizontally receiving the coffee holder 30 is shown in FIG. 40A, the fifth coffee maker with the coffee holder 30 residing in the coffee maker is shown in FIG. 40B, and the fifth coffee maker with the coffee maker lid 14 closed and the tamping spring 36 entering the coffee holder 30 for tamping the coffee 41 is shown in FIG. 40C. The fifth coffee maker 10*d* may alternatively include a tamping spring entering the coffee holder top, or a resilient solid block pushed into the coffee holder 30 to tamp the coffee. Preferably, a horizontal ram 42*a* is actuated when the lid 14 is closed and pushed the coffee holder 30 against the spring 36 to tamp the coffee. The horizontal ram 42*a* may actuated by an electrical solenoid, by pressure, or by mechanical levers connected to the lid 14. The fifth coffee maker 10*e* may further include any of the features described above for other embodiments of the coffee maker according to the present invention and may be configured to use any of the coffee holders described above according to the present invention.

A side view of a tenth coffee holder 30*j* with straight walls according to the present invention is shown in FIG. 41, and a cross-sectional view of the tenth coffee holder 30*j* taken along line 42-42 of FIG. 41 showing an empty coffee holder is shown in FIG. 42. The coffee holder 30*j* provides straight cylindrical inside walls allowing a better fit between the top tamper 35*b* and the inside walls to reduce or eliminate coffee 41 escaping past the top tamper 35*b* during tamping.

A cross-sectional view of the tenth coffee holder 30*j* taken along line 42-42 of FIG. 41 showing a full and tamped coffee holder is shown in FIG. 43. The tamping spring 36 has been pushed down by the lid 32*b* to tamp the coffee 41.

A side view of an eleventh coffee holder 30*k* with straight walls according to the present invention is shown in FIG. 44, a cross-sectional view of the eleventh coffee holder 30*k* taken along line 45-45 of FIG. 44 showing an empty coffee holder is shown in FIG. 45, and a cross-sectional view of the eleventh coffee holder 30*k* taken along line 45-45 of FIG. 41 showing a full and tamped coffee holder. As with the coffee holder 30*j,* the coffee holder 30*k* provides straight cylindrical inside walls allowing a better fit between the lid 32*f* and the inside walls to reduce or eliminate coffee 41 escaping past the lid 32*f* during tamping. The lid 32*f* may be used with or without the top tamper 35*b.*

A side view of a top tamper 35*b* is shown in FIG. 47A and a top view of the top tamper 35B is shown in FIG. 47B. A side view of a top tamper 35*b'* with a seal 60 according to the present invention is shown in FIG. 47C and a top view of the top tamper 35*b'* with the seal 60 is shown in FIG. 47D. In some instances, for example with a very fine ground coffee, an amount of coffee may escape past the top tamper 35*b.* In such instances, a user may prefer to use the top tamper 35*b'* with the seal 60 to reduce or eliminate the escape of the coffee.

A perspective view of a filter paper cup 40' with a folding cup lid 40*d* is shown in FIG. 48 (also see FIG. 7C). The cup lid 40*d* may be folded over the rim 40*c* to reduce or prevent coffee from escaping during tamping of subsequent processing. The lid 40*d* may also include a perforation 40*e* centered on the lid 40*d* allowing the nozzle 19 to enter and/or inject the hot flow of water into the tamped coffee 41, but in some embodiments, the lid 40*d* does not include the perforation 40*e*. The filter paper cup 40' may be used in the coffee containers described herein, and may able be used in a coffee machine having a cavity for receiving the filter paper cup 40'. While the cup 40' is preferably made from filter paper, the cup may also be made from a reusable mech.

A side view of an twelfth coffee holder 30*l* with straight walls according to the present invention is shown in FIG. 49, and a cross-sectional view of the twelfth coffee holder 30*l* taken along line 50-50 of FIG. 49 showing an empty coffee holder is shown in FIG. 50. The twelfth coffee holder 30*l* includes a straight walled base and the tamping spring below the coffee, and additionally uses a filter paper cup 40' with the folding lid 40*d*.

A cross-sectional view of the twelfth coffee holder 30*l* taken along line 50-50 of FIG. 49 showing the lid 32*a*, coffee 41, the filter paper cup 40' with lid 40*d*, above the coffee holder base 31*a* is shown in FIG. 51A, a cross-sectional view of the twelfth coffee holder 30*l* taken along line 50-50 of FIG. 49 showing the lid 32*a*, above the coffee 41 and the filter paper cup 40' resting in the coffee holder base 31*a* is shown in FIG. 51B, a cross-sectional view of the twelfth coffee holder 30*l* taken along line 50-50 of FIG. 49 showing the lid 32*a*, above the coffee 41 and the filter paper cup 40' resting in the coffee holder base 31*a* with the filter paper cover 40*d* folded over the coffee 41 in the filter paper cup 40' is shown in FIG. 51C, and a cross-sectional view of the twelfth coffee holder 30*l* taken along line 50-50 of FIG. 49 showing the lid 32*a* attached to the base 31*a* with the coffee 41 and the filter paper cup 40' residing in the coffee holder base 31*a* with the coffee 41 tamped is shown in FIG. 51D. In embodiments with the coffee 41 partially exposed above the base 31*a*, some coffee 41 may escape during tamping. Using the filter paper cup 40' having the fold over paper lid 40*d* reduces or eliminates such escape of coffee 41.

Figure 52:
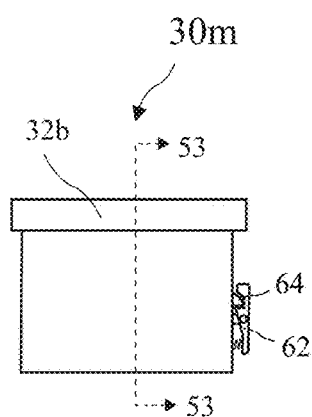
FIG. 52 is a side view of a thirteenth coffee holder with a releasable tamping latch according to the present invention.
Figure 53:
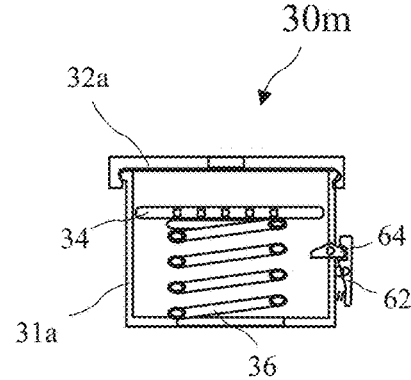
FIG. 53 is a cross-sectional view of the thirteenth coffee holder taken along line 53-53 of FIG. 52 showing an empty coffee holder.

A side view of a thirteenth coffee holder 30*m* with a releasable tamping latch 64 according to the present invention is shown in FIG. 52 and a cross-sectional view of the thirteenth coffee holder 30*m* taken along line 53-53 of FIG. 52 showing an empty coffee holder is shown in FIG. 53. The latch 64 is held in a latched position by a spring loaded lever 62 on the exterior of the base 31*a*.

Figure 54A:
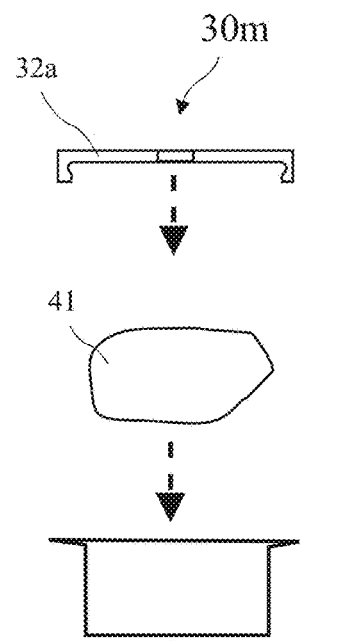
FIG. 54A is a cross-sectional view of the thirteenth coffee holder taken along line 53-53 of FIG. 52 showing a lid, coffee, a filter paper cup, above the base, and the coffee holder base, with the tamping latch retaining the bottom tamper.
Figure 54B:
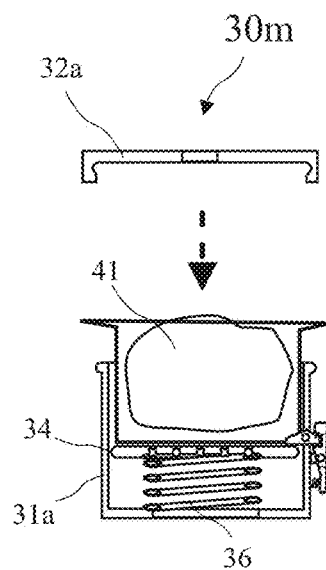
FIG. 54B is a cross-sectional view of the thirteenth coffee holder taken along line 53-53 of FIG. 52 showing the lid, above the coffee and the filter paper cup resting in the coffee holder base, with the tamping latch retaining the bottom tamper.
Figure 54C:
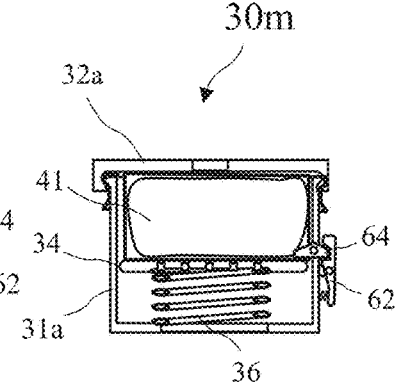
FIG. 54C is a cross-sectional view of the thirteenth coffee holder taken along line 53-53 of FIG. 52 showing the lid, above the coffee and the filter paper cup resting in the coffee holder base with the tamping latch retaining the bottom tamper.
Figure 54D:
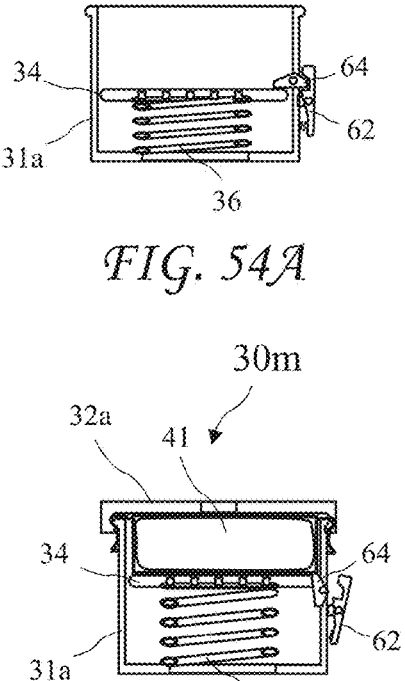
FIG. 54D is a cross-sectional view of the fourteenth coffee holder taken along line 53-53 of FIG. 52 showing the lid attached to the base with the coffee and the filter paper cup residing in the coffee holder base with tamping latch released and the coffee tamped.

A cross-sectional view of the thirteenth coffee holder 30*m* taken along line 53-53 of FIG. 52 showing the lid 32*a*, coffee 41, the filter paper cup 40, above the base 31*a*, and the coffee holder base 31*a*, with the tamping latch 64 retaining the bottom tamper 34 is shown in FIG. 54A, a cross-sectional view of the thirteenth coffee holder 30*m* taken along line 53-53 of FIG. 52 showing the lid 32*a* above the coffee 41 and the filter paper cup 40 resting in the coffee holder base 31*a*, with the tamping latch 64 retaining the bottom tamper 34 is shown in FIG. 54B, a cross-sectional view of the thirteenth coffee holder 30*m* taken along line 53-53 of FIG. 52 showing the lid 32*a*, above the coffee 41 and the filter paper cup 40 resting in the coffee holder base 31*a* with the tamping latch 64 retaining the bottom tamper 34 is shown in FIG. 54C, and a cross-sectional view of the fourteenth coffee holder 30*m* taken along line 53-53 of FIG. 52 showing the lid 32*a* attached to the base 31*a* with the coffee 41 and the filter paper cup 40 residing in the coffee holder base 31*a* with tamping latch 64 released and the coffee 41 tamped is shown in FIG. 54D. The lever 62 thus holds the latch 64 until the lever 62 is pushed to release the latch 62 to release the bottom tamper 34 to tamp the coffee 41.

Figure 55:
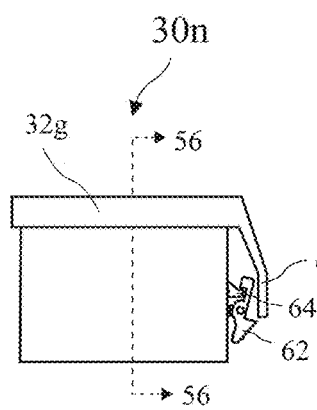
FIG. 55 is a side view of a fourteenth coffee holder with a releasable tamping latch according to the present invention.
Figure 56:
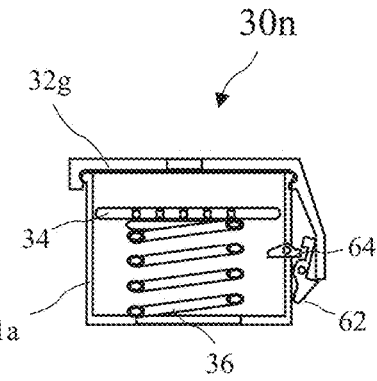
FIG. 56 is a cross-sectional view of the fourteenth coffee holder taken along line 56-56 of FIG. 55 showing an empty coffee holder.

A side view of a fourteenth coffee holder 30*n* with a releasable tamping latch 64 according to the present invention is shown in FIG. 55 and a cross-sectional view of the fourteenth coffee holder taken along line 56-56 of FIG. 55 showing an empty coffee holder is shown in FIG. 56. The lever 62 holds the latch 64 until the arm 66 attached to the lid 32*g* pushes the lever 62 to release the latch 64.

Figure 57A:
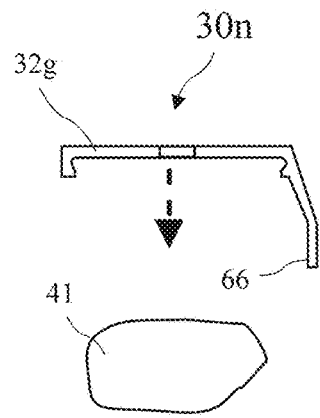
FIG. 57A is a cross-sectional view of the fourteenth coffee holder taken along line 56-56 of FIG. 55 showing a lid, coffee, a filter paper cup, above the base, and the coffee holder base, with the tamping latch retaining the bottom tamper.
Figure 57B:
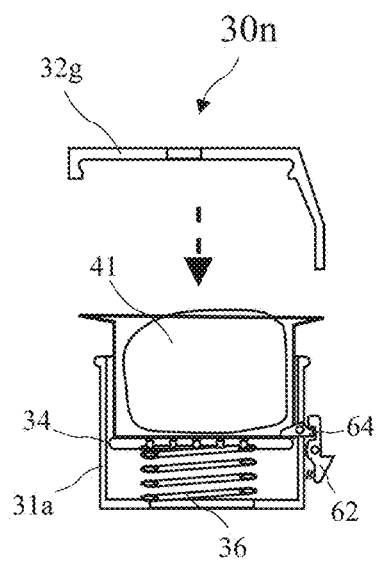
FIG. 57B is a cross-sectional view of the fourteenth coffee holder taken along line 56-56 of FIG. 55 showing the lid, above the coffee and the filter paper cup resting in the coffee holder base, with the tamping latch retaining the bottom tamper.
Figure 57C:
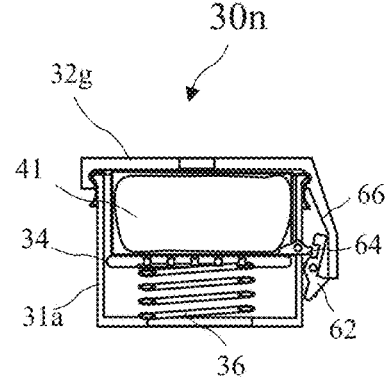
FIG. 57C is a cross-sectional view of the fourteenth coffee holder taken along line 56-56 of FIG. 55 showing the lid, above the coffee and the filter paper cup resting in the coffee holder base, with the tamping latch released but just prior to tamping.
Figure 57D:
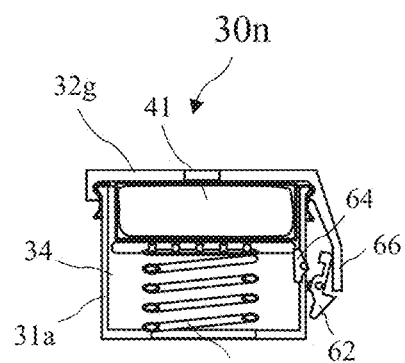
FIG. 57D is a cross-sectional view of the fourteenth coffee holder taken along line 56-56 of FIG. 55 showing the lid attached to the base with the coffee and the filter paper cup residing in the coffee holder base with tamping latch released and the coffee tamped.

A cross-sectional view of the fourteenth coffee holder 30*n* taken along line 56-56 of FIG. 55 showing the lid 32*g*, coffee 41, and the filter paper cup 40, above the coffee holder base 31*a*, with the tamping latch 64 retaining the bottom tamper 34 is shown in FIG. 57A, a cross-sectional view of the fourteenth coffee holder 30*n* taken along line 56-56 of FIG. 55 showing the lid 32*g* above the coffee 41 and the filter paper cup 40 resting in the coffee holder base 31*a*, with the tamping latch 64 retaining the bottom tamper 34 is shown in FIG. 57B, a cross-sectional view of the fourteenth coffee holder 30*n* taken along line 56-56 of FIG. 55 showing the lid 32*g*, above the coffee 41 and the filter paper cup 40 resting in the coffee holder base 31*a* with the tamping latch 64 released but just prior to tamping (the bottom tamper has been released but has not moved upward against the coffee 41) is shown in FIG. 57C, and a cross-sectional view of the fourteenth coffee holder 30*n* taken along line 56-56 of FIG. 55 showing the lid 32*g* attached to the base with the coffee 41 and the filter paper cup 40 residing in the coffee holder base 31*a* with tamping latch 64 released and the coffee 41 tamped is shown in FIG. 57D. The lever 62 thus holds the latch 64 until the lever 62 is pushed by the arm 66 to release the latch 62 to release the bottom tamper 34 to tamp the coffee 41.

Figure 58:
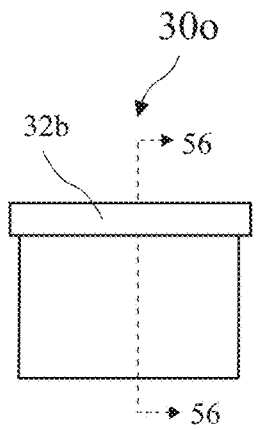
FIG. 58 is a side view of a fourteenth coffee holder with a releasable tamping lock according to the present invention.
Figure 59:
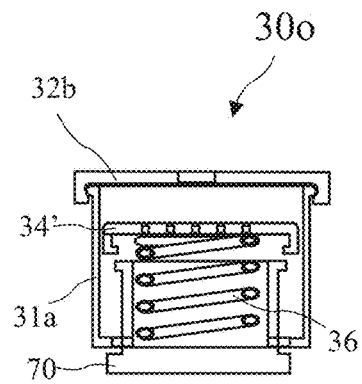
FIG. 59 is a cross-sectional view of the fourteenth coffee holder taken along line 59-59 of FIG. 58 showing an empty coffee holder.

A side view of a fourteenth coffee holder 30*o* with a releasable tamping lock according to the present invention is shown in FIG. 58 and a cross-sectional view of the fourteenth coffee holder 30*o* taken along line 59-59 of FIG. 58 showing an empty coffee holder is shown in FIG. 59. The coffee holder 30*o* includes a tamping lock 70 which engages a second bottom tamper 34' to hold the second bottom tamper in a down position for filling the coffee holder with coffee and releases the bottom tamper 34' to be pushed upwards by the tamping spring 36 to tamp the coffee after the holder lid 32*b* is attached to the base 31*a*.

Figure 60A:
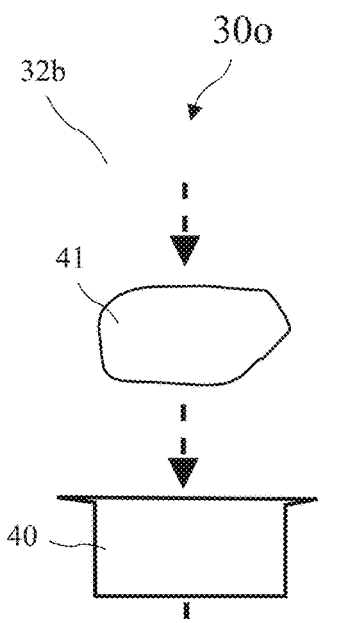
FIG. 60A is a cross-sectional view of the fourteenth coffee holder taken along line 59-59 of FIG. 58 showing a lid, coffee, a filter paper cup, above the base, and the coffee holder base, with the tamping lock retaining the bottom tamper.
Figure 60B:
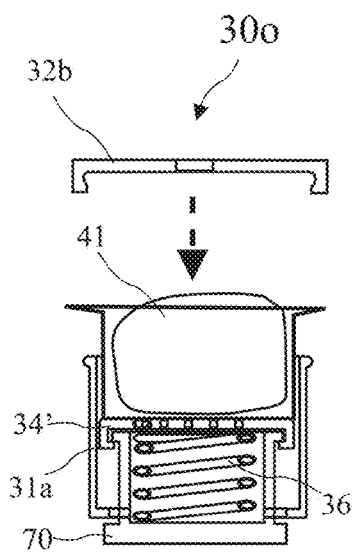
FIG. 60B is a cross-sectional view of the fourteenth coffee holder taken along line 59-59 of FIG. 58 showing the lid, above the coffee and the filter paper cup resting in the coffee holder base, with the tamping lock retaining the bottom tamper.
Figure 60C:
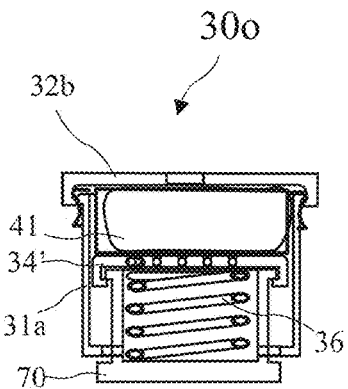
FIG. 60C is a cross-sectional view of the fourteenth coffee holder taken along line 59-59 of FIG. 58 showing the lid, above the coffee and the filter paper cup resting in the coffee holder base prior to tamping.
Figure 60D:
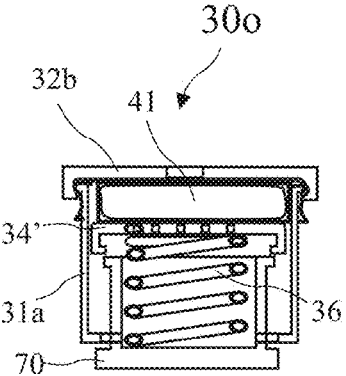
FIG. 60D is a cross-sectional view of the fourteenth coffee holder taken along line 59-59 of FIG. 58 showing the lid attached to the base with the coffee and the filter paper cup residing in the coffee holder base with tamping lock released and the coffee tamped.

A cross-sectional view of the fourteenth coffee holder 30*o* taken along line 59-59 of FIG. 58 showing a lid 32*b*, coffee 41, a filter paper cup 40, above the coffee holder base 31, with the tamping lock 70 retaining the bottom tamper 34' is shown in FIG. FIG. 60A, cross-sectional view of the fourteenth coffee holder taken along line 59-59 of FIG. 58 showing the lid, above the coffee and the filter paper cup resting in the coffee holder base, with the tamping latch retaining the bottom tamper 34' is shown in FIG. FIG. 60B, a cross-sectional view of the fourteenth coffee holder taken along line 59-59 of FIG. 58 showing the lid, above the coffee and the filter paper cup resting in the coffee holder base prior to tamping is shown in FIG. 60A, and a cross-sectional view of the fourteenth coffee holder taken along line 59-59 of FIG. 58 showing the lid 32*b* attached to the base 31*a* with the coffee 41 and the filter paper cup 41 residing in the coffee holder base 31*a* with tamping lock released and the coffee tamped is shown in FIG. 60D.

Figure 61:
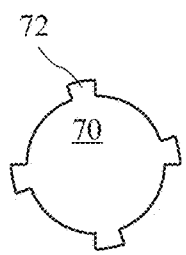
FIG. 61 is a top view of a lock according to the present invention.
Figure 62:
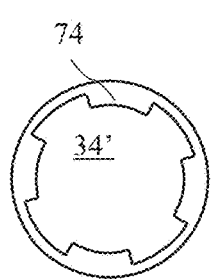
FIG. 62 is a bottom view of a second bottom tamper with cooperates with the tamping lock according to the present invention.

A top view of a tamping lock 70 according to the present invention is shown in FIG. 61 and a bottom view of a second bottom tamper 34' which cooperates with the tamping lock 70 according to the present invention is shown ion FIG. 62. The tamping lock 70 includes teeth 72 which are inserted between and turned to engage lips 74 on the bottom of the bottom tamper 34' to hold the bottom tamper in the down position for filling the coffee holder 30*o* with coffee 41. After the coffee holder 30*o* is filled with coffee and the holder lid 32b attached, the tamping lock is twisted to release the bottom tamper 32b to tamp the coffee.

Figure 63C:
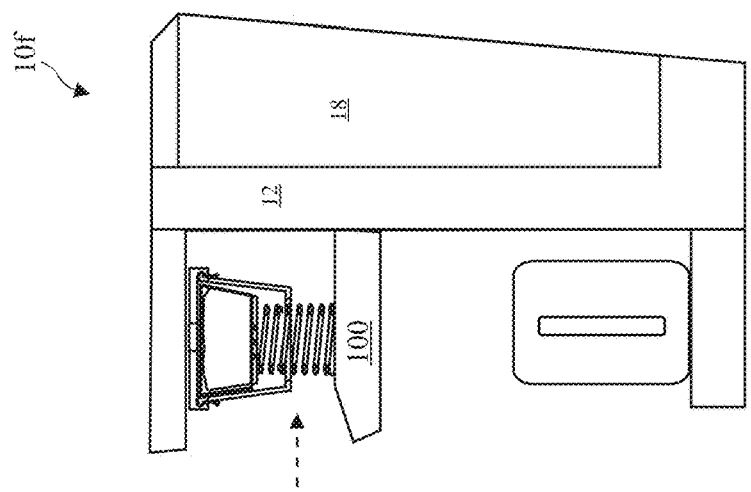
Figure 63B:
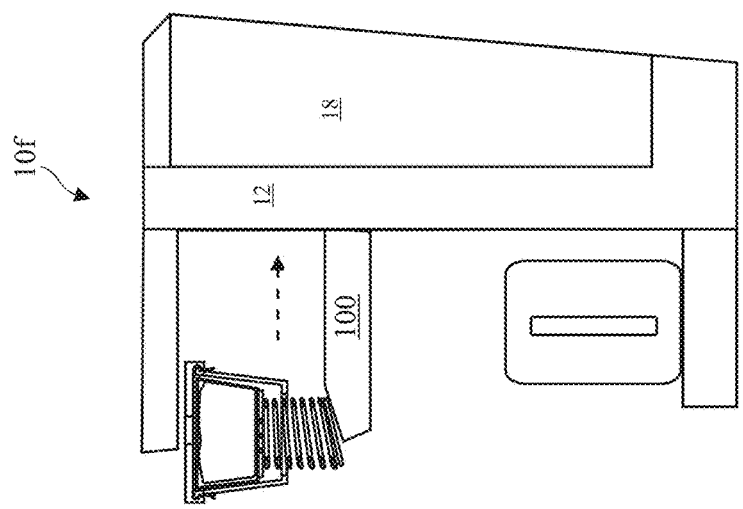
Figure 63A:
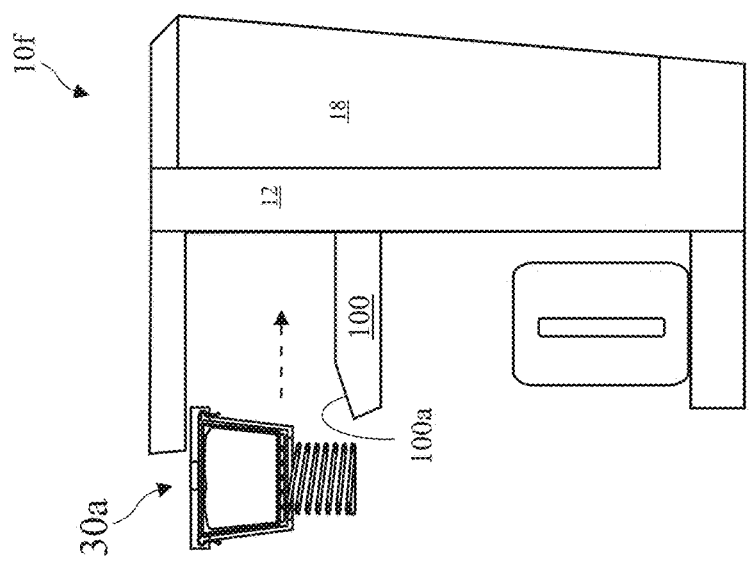

FIGS. 63A-63C show an embodiment of the coffee holder 10f having a ramped lower shelf 100. The coffee holder 30a (see FIGS. 3-5D) with the bottom tamping spring 36 may be horizontally disposed into the coffee maker 10f, sliding up a ramp 100a, and thereby pushing the spring 36 upward into the holder 30a to tamp the coffee 41 in the coffee holder 30a. The coffee maker 10f may also include a shelf and ramp rotated 90 degrees allowing the coffee holder 30a to be vertically disposed into the coffee maker to tamp the coffee 41.

Figure 64C:
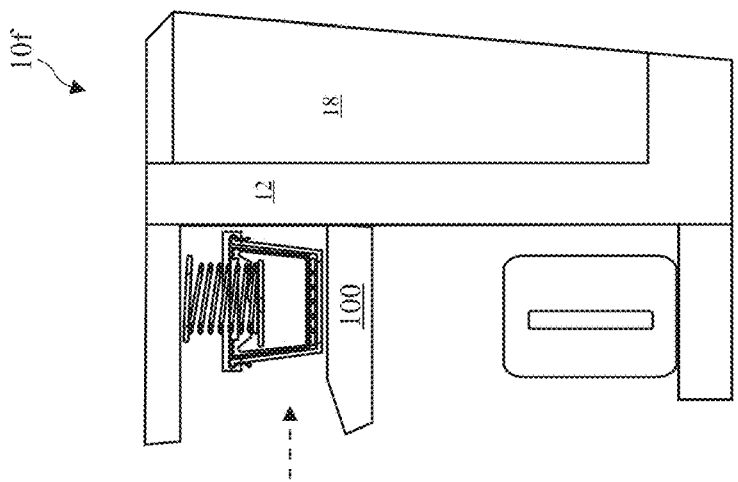
Figure 64B:
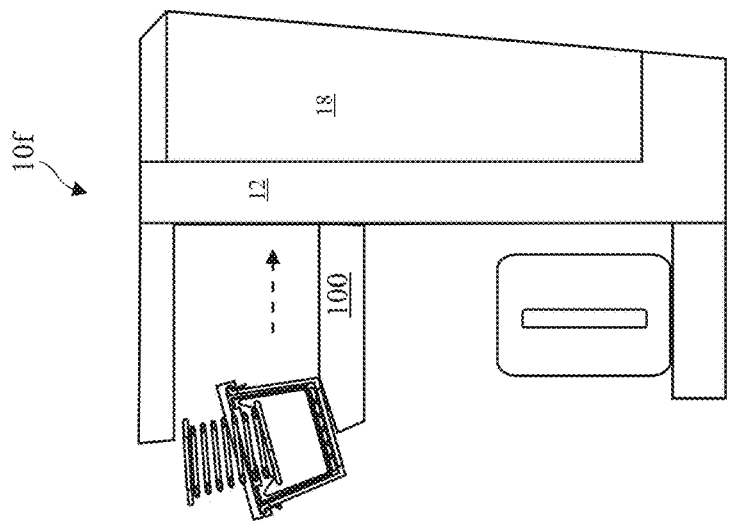
Figure 64A:
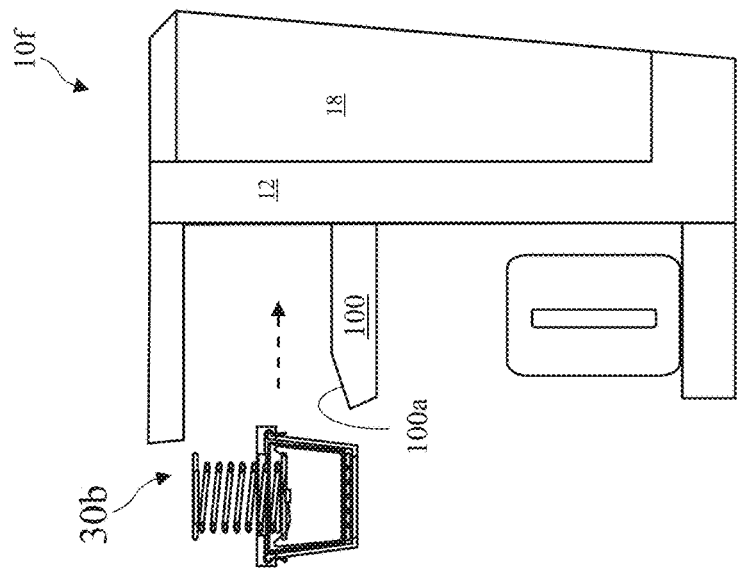

FIGS. 64A-64C show the coffee holder 10f having the ramped lower shelf 100. The coffee holder 30b (see FIGS. 9-11D) with the top tamping spring 36 may be horizontally disposed into the coffee maker 10f, sliding up a ramp 100a, and thereby pushing the spring 36 downward into the holder 30b to tamp the coffee 41 in the coffee holder 30b. The coffee maker 10f may also include a shelf and ramp rotated 90 degrees allowing the coffee holder 30b to be vertically disposed into the coffee maker to tamp the coffee 41.

Figure 65C:
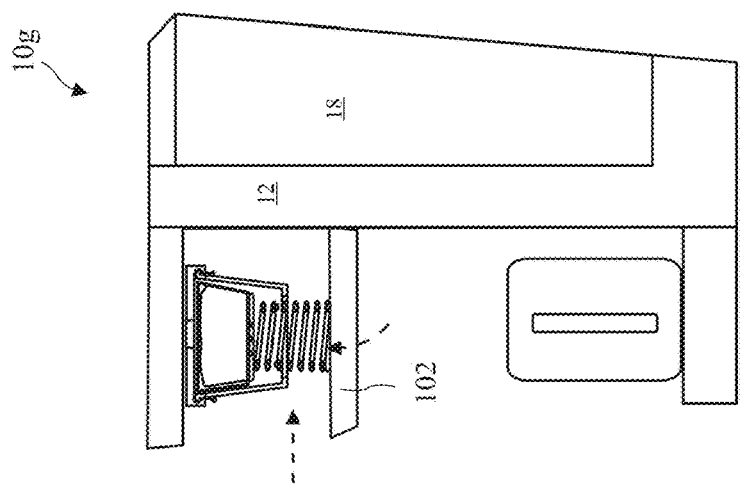
Figure 65B:
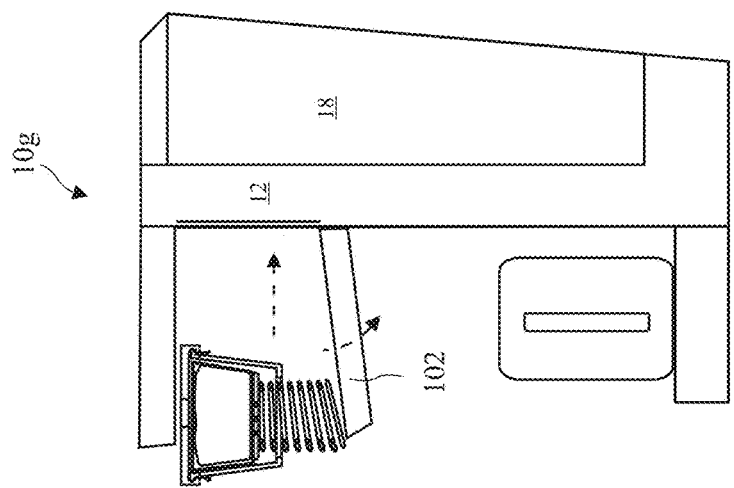
Figure 65A:
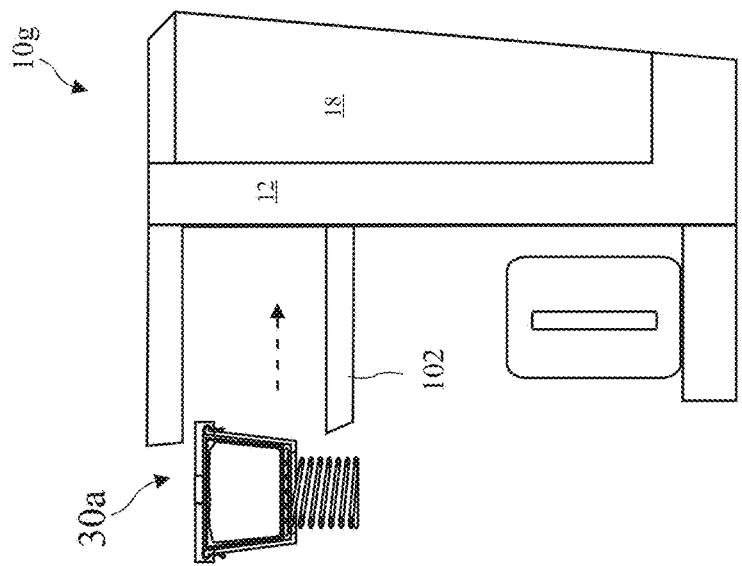

FIGS. 65A-65C show an embodiment of the coffee holder 10g having a springed (or spring biased) lower shelf 102. The coffee holder 30a (see FIGS. 3-5D) with the bottom tamping spring 36 may be horizontally disposed into the coffee maker 10f, pushing the springed lower shelf 102 downward, and upon releasing the coffee holder 30a, the springed lower shelf 102 returns towards an original position, thereby pushing the spring 36 upward into the holder 30a to tamp the coffee 41 in the coffee holder 30a. The coffee maker 10f may also include a shelf and springed shelf rotated 90 degrees allowing the coffee holder 30a to be vertically disposed into the coffee maker to tamp the coffee 41. The springed shelf may pivot as shown in FIGS. 65B and 65C, or may translate vertically, or may have a combination of pivoting and translating.

Figure 66C:
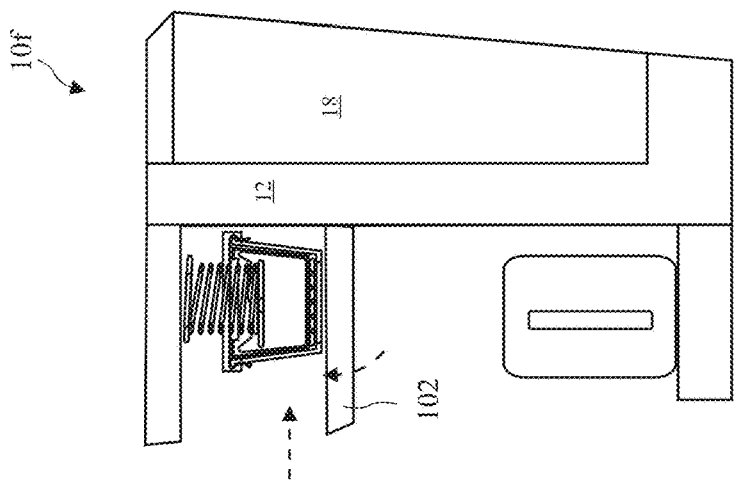
Figure 66B:
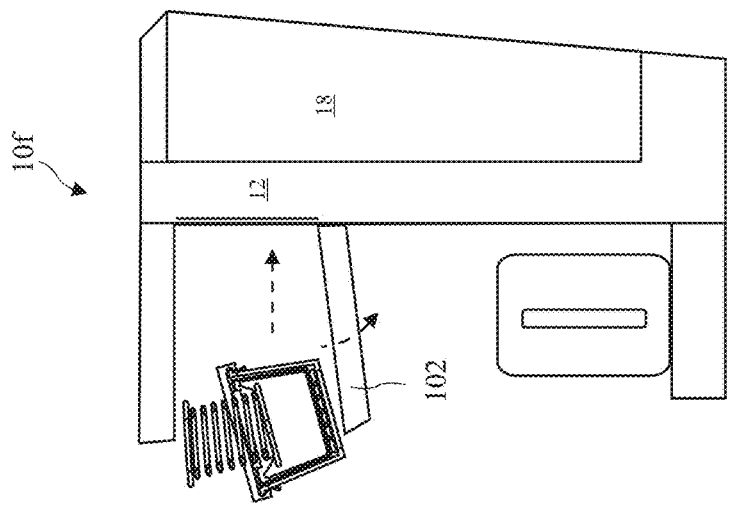
Figure 66A:
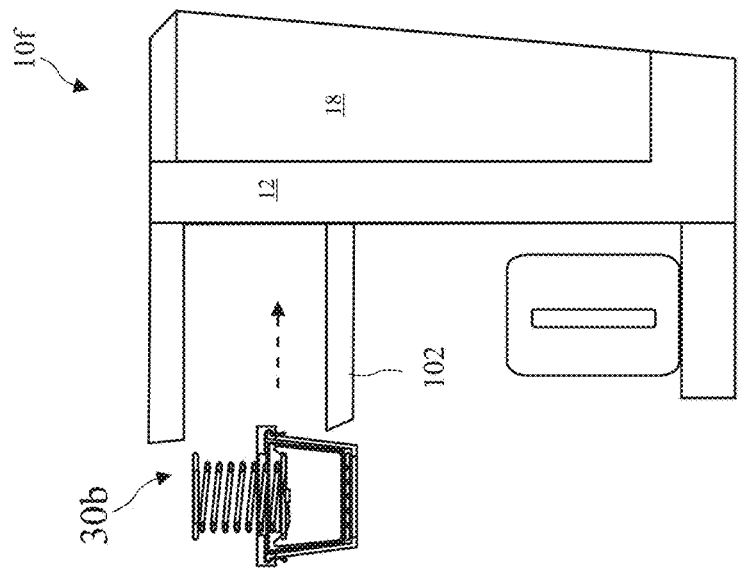

FIGS. 66A-66C show the coffee holder 10g having the springed lower shelf 102. The coffee holder 30b (see FIGS. 9-11D) with the top tamping spring 36 may be horizontally disposed into the coffee maker 10f, pushing the springed lower shelf 102 downward, and upon releasing the coffee holder 30b, the springed lower shelf 102 returns towards an original position, thereby pushing the spring 36 downward into the holder 30b to tamp the coffee 41 in the coffee holder 30b. The coffee maker 10f may also include a shelf and springed shelf rotated 90 degrees allowing the coffee holder 30b to be vertically disposed into the coffee maker to tamp the coffee 41. The springed shelf may pivot as shown in FIGS. 66B and 66C, or may translate vertically, or may have a combination of pivoting and translating.

Figure 67C:
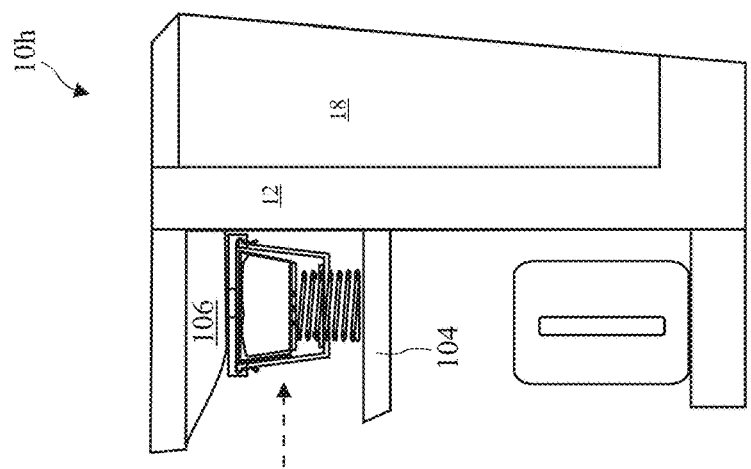
Figure 67B:
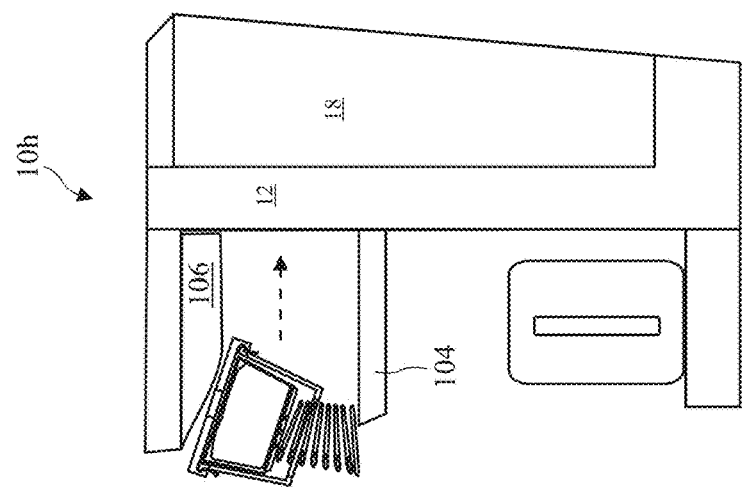
Figure 67A:
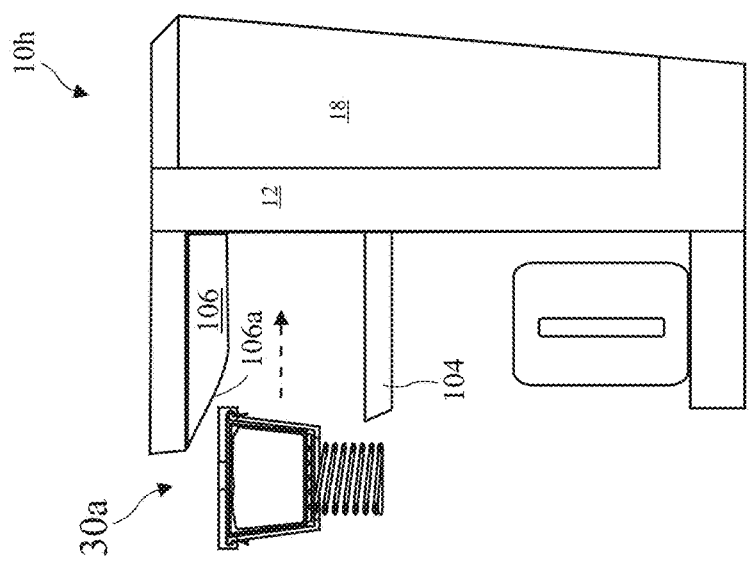

FIGS. 67A-67C show an embodiment of the coffee holder 10h having a ramped upper shelf 106. The coffee holder 30a (see FIGS. 3-5D) with the bottom tamping spring 36 may be horizontally disposed into the coffee maker 10h between a lower shelf 104 and the upper shelf 106, the top of the coffee housing 30a sliding down a ramp 106a, and thereby pushing the spring 36 upward into the holder 30a to tamp the coffee 41 in the coffee holder 30a. The coffee maker 10h may also include a shelf and ramp rotated 90 degrees allowing the coffee holder 30a to be vertically disposed into the coffee maker to tamp the coffee 41.

Figure 68C:
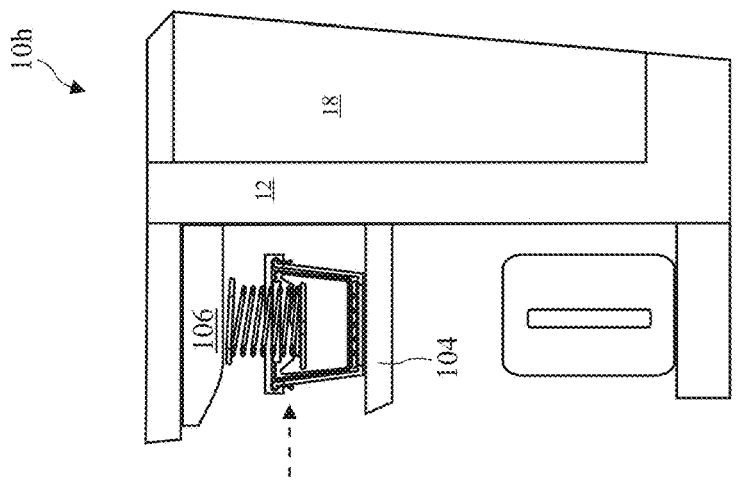
Figure 68B:
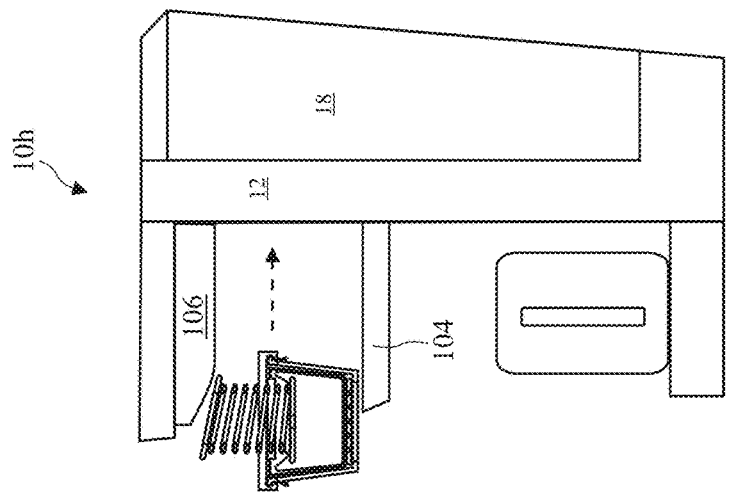
Figure 68A:
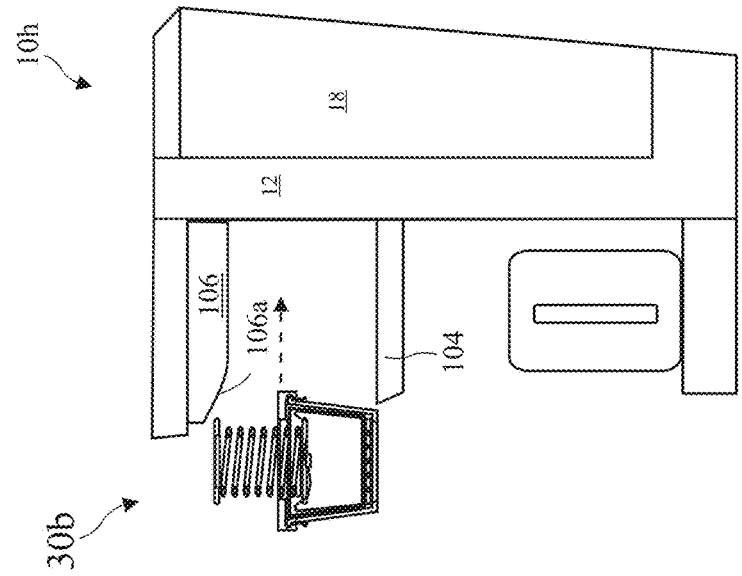

FIGS. 68A-68C show an embodiment of the coffee holder 10h having the ramped upper shelf 106. The coffee holder 30b (see FIGS. 8-11D) with the top tamping spring 36 may be horizontally disposed into the coffee maker 10h between the lower shelf 104 and the upper shelf 106, the spring 36 sliding down a ramp 106a, and thereby pushing the spring 36 downward into the holder 30b to tamp the coffee 41 in the coffee holder 30b. The coffee maker 10h may also include a shelf and ramp rotated 90 degrees allowing the coffee holder 30b to be vertically disposed into the coffee maker to tamp the coffee 41.

Figure 69C:
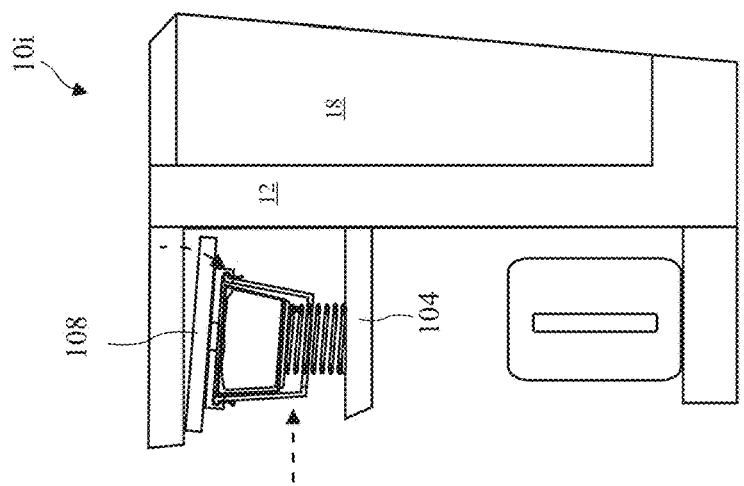
Figure 69B:
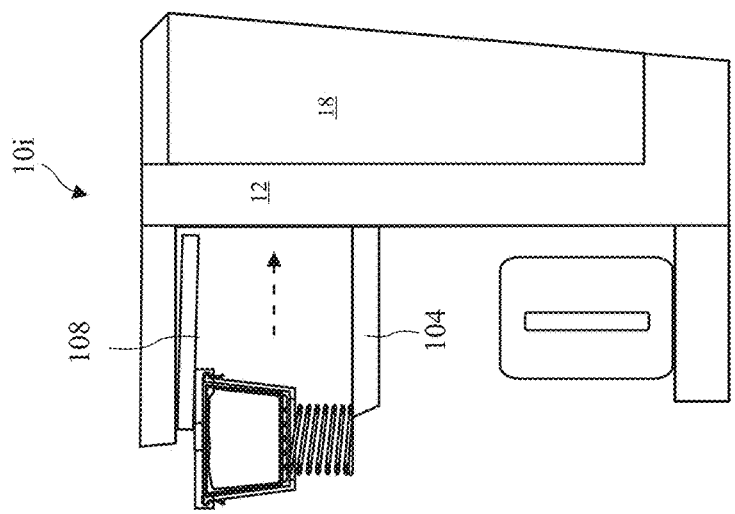
Figure 69A:
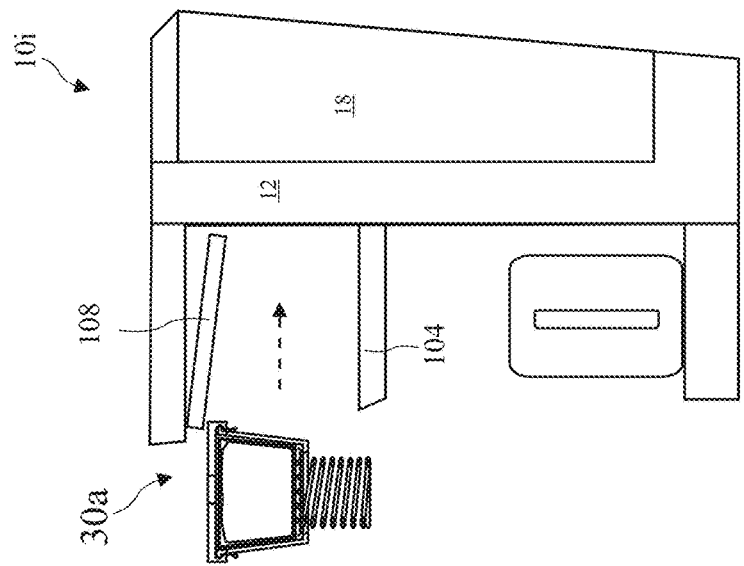

FIGS. 69A-69C show an embodiment of the coffee holder 10i having a springed (or spring biased) upper shelf 108. The coffee holder 30a (see FIGS. 3-5D) with the bottom tamping spring 36 may be horizontally disposed into the coffee maker 10i, pushing the springed upper shelf 108 upward, and upon releasing the coffee holder 30a, the springed upper shelf 108 returns towards an original position, thereby pushing the spring 36 upward into the holder 30a to tamp the coffee 41 in the coffee holder 30a. The coffee maker 10i may also include a shelf and springed shelf rotated 90 degrees allowing the coffee holder 30a to be vertically disposed into the coffee maker to tamp the coffee 41. The springed shelf may pivot as shown in FIGS. 69B and 69C, or may translate vertically, or may have a combination of pivoting and translating.

Figure 70C:
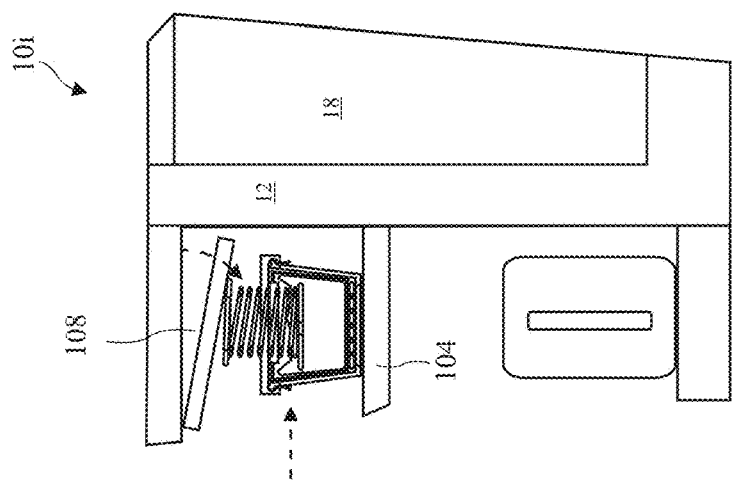
Figure 70B:
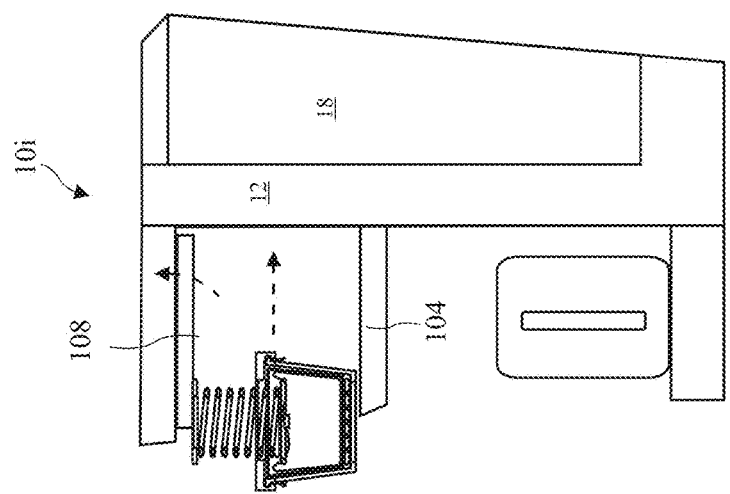
Figure 70A:
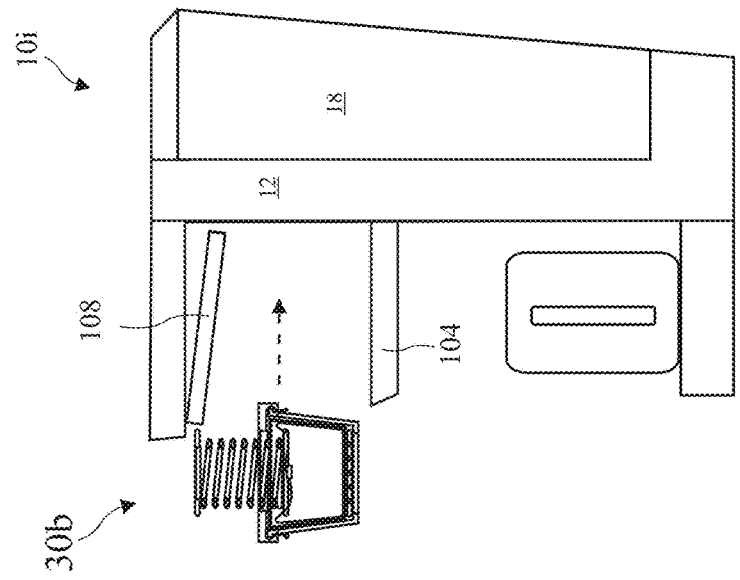

FIGS. 70A-70C show the coffee holder 10i having the springed (or spring biased) upper shelf 108. The coffee holder 30b (see FIGS. 8-11D) with the top tamping spring 36 may be horizontally disposed into the coffee maker 10i, pushing the springed upper shelf 108 upward, and upon releasing the coffee holder 30b, the springed upper shelf 108 returns towards an original position, thereby pushing the spring 36 downward into the holder 30b to tamp the coffee 41 in the coffee holder 30a. The coffee maker 10i may also include a shelf and springed shelf rotated 90 degrees allowing the coffee holder 30b to be vertically disposed into the coffee maker to tamp the coffee 41. The springed shelf may pivot as shown in FIGS. 69B and 69C, or may translate vertically, or may have a combination of pivoting and translating.

Figure 71A:
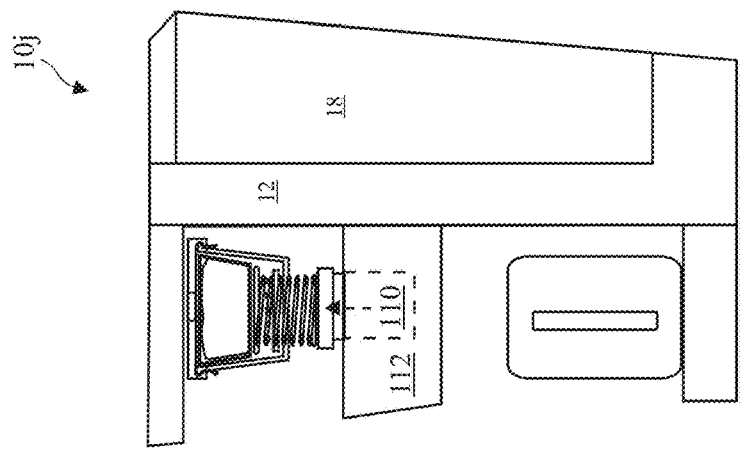
Figure 71B:
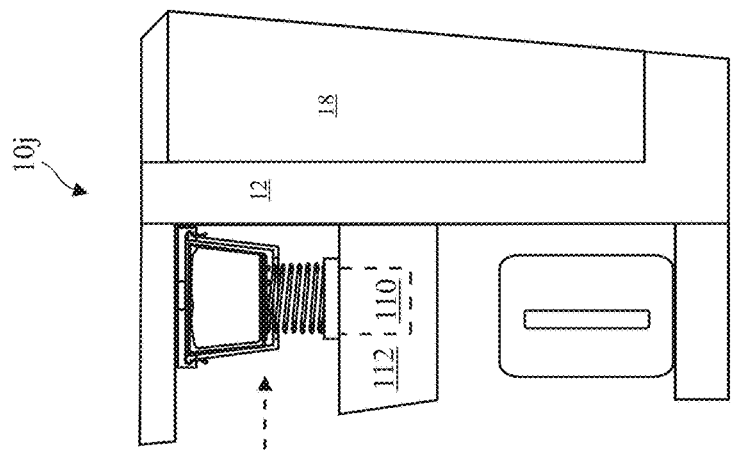
Figure 71C:
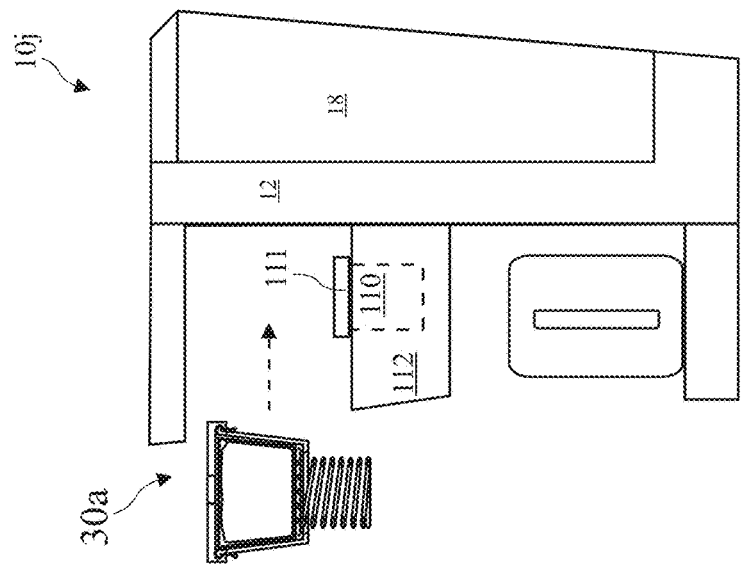

FIGS. 71A-71C show an embodiment of the coffee holder 10j having a linear actuator 110 residing in a lower shelf 112. A vertically moving member 111 of the actuator 110 movable upwards from an initial position to an actuated position. The coffee holder 30a (see FIGS. 3-5D) with the bottom tamping spring 36 may be horizontally disposed into the coffee maker 10j, onto the actuator 110. When the coffee making is initiated, the actuator pushes the spring 36 upward into the holder 30a to tamp the coffee 41 in the coffee holder 30a. The coffee maker 10j may also include a shelf and actuator rotated 90 degrees allowing the coffee holder 30a to be vertically disposed into the coffee maker to tamp the coffee 41. The linear actuator 110 may be electrical (e.g., a solenoid or linear motor), or may be hydraulic or pneumatic.

Figure 72C:
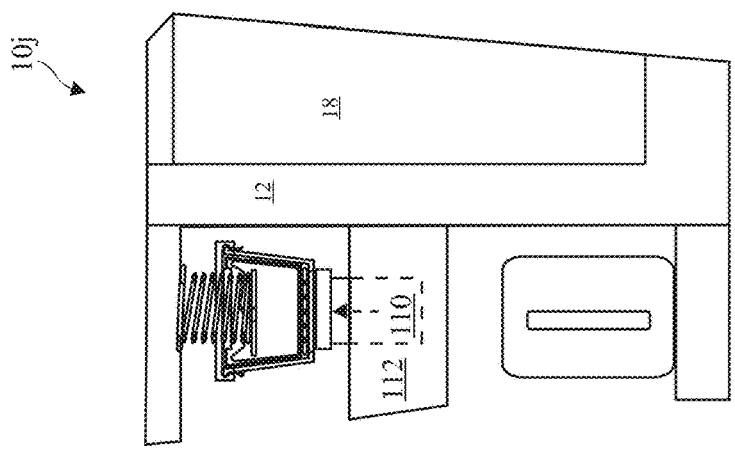
Figure 72B:
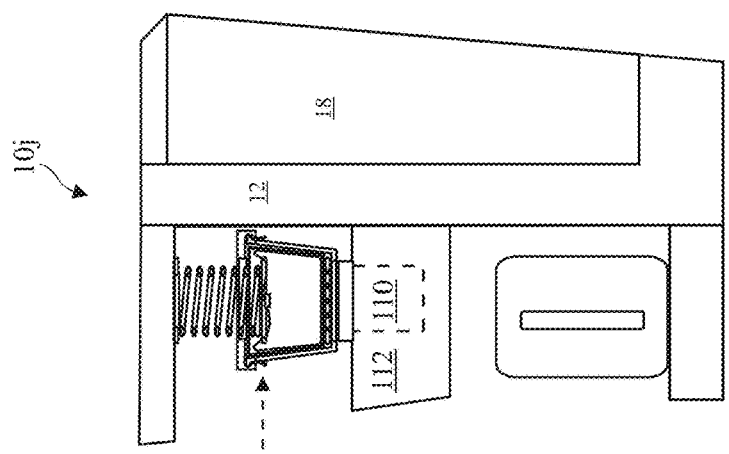
Figure 72A:
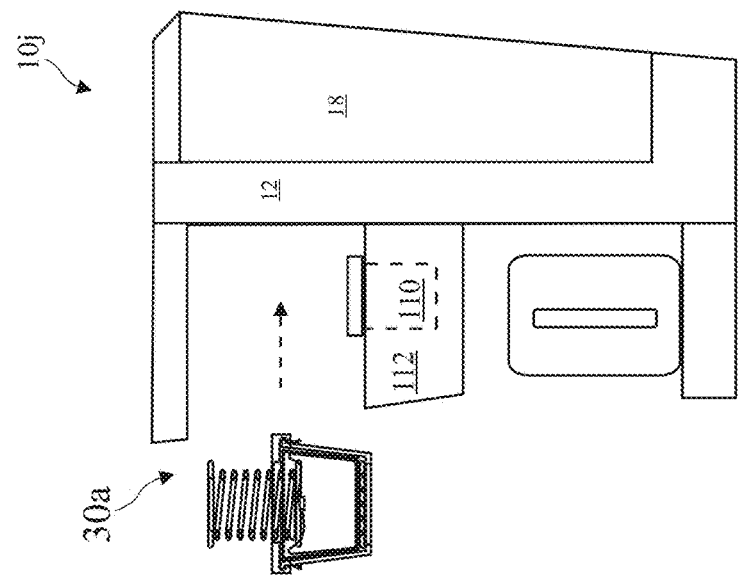

FIGS. 72A-72C show the coffee holder 10j having the linear actuator 110 residing in a lower shelf 112. The coffee holder 30b (see FIGS. 8-11D) with the top tamping spring 36 may be horizontally disposed into the coffee maker 10j, onto the actuator 110. When the coffee making is initiated, the actuator pushes the coffee holder 30b upward causing the spring 36 to reach downward into the holder 30b to tamp the coffee 41 in the coffee holder 30b. The coffee maker 10j may also include a shelf and actuator rotated 90 degrees allowing the coffee holder 30b to be vertically disposed into the coffee maker to tamp the coffee 41.

Figure 73C:
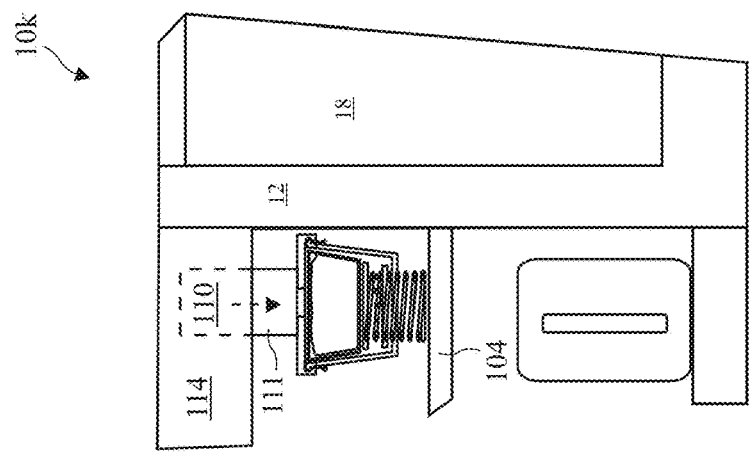
Figure 73B:
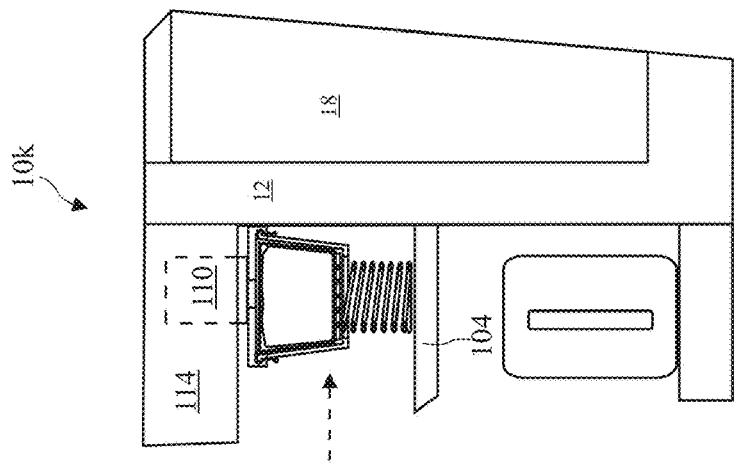
Figure 73A:
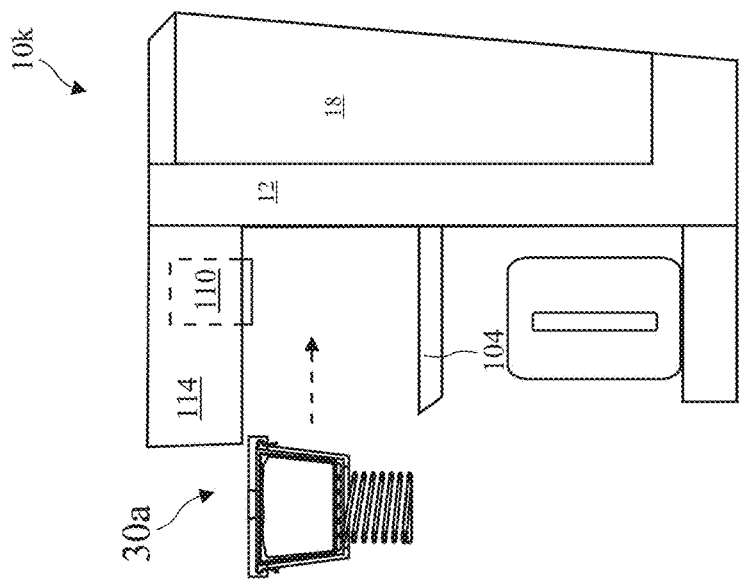

FIGS. 73A-73C show an embodiment of the coffee holder 10k having the linear actuator 110 residing in an upper shelf 114. The coffee holder 30a (see FIGS. 3-5D) with the bottom tamping spring 36 may be horizontally disposed into the coffee maker 10k, under the actuator 110. When the coffee making is initiated, the actuator pushes the coffee holder 30a downward and thus the spring 36 upward into the holder 30a to tamp the coffee 41 in the coffee holder 30a. The coffee maker 10k may also include a shelf and actuator rotated 90 degrees allowing the coffee holder 30a to be vertically disposed into the coffee maker to tamp the coffee 41.

FIGS. 74A-74C show the coffee holder 10k having the linear actuator 110 residing in the upper shelf 114. The coffee holder 30b (see FIGS. 8-11D) with the top tamping spring 36 may be horizontally disposed into the coffee maker 10k, under the actuator 110. When the coffee making is initiated, the actuator pushes the spring 36 downward into the holder 30a to tamp the coffee 41 in the coffee holder 30b. The coffee maker 10k may also include a shelf and actuator rotated 90 degrees allowing the coffee holder 30b to be vertically disposed into the coffee maker to tamp the coffee 41.

FIGS. 75A-75C show an embodiment of the coffee holder 10k having the linear actuator 110 residing in the upper shelf 114. The coffee holder 30c (see FIGS. 15-17C) may be horizontally disposed into the coffee maker 10k, under the actuator 110. When the coffee making is initiated, the actuator pushes downward into the holder 30c to tamp the coffee 41 in the coffee holder 30c. The coffee maker 10k may also include a shelf and actuator rotated 90 degrees allowing the coffee holder 30a to be vertically disposed into the coffee maker to tamp the coffee 41. While the coffee holder 30c is a preferred coffee holder for use with the coffee maker 10k, the coffee holders 30a and 30b may alternatively be used with the coffee maker 10k and such use is intended to come within the scope of the present invention.

FIGS. 76A-76C show an embodiment of the coffee holder 10l having the linear actuator 110 residing in the upper shelf 116, the upper shelf including rails 118 for engaging the coffee holder 30c. The coffee holder 30c (see FIGS. 15-17C) may be horizontally disposed into the coffee maker 10l, under the actuator 110. When the coffee making is initiated, the actuator pushes downward into the holder 30c to tamp the coffee 41 in the coffee holder 30c. The coffee maker 10l may also include a shelf and actuator rotated 90 degrees allowing the coffee holder 30a to be vertically disposed into the coffee maker to tamp the coffee 41.

FIGS. 77A-77C show an embodiment of the coffee holder 10m having the linear actuator 110 residing in the upper shelf 116, and a drawer 120 for receiving the coffee holder 30c. The coffee holder 30c (see FIGS. 15-17C) may be vertically disposed into the drawer 120 and the drawer horizontally closed, under the actuator 110. When the coffee making is initiated, the actuator pushes downward into the holder 30c to tamp the coffee 41 in the coffee holder 30c. The coffee maker 10m may also include a drawer and actuator rotated 90 degrees allowing the coffee holder 30a to be horizontally disposed into the drawer, and the drawer vertically closed to tamp the coffee 41. While the coffee holder 30c is a preferred coffee holder for use with the coffee maker 10m, the coffee holders 30a and 30b may alternatively be used with the coffee maker 10m having, for example, a greater drawer height to allow vertical space for the spring 36, and such use is intended to come within the scope of the present invention.

FIGS. 78A-78C show an embodiment of the coffee holder 10m' having the linear actuator 110 residing in the upper shelf 116, and a drawer 120 for receiving the coffee holder 30c. The coffee holder 30c (see FIGS. 15-17C) may be vertically disposed into the drawer 120 and the drawer pivoted about a vertical axis 123, under the actuator 110. When the coffee making is initiated, the actuator pushes downward into the holder 30c to tamp the coffee 41 in the coffee holder 30c. The coffee maker 10m' may also include a drawer and actuator rotated 90 degrees allowing the coffee holder 30a to be horizontally disposed into the drawer, and the drawer rotated about a horizontal axis to position the coffee holder 30c to tamp the coffee 41. While the coffee holder 30c is a preferred coffee holder for use with the coffee maker 10m', the coffee holders 30a and 30b may alternatively be used with the coffee maker 10m' having, for example, a greater drawer height to allow vertical space for the spring 36, and such use is intended to come within the scope of the present invention.

FIGS. 79A-79C show an embodiment of the coffee holder 10n having a fixed tamper 122 reaching down from an upper shelf 124, and a vertically translating drawer 126 for receiving the coffee holder 30c. The coffee holder 30c (see FIGS. 15-17C) may be vertically disposed into the drawer 126 and the drawer vertically closed under the shelf 124. When the drawer 126 is closed, the tamper 122 pushes downward into the holder 30c to tamp the coffee 41 in the coffee holder 30c. The coffee maker 10n may also include a drawer and fixed tamper rotated 90 degrees allowing the coffee holder 30a to be horizontally disposed into the drawer, and the drawer horizontally closed to tamp the coffee 41. While the coffee holder 30c is a preferred coffee holder for use with the coffee maker 10n, the coffee holders 30a and 30b may alternatively be used with the coffee maker 10n and such use is intended to come within the scope of the present invention. Further while the fixed tamper 122 provides a low cost embodiment, the actuator 110 may replace the tamper 122.

FIGS. 80A-80C show an embodiment of the coffee holder 10n having the actuator 110 reaching down from the upper shelf 124, and a vertically pivoting drawer 128 for receiving the coffee holder 30c. The coffee holder 30c (see FIGS. 15-17C) may be vertically disposed into the drawer 128 and the drawer pivoted upward along a horizontal axis and closed under the shelf 124. When the drawer 126 is closed, or when coffee making is initiated, the actuator 110 pushes downward into the holder 30c to tamp the coffee 41 in the coffee holder 30c. The coffee maker 10n may also include a drawer and actuator rotated 90 degrees allowing the coffee holder 30a to be horizontally disposed into the drawer, and the drawer horizontally closed to tamp the coffee 41. While the coffee holder 30c is a preferred coffee holder for use with the coffee maker 10o, the coffee holders 30a and 30b may alternatively be used with the coffee maker 10o and such use is intended to come within the scope of the present invention. Further, while the actuator 110 is a preferred embodiment, the fixed tamper 122 may replace the actuator 110.

FIGS. 81A-81C show an embodiment of the coffee holder 10p having a fixed tamper 122 reaching down from a vertically translating upper shelf 124, and a fixed drawer 132 (or shelf 104) for receiving the coffee holder 30c. The coffee holder 30c (see FIGS. 15-17C) may be vertically disposed into the drawer 132 and the vertically translating upper shelf 124 vertically lowered over the coffee holder 30c. When the upper shelf 124 is lowered the tamper 122 pushes downward into the holder 30c to tamp the coffee 41 in the coffee holder 30c. The coffee maker 10p may also include a drawer 132 and translating tamper rotated 90 degrees allowing the coffee holder 30a to be horizontally disposed into the drawer, and the drawer horizontally closed to tamp the coffee 41. While the coffee holder 30c is a preferred coffee holder for use with the coffee maker 10n, the coffee holders 30a and 30b may alternatively be used with the coffee maker 10n and such use is intended to come within the scope of the present invention. Further while the fixed tamper 122 provides a low cost embodiment, the actuator 110 may replace the tamper 122 or by a spring, for example, the spring 36 in FIG. 38B.

FIG. 82 shows a solenoid actuator 110*a* according to the present invention. A water tube 15 provides a flow of water to the solenoid actuator 110*a*. A piston 134 advances downward under the influence of a magnetic field created by a coil 135. The piston 134 may push a tamping spring 36 into a coffee housing, may push a coffee housing down over a spring 36, or may enter a coffee housing to tamp coffee inside the coffee housing. The water is provided to the coffee housing through the nozzle 19.

FIG. 83 shows a solenoid actuator 110*a* with a spray stream head 135 according to the present invention. The spray stream head 137 replaces the nozzle 19 and provides a dispersed spray 139 into the coffee holder.

FIG. 84A shows a hydraulic actuator 110*b* according to the present invention in an initial position and FIG. 84B shows the hydraulic actuator 110*b* in a downward tamping position. The tamper 110*b* responded to the flow of water through the water tube 15 and the water pressure pushes a tamper 136 downward to tamp the coffee in the coffee holder. Seals 140 prevent water from leaking from the tamper 110*b* and help guide the plunger 136. A spring 142 biases the tamper 136 to the initial position in the absence of water pressure inside the hydraulic actuator 110*b*. The hydraulic actuator 110*b* thus automatically tamps the coffee when the coffee maker is actuated.

FIG. 85A shows a second hydraulic actuator 110*c* in an initial position and FIG. 85B shows the hydraulic actuator 110*c* in a downward extended tamping position. The hydraulic actuator 110*c* includes an anti-leak tube 138 having a closed upper end 138*a* and an open lower end 138*b*. In the initial position, a top end of the 19*a* of the nozzle 19 resides in the anti-leak tube 138 to prevent water from escaping the nozzle 19 and in the extended position the top end of the needle 19*a* is clear of the anti-leak tube 138 allowing water to escape from the needle into the coffee holder. The hydraulic actuator 110*c* is otherwise similar to the hydraulic actuator 110*b*.

Various embodiments have described cooperation with water or heated water. Those skilled in the art will recognize that other liquids may be used in drinks, and a drink maker according to the present invention using any liquid is intended to come within the scope of the present invention.

While the present invention is described above as placing loose coffee in a coffee holder, the invention may also be practiced by placing prepackaged coffee, for example coffee pods, into the coffee holder. Further, while the coffee holder is generally described as having a snap on lid, a screw on lid may also be used, and in general the various elements of different embodiments of coffee holders and coffee makers described above may be mixed to provide new embodiments and such new embodiments are intended to come within the scope of the present invention. Embodiments described including a coffee holder with a top tamping spring, bottom tamping spring, or not tamping spring are generally interchangeable, and merely substituting a different coffee holder is intended to come within the scope of the present invention.

Further, many embodiments are described as including a coffee chamber comprising a filter paper cup. In many cases, a filter cup made of nylon mesh or metal mesh is equally suitable, and any coffee holder or combination of coffee maker and coffee holder including a filter chamber which holds coffee and allows the coffee to be tamped as described above is intended to come within the scope of the present invention regardless of the specific filter material.

While the invention herein disclosed has been described by means of specific embodiments and applications thereof, numerous modifications and variations could be made thereto by those skilled in the art without departing from the scope of the invention set forth in the claims.

I claim:

1. A beverage material holder, comprising:
    a closed sidewall having first and second opposing rims and completely enclosing an interior of the holder between the first and second opposing rims;
    a lip extending inward from the second rim;
    a beverage material cup made at least in part from water-permeable material and having a ledge around an open end, configured to hold ground beverage material within the interior of the holder; and
    a tamping device, wherein the tamping device includes:
        a tamping plate configured to enter the interior of the holder, and
        a biasing device configured to urge the tamping plate into the interior of the holder;
    wherein the ledge is configured to be secured against the first rim;
    wherein the second rim defines an opening configured to receive the tamping device into the interior of the holder and is configured to brace against a surface;
    thereby providing support for ground beverage material by the tamping device within the interior of the holder.

2. The beverage material holder of claim 1, further comprising a lid configured to be removably coupled to the first rim, thereby to secure the ledge of the beverage material cup between the lid and the first rim.

3. The beverage material holder of claim 2, wherein the lid includes an aperture configured to receive a nozzle.

4. The beverage material holder of claim 1, wherein:
    an inner periphery of the lip defines the second opening; and
    the tamping plate is larger in at least one orientation than the second opening, such that the lip retains the tamping plate within the interior of the holder at the second rim.

5. The beverage material holder of claim 1, wherein the biasing device is coupled to the lip.

6. The beverage material holder of claim 1, wherein the biasing device is a spring.

7. The beverage material holder of claim 1, wherein the second rim is configured to brace against a surface of a brewing chamber of a beverage brewer.

8. A brewing chamber of a beverage brewer, including a support surface;
    wherein the second rim of the beverage material holder of claim 1 is configured to brace against the support surface of the brewing chamber.

9. A beverage brewer, comprising:
    a brewing chamber including a support surface;
    wherein the second rim of the beverage material holder of claim 1 is configured to brace against the support surface of the brewing chamber.

* * * * *